United States Patent
Kim et al.

(10) Patent No.: US 9,571,625 B2
(45) Date of Patent: Feb. 14, 2017

(54) ELECTRONIC DEVICE AND CONTROL METHOD THEREOF

(75) Inventors: Ilkon Kim, Seoul (KR); Wooseok Ko, Seoul (KR); Sungjin Kwon, Seoul (KR); Kwangho Eom, Seoul (KR); Jonghwan Kim, Seoul (KR); Taejoo Kim, Seoul (KR); Taejin Lee, Seoul (KR); Wonjung Doo, Seoul (KR); Sungil Kim, Seoul (KR); Kyuho Choi, Seoul (KR)

(73) Assignee: LG ELECTRONICS INC.

( * ) Notice: Subject to any disclaimer, the term of this patent is extended or adjusted under 35 U.S.C. 154(b) by 1275 days.

(21) Appl. No.: 12/843,811

(22) Filed: Jul. 26, 2010

(65) Prior Publication Data
US 2011/0037712 A1    Feb. 17, 2011

(30) Foreign Application Priority Data

Aug. 11, 2009  (KR) .................. 10-2009-0073743
Sep. 29, 2009  (KR) .................. 10-2009-0092583
Oct. 22, 2009  (KR) .................. 10-2009-0100503

(51) Int. Cl.
*G06F 3/048*   (2013.01)
*H04M 1/725*   (2006.01)
(Continued)

(52) U.S. Cl.
CPC .............. *H04M 1/7253* (2013.01); *G06F 3/14* (2013.01); *H04W 4/008* (2013.01);
(Continued)

(58) Field of Classification Search
CPC ........ H04L 67/025; H04L 67/38; H04L 67/06; H04L 67/36; H04L 67/08; H04L 29/0854; G11B 27/031; G11B 27/34; G06F 3/0486; G06F 1/1632; G06F 3/0488; G06T 2200/24; H04M 2250/64
See application file for complete search history.

(56) References Cited

U.S. PATENT DOCUMENTS

2003/0018744 A1*  1/2003  Johanson et al. ............. 709/217
2003/0025735 A1*  2/2003  Polgar et al. .................. 345/771
(Continued)

FOREIGN PATENT DOCUMENTS

EP    1398913    3/2004
EP    2073514    6/2009
(Continued)

OTHER PUBLICATIONS

Korean Intellectual Property Office Application Serial No. 10-2009-0092583, Office Action dated Jun. 10, 2015, 5 pages.
(Continued)

*Primary Examiner* — Jeffrey A Gaffin
*Assistant Examiner* — Ayesha Huertas Torres
(74) *Attorney, Agent, or Firm* — Lee Hong Degerman Kang & Waimey

(57) ABSTRACT

A mobile terminal is presented. The mobile terminal includes a display module, a short-range communication module configured to perform short-range communication, and a controller configured to search for at least one device available for short-range communication via the short-range communication module, acquire location information of the at least one searched other electronic device, and display the at least one searched electronic device reflecting the acquired location information on the display module.

32 Claims, 82 Drawing Sheets

(51) Int. Cl.
*H04W 4/00* (2009.01)
*G06F 3/14* (2006.01)
*H04W 4/04* (2009.01)

(52) U.S. Cl.
CPC ... *G09G 2370/025* (2013.01); *G09G 2370/04* (2013.01); *G09G 2370/16* (2013.01); *H04M 1/72544* (2013.01); *H04M 1/72572* (2013.01); *H04M 2250/12* (2013.01); *H04M 2250/52* (2013.01); *H04M 2250/64* (2013.01); *H04W 4/043* (2013.01)

(56) References Cited

U.S. PATENT DOCUMENTS

| | | | |
|---|---|---|---|
| 2005/0139680 A1* | 6/2005 | Anttila et al. | 235/462.46 |
| 2005/0169214 A1 | 8/2005 | Suomela | |
| 2007/0088497 A1* | 4/2007 | Jung | 701/207 |
| 2007/0146347 A1* | 6/2007 | Rosenberg | 345/173 |
| 2008/0152263 A1* | 6/2008 | Harrison | 382/313 |
| 2008/0238661 A1* | 10/2008 | Camp et al. | 340/539.21 |
| 2008/0278437 A1* | 11/2008 | Barrus et al. | 345/156 |
| 2009/0106666 A1* | 4/2009 | Nomura | 715/748 |
| 2009/0244015 A1* | 10/2009 | Sengupta et al. | 345/173 |
| 2010/0083189 A1* | 4/2010 | Arlein et al. | 715/863 |
| 2010/0241987 A1* | 9/2010 | Russ et al. | 715/784 |
| 2010/0317332 A1* | 12/2010 | Bathiche et al. | 455/418 |
| 2011/0001686 A1* | 1/2011 | Belvin et al. | 345/2.2 |

FOREIGN PATENT DOCUMENTS

| | | |
|---|---|---|
| JP | 2005-253081 | 9/2005 |
| JP | 2007-67724 | 3/2007 |
| KR | 10-2000-0003244 | 1/2000 |
| KR | 10-2008-0041891 | 5/2008 |
| KR | 10-2009-0066103 | 6/2009 |
| KR | 10-2009-0084634 | 8/2009 |
| WO | 03/100452 | 12/2003 |

OTHER PUBLICATIONS

Korean Intellectual Property Office Application Serial No. 10-2009-0100503, Office Action dated Jun. 19, 2015, 4 pages.
Korean Intellectual Property Office Application Serial No. 10-2009-0073743, Notice of Allowance dated Jul. 27, 2016, 2 pages.
Korean Intellectual Property Office Application Serial No. 10-2009-0073743, Office Action dated Jul. 6, 2015, 5 pages.

* cited by examiner

FIG. 9
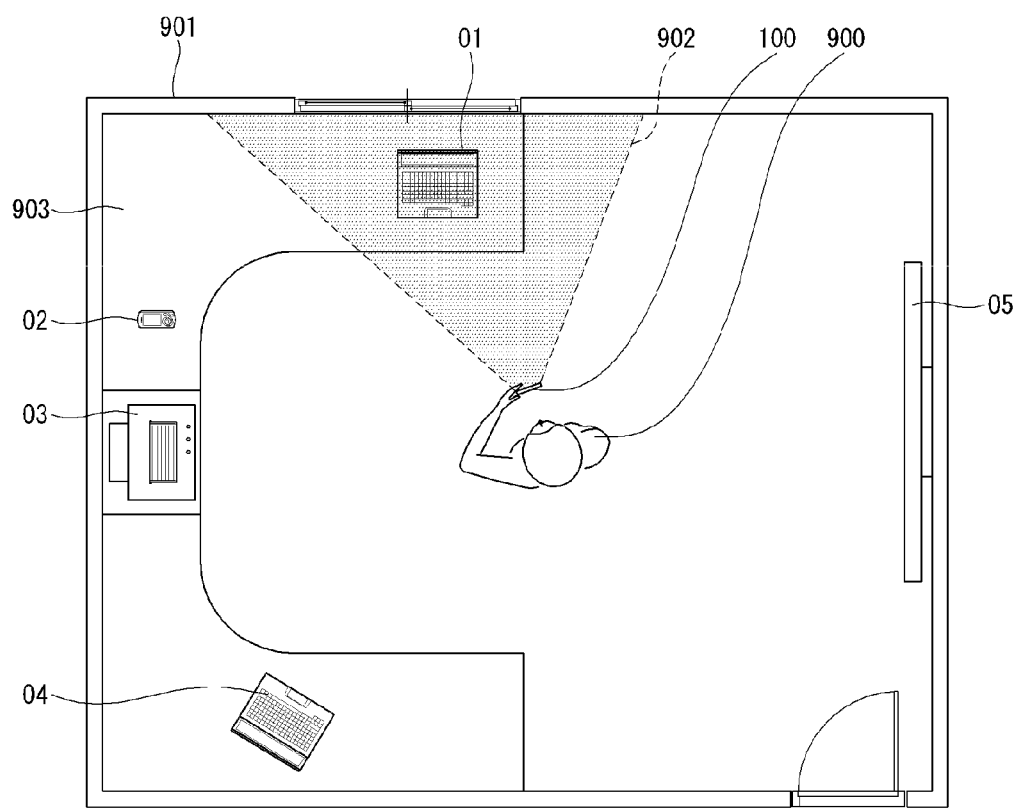
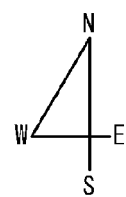

(a)          (b)

FIG. 38
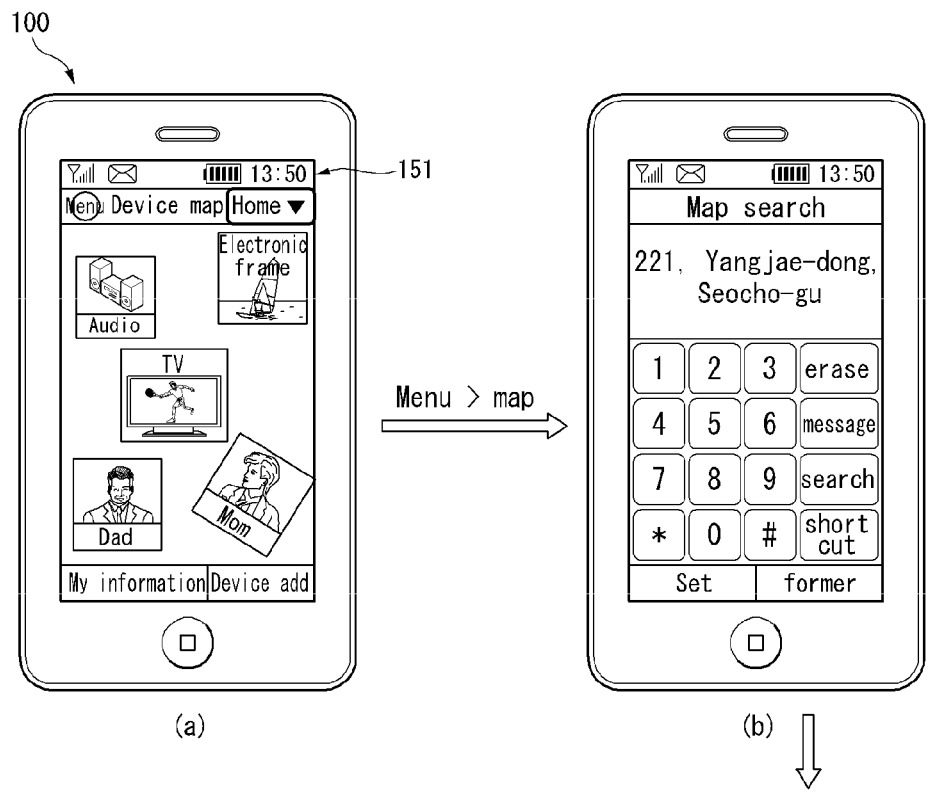
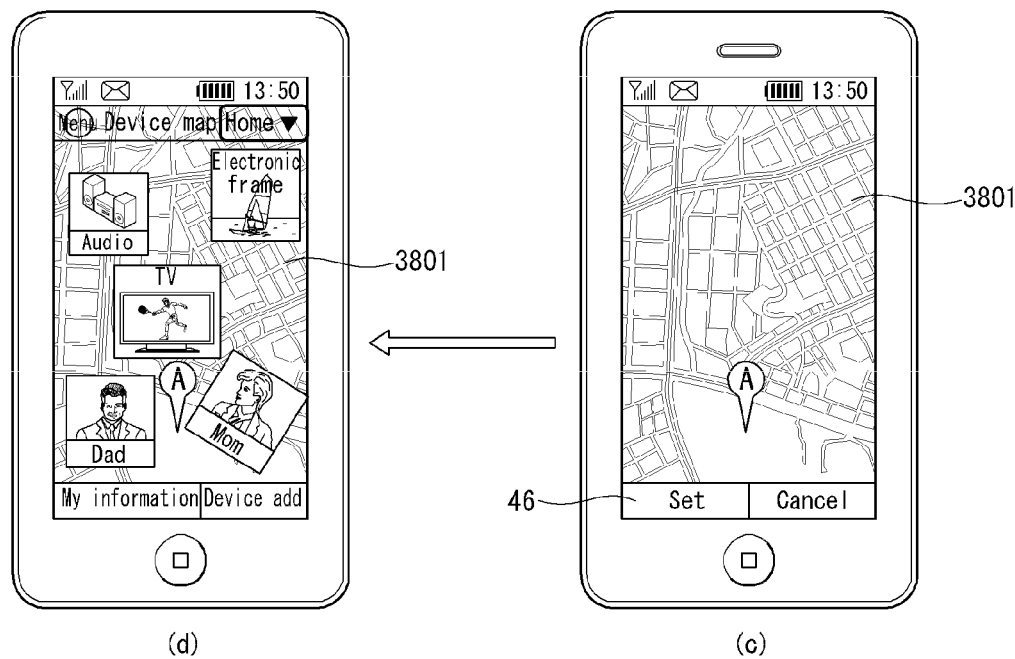

(a)　　　　　　　　(b)

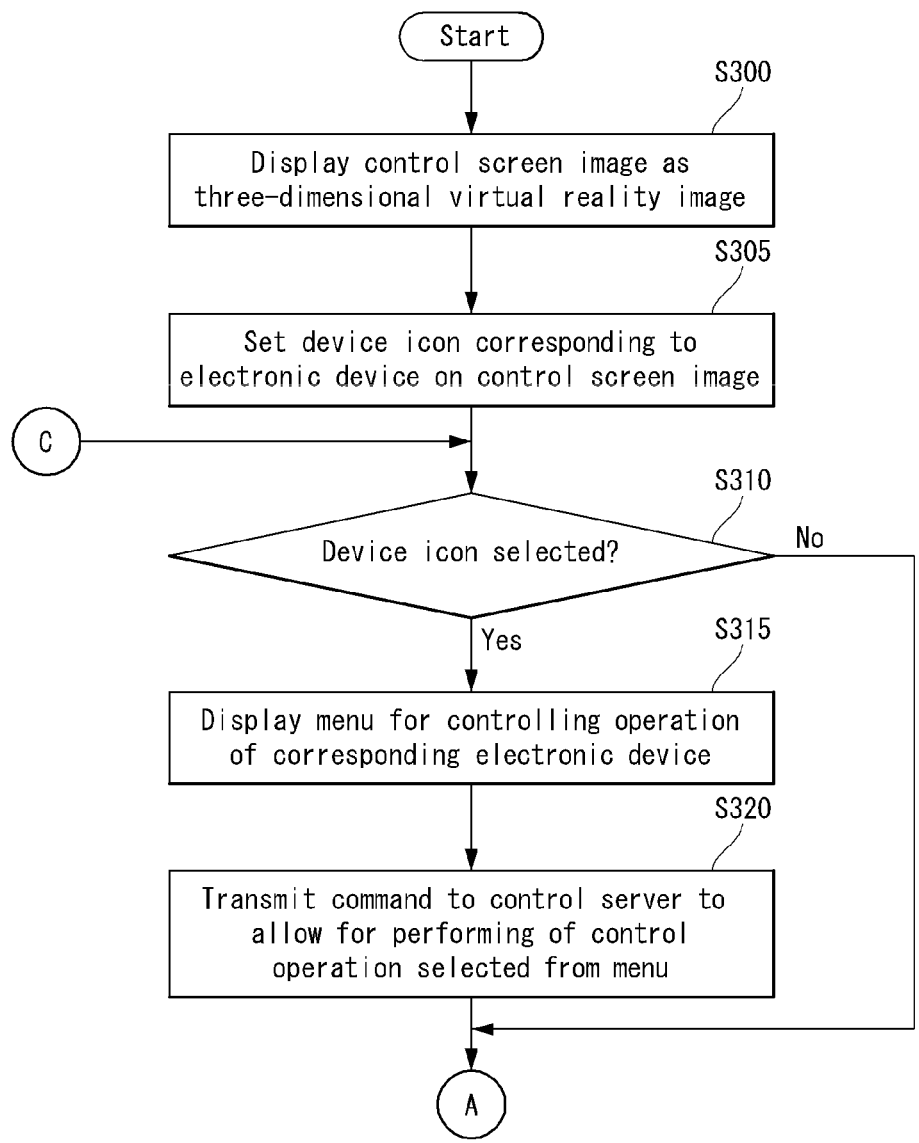

ELECTRONIC DEVICE AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2009-0073743 filed on Aug. 11, 2009, Korean Patent Application No. 10-2009-0092583 filed on Sep. 29, 2009, and Korean Patent Application No. 10-2009-0100503 filed on Oct. 22, 2009, the contents of all of which are hereby incorporated by reference herein in their entireties.

BACKGROUND OF THE INVENTION

Field of the Invention

The present invention relates to an electronic device and a control method thereof. More specifically, an electronic device capable of displaying other electronic devices available for short-range communication on its display module by using location information of the other electronic devices acquired through short-range communication, thus improving user convenience when a user desires to perform communication with the other electronic devices.

Discussion of the Related Art

Generally, terminals can be classified into mobile/portable terminals and stationary terminals. The mobile terminals can be further classified into handheld terminals and vehicle mounted terminals according to how a user transports the terminal.

As functions of the terminal are diversified, the terminal is implemented as a multimedia player provided with composite functions such as photography of still or moving pictures, playback of music or moving picture files, game play, broadcast reception and the like, for example.

To support and increase the terminal functions, the improvement of structural parts and/or software parts of the terminal may be considered.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a mobile terminal is presented. The mobile terminal includes a display module, a short-range communication module configured to perform short-range communication, and a controller configured to search for at least one device available for short-range communication via the short-range communication module, acquire location information of the at least one searched other electronic device, and display the at least one searched electronic device reflecting the acquired location information on the display module.

According to one feature, the controller acquires identification information of the at least one searched device via the short-range communication module. Additionally, the identification information is at least one of a communication state, a communication available speed, a remaining memory capacity of the at least one searched device, or the name of the at least one searched device.

According to another feature, the controller acquires an image reflecting a real space and displays the acquired image in an overlapping manner on the displayed at least one searched device. Additionally, the image reflecting the real space may be an image received in real time via a camera or an image stored in a memory. Furthermore, the image reflecting the real space may be a real image or a virtual image simulating the real space.

According to yet another feature, the controller displays at least one of an emphasis line outlining the at least one searched device located within a display range of the display module and an icon indicating the type or state of the at least one searched device located within the display range of the display module. Additionally, the controller displays an indicator indicating at least one of the location or direction of another at least one searched electronic device located outside the display range of the display module.

According to still yet another feature, the controller exchanges data with a selected at least one searched device via the short-range communication module when a signal for selecting the at least one searched devices is received. Additionally, the mobile terminal may further include a touch pad configured to generate a touch signal according to a touch operation, wherein the selecting signal is generated via a touch operation performed on the touch pad, and the data exchange is initiated via a drag-and-drop operation on the at least one searched device. Moreover, the mobile terminal may further include a motion sensor configured to generate a motion signal corresponding to a motion, wherein at least one of the selecting signal and the data exchange is initiated by a motion signal generated from the motion sensor according to a motion toward the least one searched device. Furthermore, at least one of the selecting signal and the data exchange is initiated when the distance between the mobile terminal and the at least one searched device is less than or equal to a predetermined distance.

According to another feature, the location information comprises at least one of the distance, height, or direction to the at least one searched device.

According to yet another feature, the location information is acquired by using at least one of wireless local area network (WLAN), ultra-wide band (UWB), ZigBee™, near field electromagnetic ranging (NFER), and radio-frequency identification (RFID). Additionally, the mobile terminal may include a location information module configured to assist the acquirement of the location information.

In accordance with another embodiment, a method for controlling a device is presented. The method includes searching for at least one device available for short-range communication via a short-range communication module located in a mobile terminal, acquiring location information of the at least one searched device, and displaying the at least one searched device reflecting the acquired location information on a display module of the mobile terminal.

In accordance with yet another embodiment, a mobile terminal is presented. The mobile terminal includes a display, a short-range communication module configured to perform short-range communication, a controller configured to display a device map showing notification information regarding at least one device, and perform data communication with the at least one device selected via an input signal, wherein the at least on device is displayed as an icon according to an input control signal for data communication.

In accordance with still yet another embodiment, a mobile terminal is presented. The mobile terminal includes a display unit configured to display a three-dimensional virtual reality image for a space in which devices are located, and a controller configured to set and display device icons corresponding to the devices in the a three-dimensional virtual reality image, and display a menu for controlling at least one device corresponding to at least one device icon selected from the device icons.

In accordance with another embodiment, a network system is presented. The network system includes at least one device located in a structure, a mobile terminal configured to set and display device icons corresponding to the at least one device on a screen that displays a three-dimensional virtual reality image of the structure, and display a menu for controlling a selected at least one device corresponding to a device icon selected from among the device icons, and a control server configured to be connected with the mobile terminal such that the mobile terminal can communicate with the selected at least one device and control the selected at least one device.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 9 is a plan view showing a first state of the mobile terminal according to FIG. 8.

FIG. 38 is an overview of display screens illustrating the case of utilizing a map image as a background image of the device map according to an embodiment of the present invention.

FIGS. 55A to 55C are flow charts illustrating an operation control method of a mobile terminal according to an embodiment of the present invention.

DETAILED DESCRIPTION OF THE PREFERRED EMBODIMENTS

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

Figure 1:
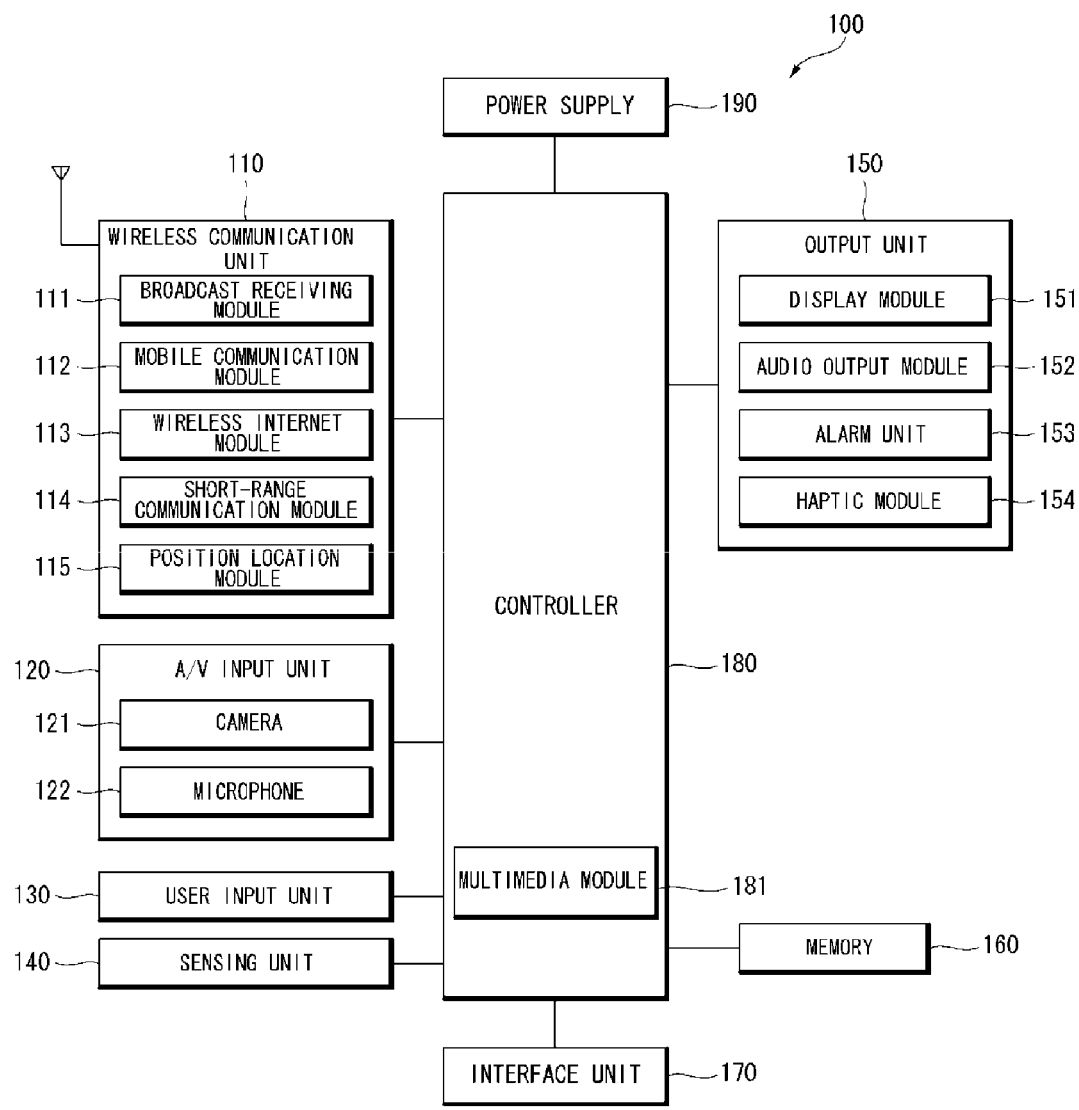
FIG. 1 is a block diagram of a mobile terminal according to an embodiment of the present invention.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wired communication unit. The wireless communication unit 110 and the wired communication unit may be commonly referred to as a communication unit.

Examples of broadcast associated information may include information associated with a broadcast channel, a broadcast program, a broadcast service provider, etc. For example, broadcast associated information may include an electronic program guide (EPG) of a digital multimedia broadcasting (DMB) system and an electronic service guide (ESG) of a digital video broadcast-handheld (DVB-H) system.

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include a digital multimedia broadcasting-terrestrial (DMB-T) system, a digital multimedia broadcasting-satellite (DMB-S) system, a digital video broadcast-handheld (DVB-H) system, a data broadcasting system known as media forward link only (MediaFLO®) and an integrated services digital broadcast-terrestrial (ISDB-T) system. The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wired Internet module in non-mobile terminals. The wireless Internet module 113 and the wired Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current three-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular, the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is opened or closed. The sensing unit 140 may also sense presence or absence of power provided by the power supply 190, presence or absence of a coupling or other connection between the interface unit 170 and an external device, etc.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a three-dimensional (3D) display.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wired/wireless headset port, an external charger port, a wired/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character and/or recognizing a picture drawing input performed on the touchscreen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
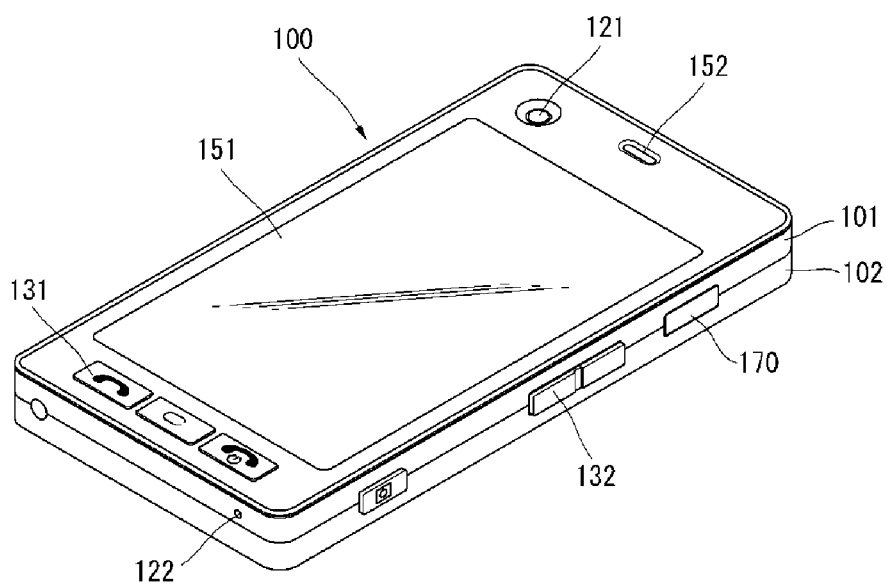
FIG. 2A is a front perspective view of the mobile terminal according to an embodiment of the present invention.

FIG. 2A is a front-view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of a metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
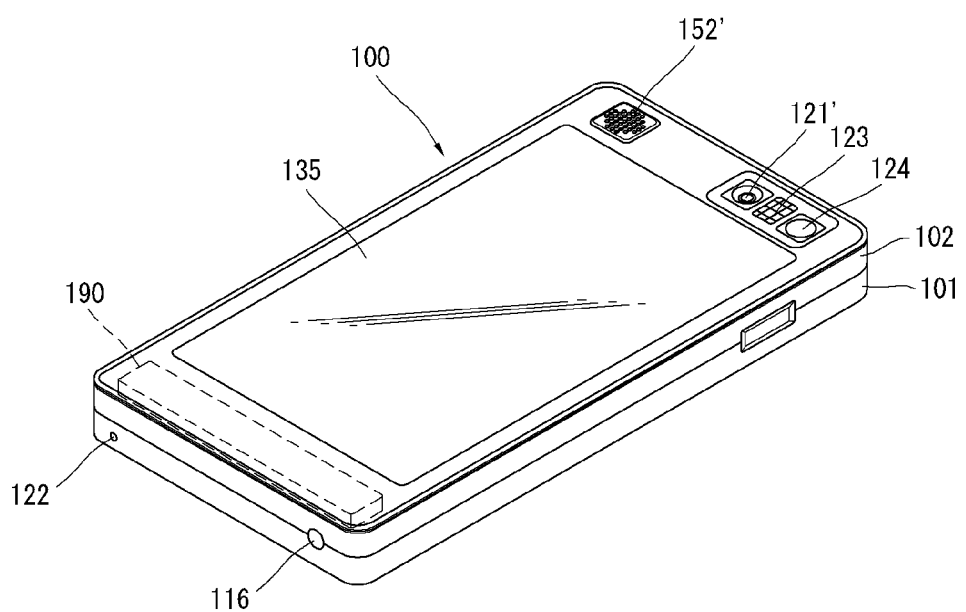
FIG. 2B is a rear perspective view of the mobile terminal according to an embodiment of the present invention.

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of a user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2B also shows a touchpad 135 for detecting a touch that is additionally provided on the rear case 102. The touchpad 135 may be configured as a light-transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touchscreen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

Figure 2C:
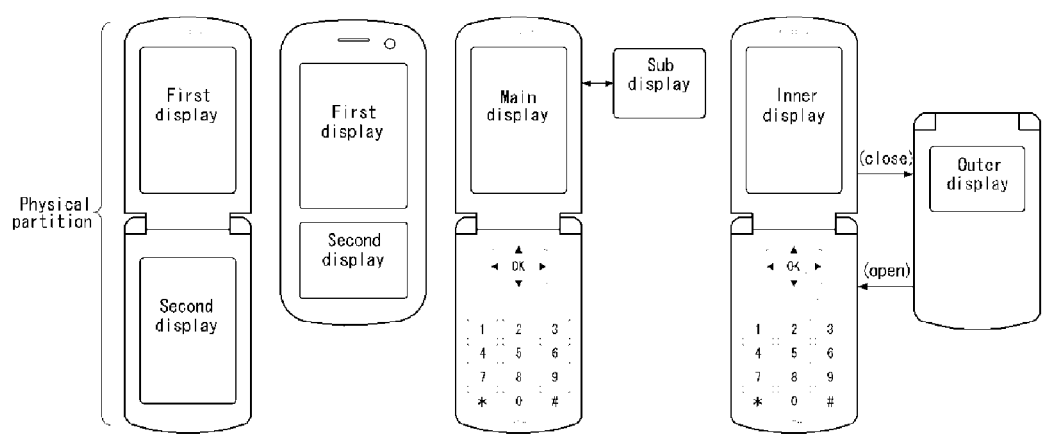
FIGS. 2C and 2D illustrate forms of the mobile terminal and display screens according to various embodiments of the present invention.
Figure 2D:
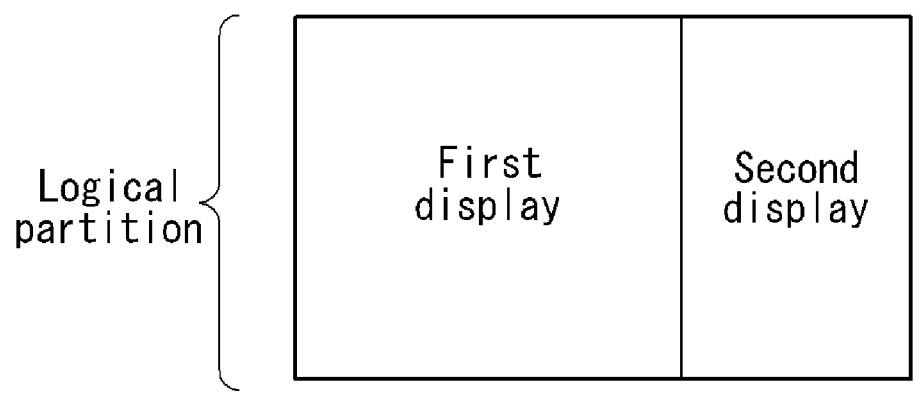

FIGS. 2C and 2D illustrate the mobile terminal 100 and the display module 151 according to various embodiments of the present invention.

Referring to FIG. 2C, the display module 151 can include a first display and a second display which are physically separated from each other. In a folder type or slide type mobile terminal having two bodies connected via a hinge or slide, the first display can be formed on the inner face or outer face of one of the bodies and the second display can be formed on the inner face or outer face of the other body. The sub display is separated from the mobile terminal and detachably combined with the mobile terminal body via an interface to display data from the mobile terminal 100.

The display module 151 can include first and second displays which are logically separated from each other in a display panel, as illustrated in FIG. 2D.

Figure 3:
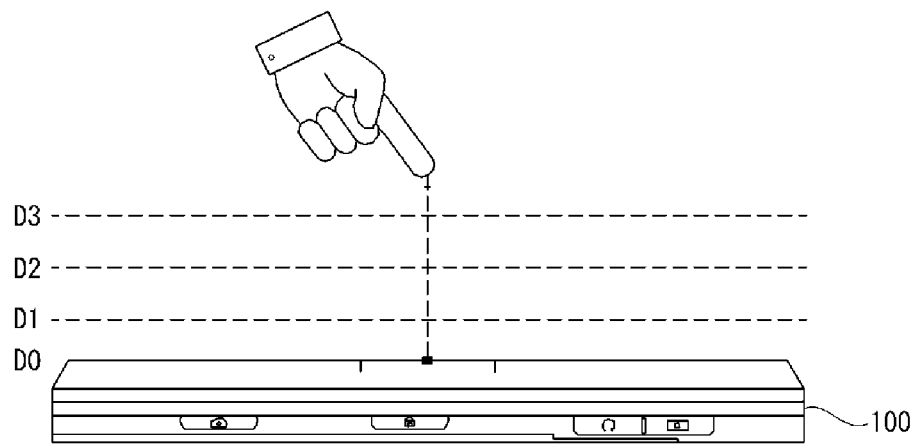
FIG. 3 illustrates a proximity depth of a proximity sensor.

FIG. 3 illustrates a proximity depth of the proximity sensor.

As shown in FIG. 3, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen, referred to as "proximity depth."

The distance in which the proximity signal is output when the pointer approaches the touch screen is referred to as a "detection distance." The proximity depth may be determined via a plurality of proximity sensors having different detection distances and comparing proximity signals respectively output from the proximity sensors.

FIG. 3 illustrates proximity sensors capable of sensing three proximity depths. Alternatively, proximity sensors capable of sensing less than three or more than three proximity depths may be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located beyond the distance D3 from the touch screen, it is recognized as a cancellation of a proximity touch.

Accordingly, the controller 180 can recognize the proximity touch as various input signals according to the proximity distance and proximity position of the pointer with respect to the touch screen and perform various operation controls according to the input signals.

Figure 4:
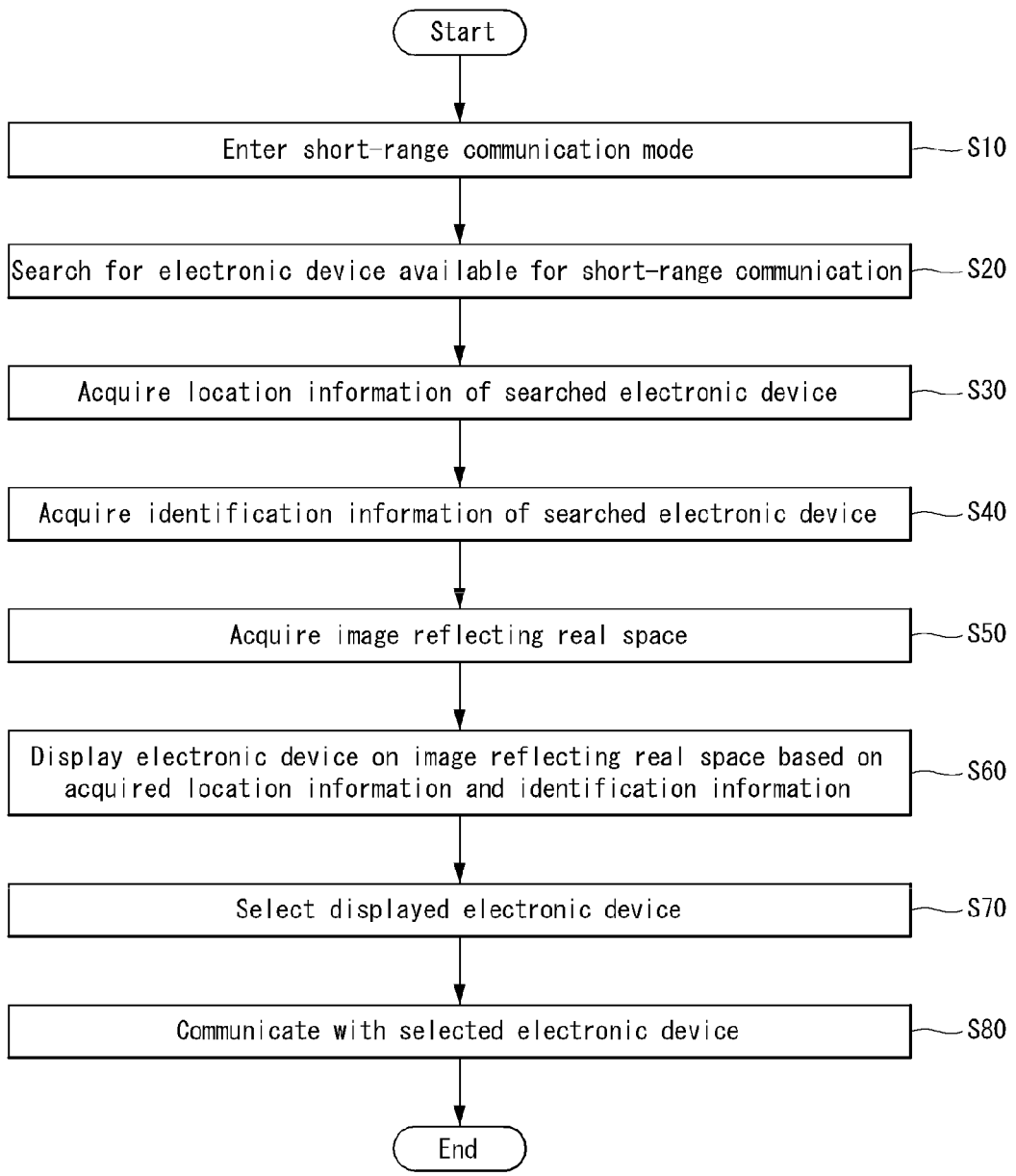
FIG. 4 is a flow chart illustrating the operation of an electronic device according to an exemplary embodiment of the present invention.

FIG. 4 is a flow chart illustrating the operation of an electronic device according to an exemplary embodiment of the present invention. The following description is an example where the electronic device is a mobile terminal. The electronic device is not limited to the mobile terminal and may be any electronic device such as a desktop computer or a television.

Figure 5:
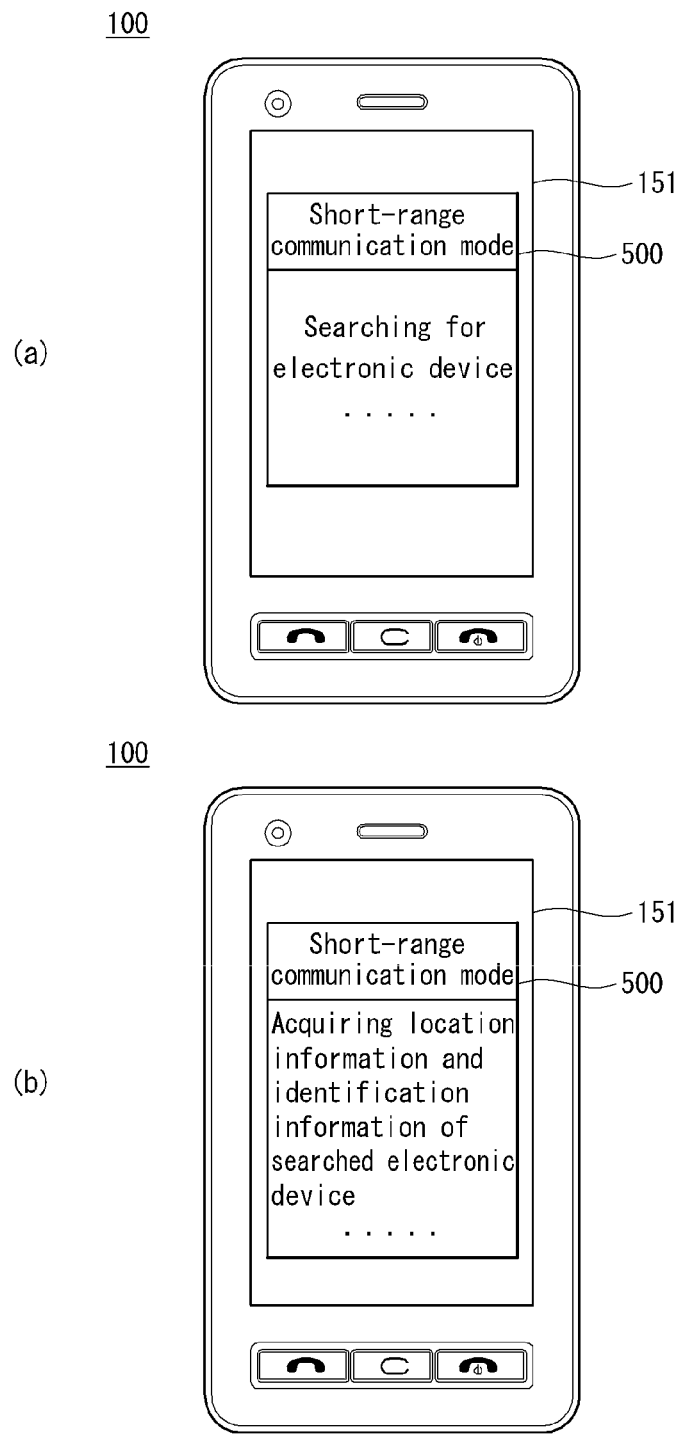
FIG. 5 is an overview of a screen display illustrating the process of operation of the mobile terminal of FIG. 4.

FIG. 5 is an overview of a screen display illustrating the process of the operation illustrated in FIG. 4.

The mobile terminal 100 according to an embodiment of the present invention may perform step S10 to enter a short-range communication mode. The short-range communication refers to data communication performed through one of infrared ray, ultrasonic waves, an RF signal, a WLAN, a UWB (Ultra WideBand), ZigBee™, NFER, Bluetooth™, RFID, image recognition, an ON/OFF switch, or any combination thereof.

The mobile terminal 100 can communicate with a different electronic device using short-range communication when the mobile terminal 100 enters the mode for short-range communication. Additionally, the mobile terminal 100 may track the location of a desired object without having to use a GPS satellite or a mobile communication network. In this example, however, according to circumstances the mobile terminal 100 may also use the position-location module 115, in addition to location tracking employing short-range communication. Through the step S10 of entering the short-range communication mode, the mobile terminal 100 is put to a state for utilizing the short-range communication module 114. This will be described in detail as follows.

The method of recognizing a location via an infrared ray may be accomplished by installing an infrared sensor on a ceiling of an indoor space and attaching an active badge or an infrared generator, on the user. The active badge retains a unique recognition number and may periodically transmit a recognition number. The transmitted recognition number may be recognized by the installed infrared sensor so as to determine the location of a particular user.

The method of recognizing a location via ultrasonic waves may be accomplished by measuring the distance from a first point to a second point. Relatively accurate location tracking can be performed based on the time difference of transmission of ultrasonic waves. With the distance between two points known, a desired location can be recognized by using trigonometry.

The method of recognizing a location via an RF signal may be accomplished by recognizing a location by using the strength of an RF signal received from an access point (AP) or a transmission delay of an RF signal.

The method of recognizing a location via a UWB (ultra-wideband) may be accomplished by using an extremely short impulse directly for communication. The use of a UWB can omit a modulation/demodulation function used in the conventional wireless communication.

The method of recognizing a location via image recognition may be accomplished by recognizing the location of the user by analyzing an image which has been captured by using a three-dimensional (3D) camera.

The method of recognizing a location via an ON/OFF switch may be accomplished by attaching an ON/OFF switch and an ON/OFF sensor to various products having an ON/OFF function such as a power switch, home appliances, or an audio device. When the user uses these products, the ON/OFF switch and sensor may operate to transmit a signal to a server. Upon receiving the transmitted signal, the server may recognize the location of the user based on the received signal. In addition, the server may calculate a tracking orbit with respect to a location movement by time slots of the user.

The method of recognizing a location via ZigBee™ may be accomplished by a ZigBee sensor network. ZigBee™ is a low-speed wireless PAN technique in conformity with the IEEE 802.15.4 standard. ZigBee™ may operate in a low power environment compared with Bluetooth™, and because it supports maximum 65536 node connections, it is advantageous for a network establishment.

A location tracking system using the ZigBee sensor network may use a distributed management method or a centralized management method. The distributed management method allows a mobile node to recognize its location upon receiving a nearby signal strength or information. This method may be advantageous in the aspect of network management because it does not cause a load to the overall network. However, because all computation processes are performed in the mobile node, the mobile node needs to have improved performance. Also, there is a limitation in that the network cannot recognize the location of a person or an object in motion and only the user of the mobile node can recognize its location. The centralized management method refers to a method in which nodes centering on a single ZigBee node, or a central node, transmit their gathered information to a location information server via the central node. The server can gather and manage location information, and this method is advantageous in that it can be easily implemented. But, disadvantageously, a traffic load is likely to increase because data is concentrated to one place.

In the centralized management method, a mobile node ID and a generated packet counter field may exist in a data field transmitted by a mobile node in order to distinguish each mobile node. A sensor node may receive a mobile node ID and a periodically generated packet counter from each mobile node to detect the location of each mobile node at a particular time. After the sensor node detects the location of a mobile node, if a duration in which the location of the mobile node is transmitted to a server via a network is short, the time at which the mobile node was actually detected and the time at which the server receives it may be substantially the same. The sensor node receives information of mobile nodes there-around and transfers the information to a parent node. Because the sensor node processes only the information of the nearby mobile nodes, traffic of the sensor node is not large. In this example, if the sensor node receives a plurality of child nodes, traffic of the sensor node would possibly increase. However, data transferred from the plurality of child nodes may be incorporated and transmitted to thus reduce the amount of traffic load.

When the mobile terminal enters the short-range communication mode, it may search for a different electronic device available for short-range communication (S20).

As described above, when the short-range communication module 114 of the mobile terminal 100 is available, it may search for a different electronic device within its operational range. This process may be performed as the short-range communication module 114 transmits a communication connection request (SPP connect) signal.

As illustrated in FIG. 5(*a*), when searching for a different electronic device, a first pop-up window 500 indicating that an electronic device is being searched may be displayed on the display module 151 of the mobile terminal 100.

When searching for an electronic device available for short-range communication, the mobile terminal 100 may acquire location information of the searched electronic device (S30) and identification information of the searched electronic device may (S40). Furthermore, the mobile terminal 100 may acquire an image reflecting a real space (S50).

The location information may include at least one of the distance, height, and direction of the searched electronic device. The location information of the searched electronic device may be acquired by using a real time locating system (RTLS) technique. The RTLS refers to a technique capable of tracking the location between electronic devices in a two-dimensional or three-dimensional space by using signal strength, an arrival angle, waveforms, and a time duration in which radio waves generated from a particular reference point reach a different reference point. The RTLS may acquire location information through an angle of arrival (AoA) method for calculating a location by using a direction angle between an RF signal transmission tag and a reception reader, a time of arrival (ToA) method for obtaining the distance between a tag and a reader by specifying a time duration in which the RF signal transmitted by the tag reaches a reception reader, a time-to-difference of arrival (TDoA) method for obtaining the difference in time at which RF signals transmitted by a tag reaches three or four readers, or a time of flight (ToF) method for calculating a location by measuring a lapse time of a signal transmitted between a tag and a reader.

The identification information may be at least one of a communication state, a communication available speed, or a remaining memory capacity of the searched electronic device. The name of the searched electronic device may be set by the user. Namely, when the location information is information regarding a location of the searched electronic device in two-dimensional or three-dimensional space, the identification information may be detailed information regarding the electronic device. The acquired identification information may be displayed together with the electronic device.

Acquiring the location information and the identification information may be performed on the electronic device determined to be available for short-range communication through the searching process.

The real space refers to a three-dimensional space taken by an entity. The image of the real space is a real image or a virtual image. For example, an image expressed two-dimensionally may not be a space taken by an entity in that it does not have a spatial, or three-dimensional, sense but may be considered to reflect the actual space due to the similarity with the real space.

The image reflecting the real space may be acquired in real time via the camera 121. Namely, the image is an image obtained in real time as the user captures an image of the area with the camera 121. Additionally, the image reflecting the real space may be an image displayed on the display module 151 after being obtained from the memory 160.

Specifically, the image, which was previously captured by the user and stored in the memory 160, is loaded to be used. Furthermore, the image reflecting a real space may be a virtual image. Specifically, the virtual image may be an image portraying a two-dimensional or three-dimensional space through graphic processing.

When the image reflecting a real space is acquired, the mobile terminal 100 may display the electronic device on the image reflecting the real space based on the acquired location information and the identification information (S60).

When the electronic device is displayed, the displayed device may be selected (S70) and the mobile terminal 100 may then communicate with the selected device (S80). The displayed electronic device may be selected via the user input unit 130.

Communication with the selected device may entail exchanging data with the selected electronic device. For example, a music file may be transmitted to an audio device, or a picture file may be transmitted to an electronic frame.

The user may select and communicate with the displayed electronic device via a single motion. For example, when the user wants to transmit a picture file to an electronic frame, the user may wobble or shake the mobile terminal 100 toward the electronic frame to transmit the picture file from the mobile terminal 100 to the electronic frame. Alternatively, the user may make a gesture of moving the mobile terminal 100 to the vicinity of the electronic frame to transmit the picture file from the mobile terminal 100 to the electronic frame.

Hereinafter, electronic devices according to various embodiments of the present invention will now be described in more detail with reference to the relevant drawings.

Figure 6:
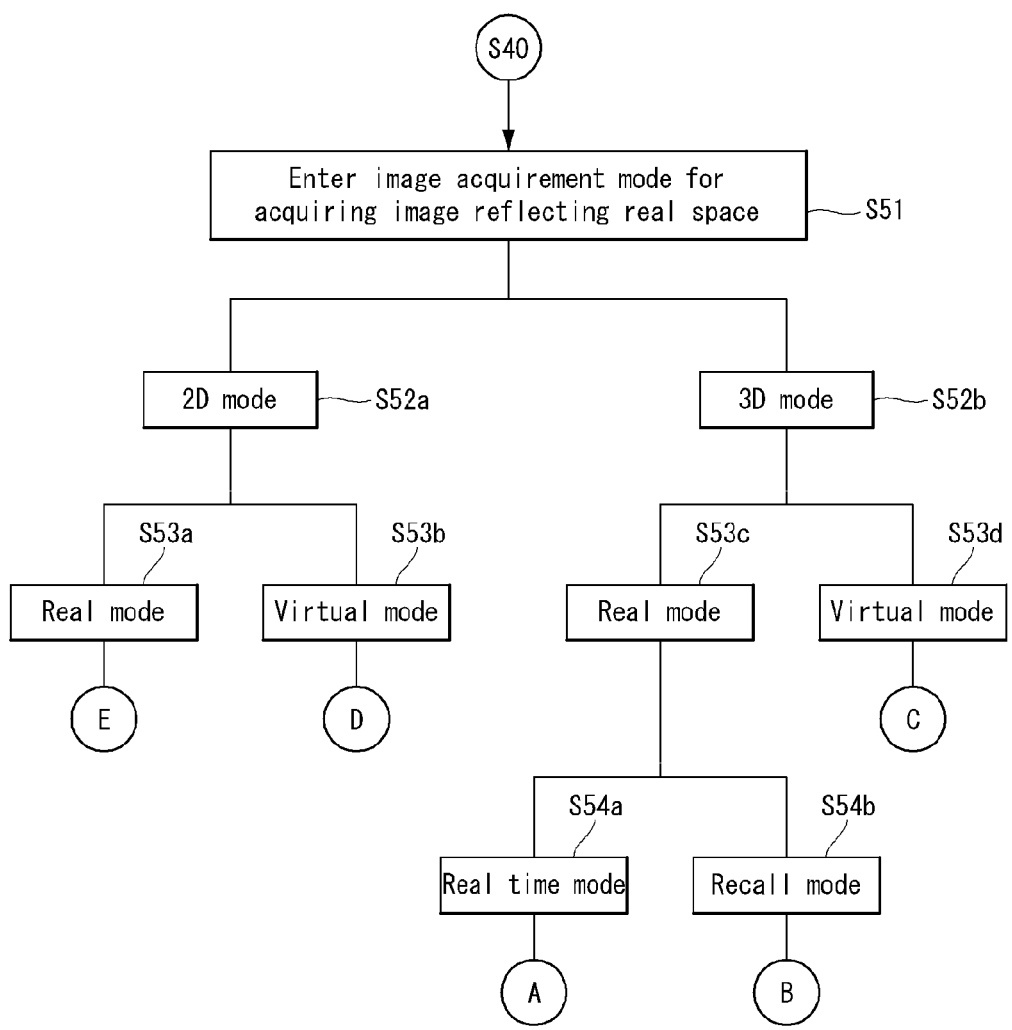
FIG. 6 is a flow chart illustrating the process of acquiring an image reflecting an actual space as illustrated in FIG. 4.

FIG. 6 is a flow chart illustrating the process of acquiring an image reflecting a real space.

As shown in FIG. 6, the mobile terminal 100 may enter an image acquirement mode for acquiring an image reflecting a real space (S51). The real space image acquirement mode may be classified into a two-dimensional (2D) mode (S52*a*) or a three-dimensional (3D) mode (S52*b*). The 2D mode (S52*a*) refers to a state in which an image is displayed on a 2D plane, and the 3D mode (S25*b*) refers to a state in which an image is displayed in a 3D space.

The 2D mode (S52*a*) may be classified into a real mode (S53*a*) or a virtual mode (S53*b*). The real mode (S53*a*) refers to a state in which an image captured by the camera 121 is displayed, and the virtual mode (S53*b*) refers to a state in which an image is graphically simulated.

The 3D mode (S52*b*) may be classified into a real mode (S53*c*) and a virtual mode (S53*d*).

The real mode (S53*c*) may be classified into a real time mode (S54*a*) or a recall mode (S54*b*). The real time mode (S54*a*) refers to a state in which an image currently captured by the camera 121 is displayed. The recall mode (S54*b*) refers to a state in which a previously captured image is displayed.

Figure 7:
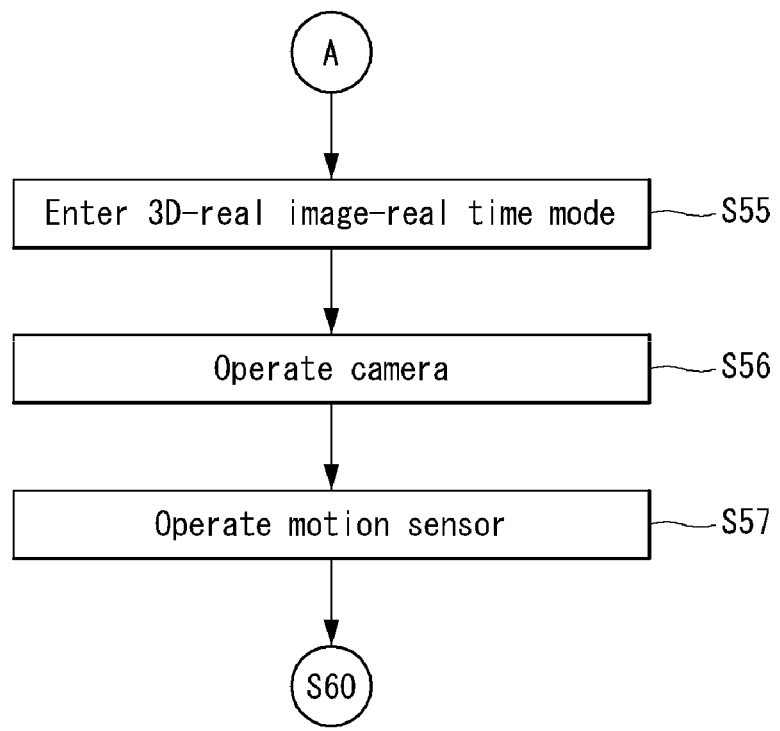
FIG. 7 is a flow chart illustrating a three-dimensional (3D) real image real time mode according to an embodiment of the present invention.

FIG. 7 is a flow chart illustrating a three-dimensional (3D) real image real time mode.

As shown in FIG. 7, when the mobile terminal enters the 3D real image real time mode in step S55, the camera may be operated in step S56.

A motion sensor may operate in step S57. The motion sensor may be included in the mobile terminal 100. When the user moves the position of the mobile terminal 100 by wobbling or shaking the mobile terminal, the motion sensor may recognize the corresponding operation and generate a motion signal.

Figure 8:
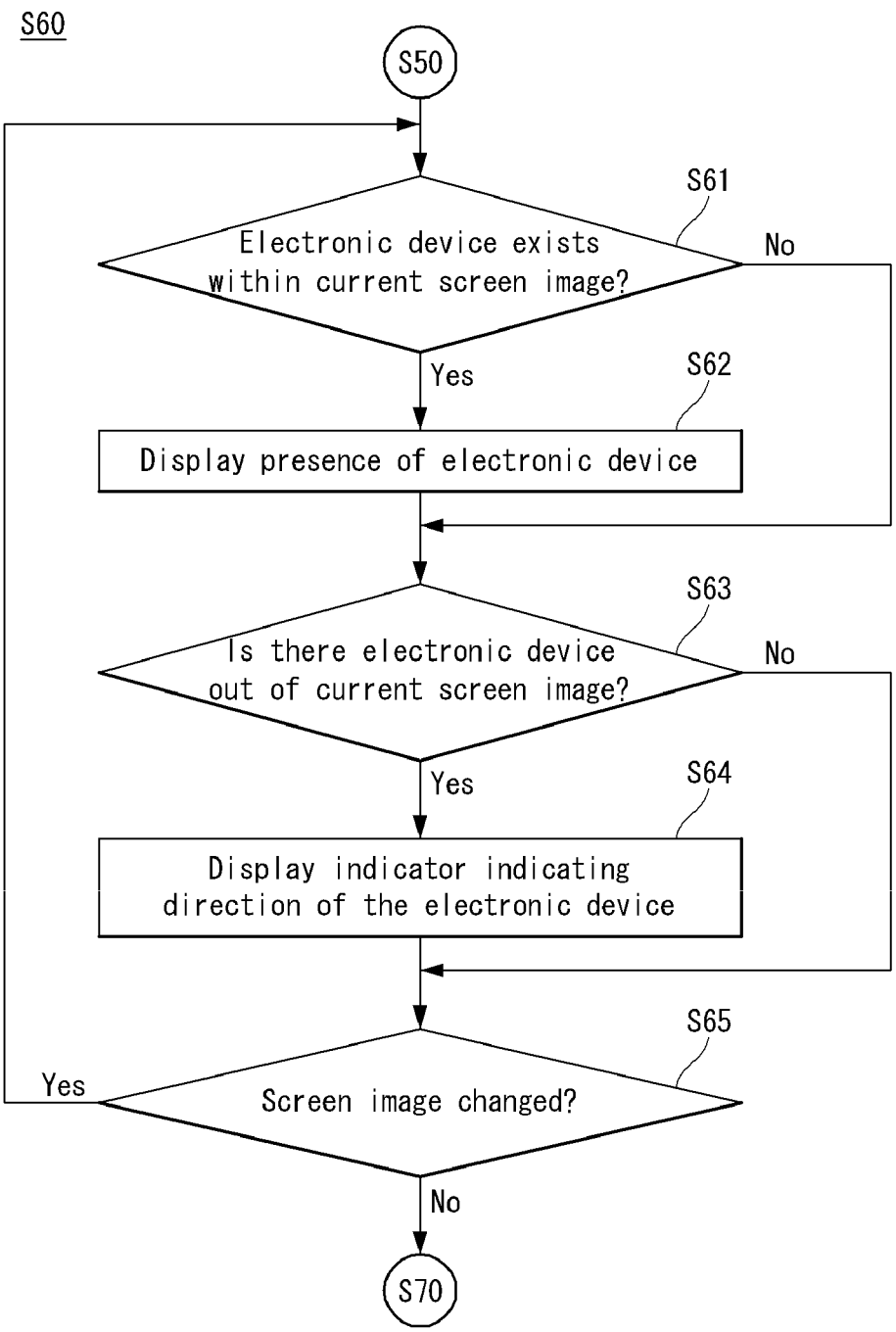
FIG. 8 is a flow chart illustrating the process of displaying an electronic device on an image of a real space according to an embodiment of the present invention.
Figure 10:
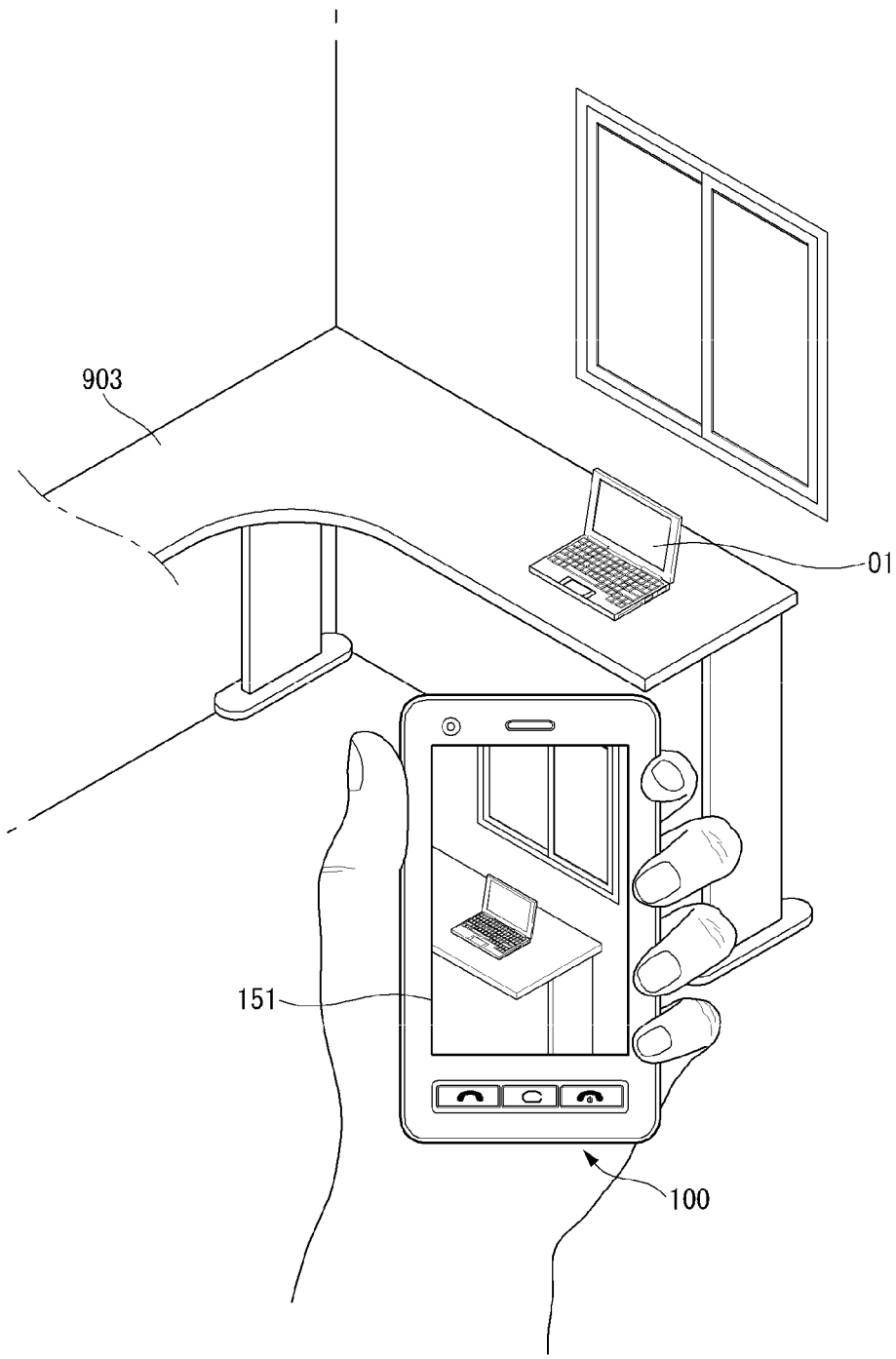
FIG. 10 illustrates a display of the mobile terminal in the first state according to FIG. 9.
Figure 12:
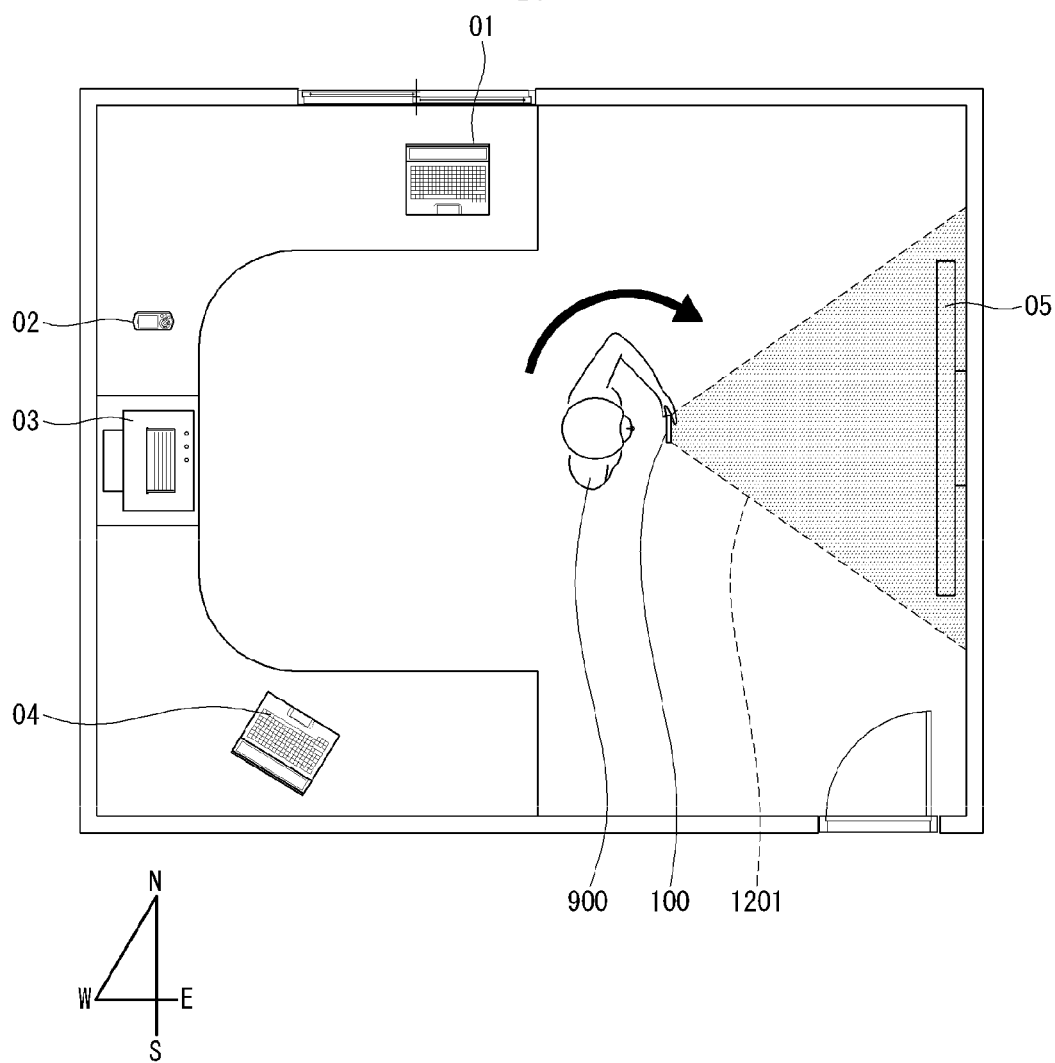
FIG. 12 is a plan view illustrating a second state of the mobile terminal according to FIG. 8.
Figure 13:
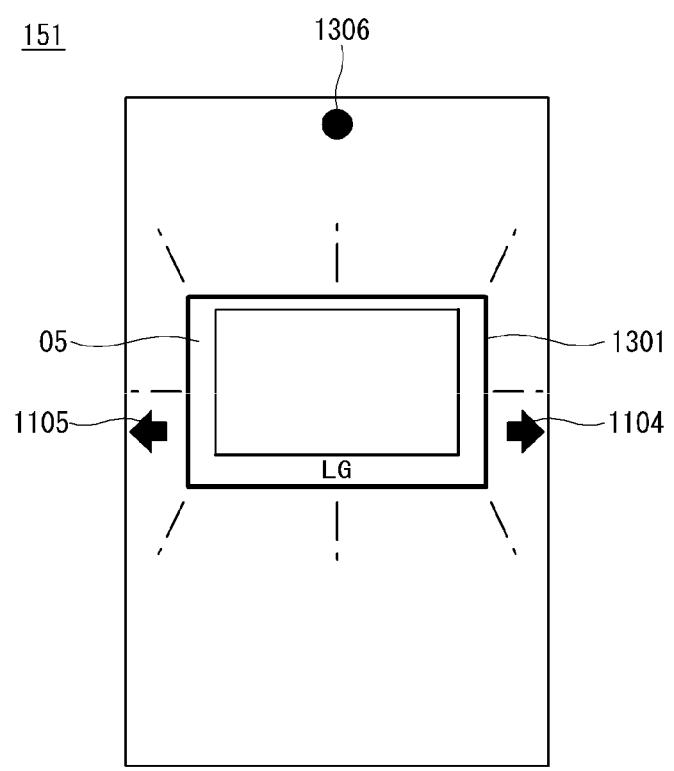
FIG. 13 illustrates a display method of the display module of the mobile terminal in the second state according to FIG. 12.

FIG. 8 is a flow chart illustrating the process of displaying an electronic device on an image of a real space. FIG. 9 is a plan view showing a first state of the mobile terminal according to FIG. 8. FIG. 10 illustrates a display of the mobile terminal in the first state according to FIG. 9. FIGS. 11A to 11E illustrate various display methods of a display module of the mobile terminal in the first state according to FIG. 9. FIG. 12 is a plan view illustrating a second state of the mobile terminal according to FIG. 8. FIG. 13 illustrates a display method of the display module of the mobile terminal in the second state according to FIG. 12.

As shown in these drawings, displaying of the electronic device on an image reflecting a real space based on acquired location information and identification information (S60 in FIG. 4) may include determining whether or not an electronic device exists within the current screen image (S61).

As shown in FIG. 9, the user 900 in an indoor space 901 may operate the camera 121 of the mobile terminal 100. When the camera 121 is operated, an image within an image capture area 902 may be displayed on the display module 151 (FIG. 10). As shown in FIGS. 9 and 10, it is noted that, in a current state in which the mobile terminal 100 is in the first state, a first notebook computer O1 is positioned within the image capture area 902.

The electronic device may be displayed when the electronic device is present (S62).

The displaying of the electronic device in step S62 refers to displaying the electronic device such that it is distinguished from other objects that may be included in the first image capture area 902. Specifically, as illustrated in FIG. 10, a desk 903 which is different from the first notebook computer O1 is also displayed on the display module 151. In this example, there is a need to indicate that the first notebook computer O1 is an electronic device available for short-range communication.

Figure 11A:
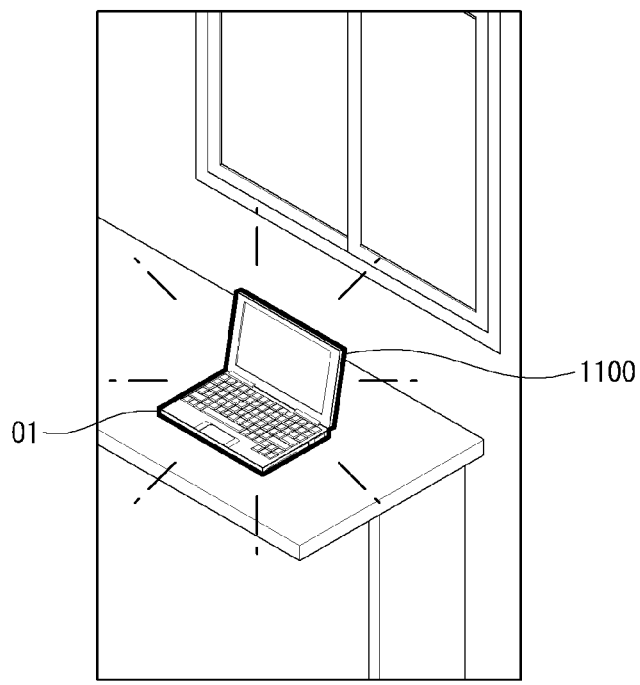
FIGS. 11A to 11E illustrate various display methods of a display module of the mobile terminal in the first state according to FIG. 9.
Figure 11B:
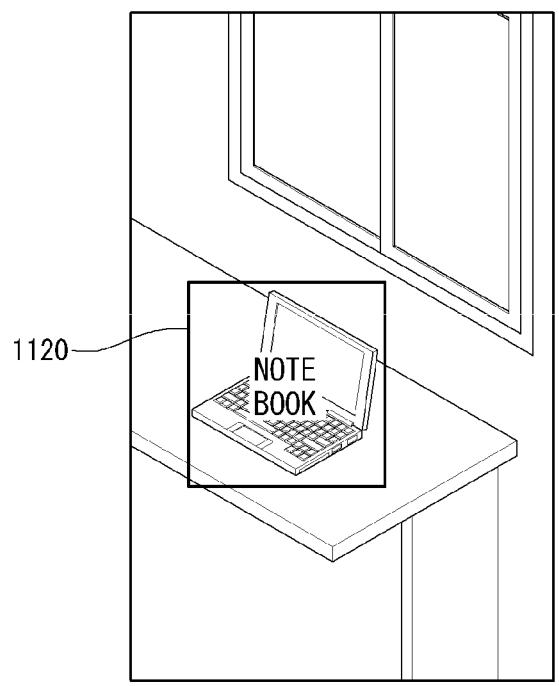
Figure 11C:
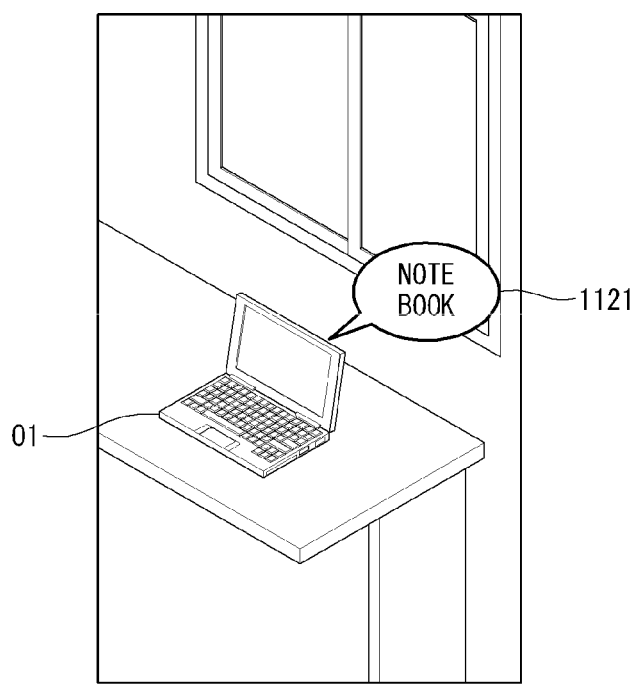
Figure 11D:
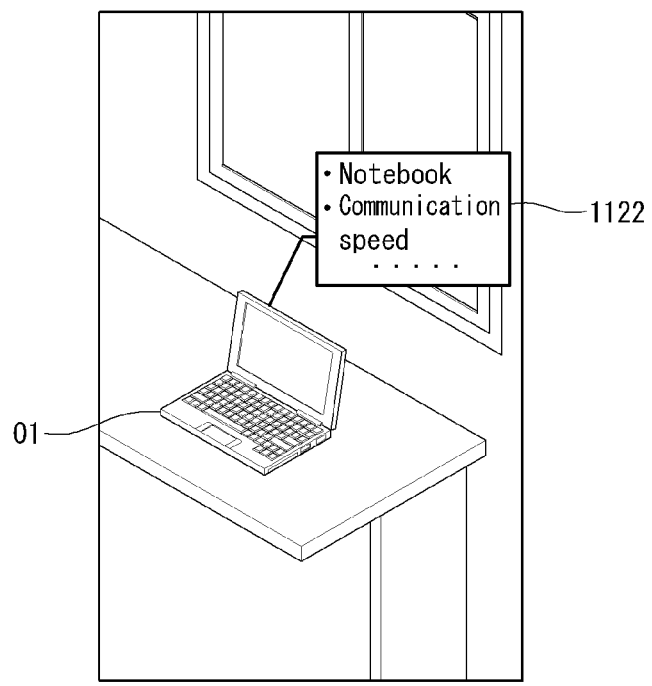

Thus, as illustrated in FIG. 11A, an emphasis line 1100 outlining the first notebook computer O1 may be displayed. Alternatively, as illustrated in FIG. 11B, a first icon 1120 may be displayed. Alternatively, as shown in FIG. 11C, a second icon 1121 may be displayed near the first notebook computer O1. Furthermore, according to another embodiment, as shown in FIG. 11D, a third icon 1122 indicating identification information such as the name or a communication speed of the device may be displayed in the vicinity of the first notebook computer O1.

Meanwhile, the mobile terminal may determine if there is an electronic device not displayed in the current screen image (FIG. 8 S63).

Figure 11E:
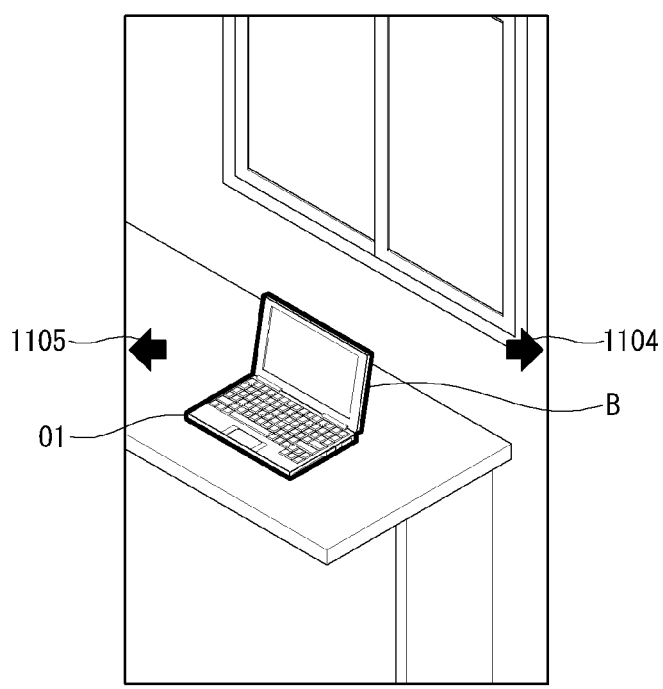

As shown in FIG. 9, it is noted that in addition to the first notebook computer O1, a mobile phone O2, a printer O3, a second notebook computer O4, and a TV O5 are disposed around the user 900. Indicators 1104 and 1105 may be displayed at the left and right sides of the screen if all of the other electronic devices are available for short-range communication (FIG. 11E).

The indicators 1104 and 1105 indicate the presence of the other electronic devices available for communication outside the current screen range. The user 900 may move the mobile terminal 100 to the left or right to find an electronic device, wherein the indicators 1104 and 1105 demonstrate that other electronic devices are present in the area.

FIG. 12 is a plan view illustrating a second state of the mobile terminal according to FIG. 8. FIG. 13 illustrates a display method of the display module of the mobile terminal in the second state according to FIG. 12.

As shown in FIG. 12, in the second state, the mobile terminal 100 may capture an image of the second image capture area 1201.

As shown in FIG. 13, the TV O5 is displayed on the display module 151, and an emphasis line 1301 outlining the TV O5 is displayed. Also, the indicators 1104 and 1105 are displayed at the left side and right side, and an indicator 1306 is also displayed at an upper portion of the display module 151. The upper indicator 1306 indicates the presence of an electronic device available for communication behind the user 900.

Figure 14:
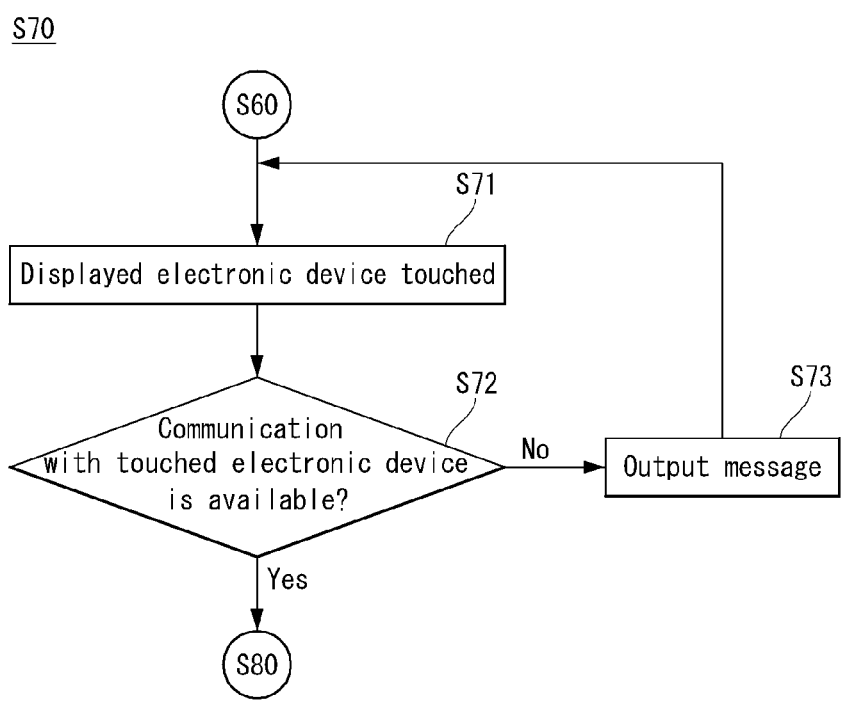
FIG. 14 is a flow chart illustrating the process of selecting an electronic device according to FIG. 4.
Figure 15:
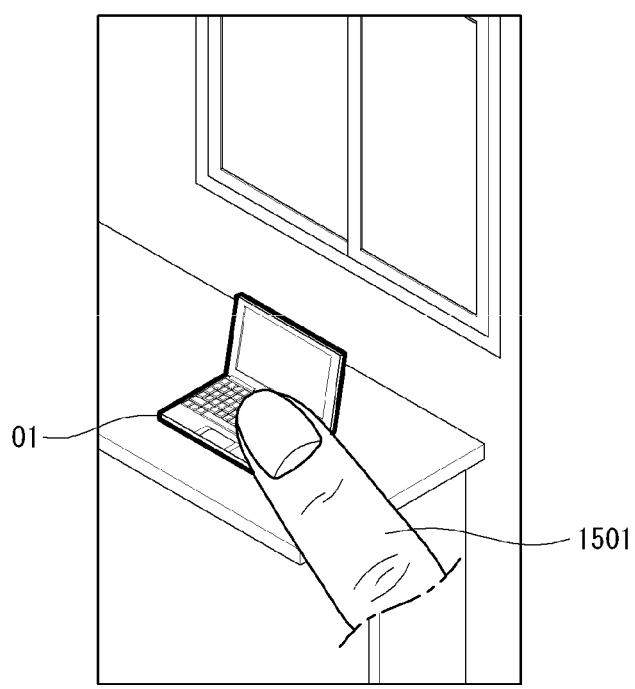
FIG. 15 illustrates a display of the electronic device according to FIG. 14.

FIG. 14 is a flow chart illustrating the process of selecting an electronic device according to FIG. 4. FIG. 15 illustrates a display of the electronic device according to FIG. 14.

As shown in FIGS. 14 and 15, the selecting of the displayed electronic device (S70 in FIG. 4) may include applying a touch to the displayed electronic device (S71).

The displayed electronic device may be a device such as the first notebook computer O1 (FIG. 15).

When the electronic device is selected by the user, such as by touching with the user's finger 1501, the mobile terminal 100 may determine if communication with the touched electronic device is available (S72).

Determining if communication with the selected electronic device is available (S72) is different from the searching for an electronic device available for short-range communication (S20). Specifically, searching for an electronic device acquires location information, while determining if communication is available determines whether the specific device may be communicated with.

A message may be output when communication with the selected electronic device is not available (S73).

Figure 16A:
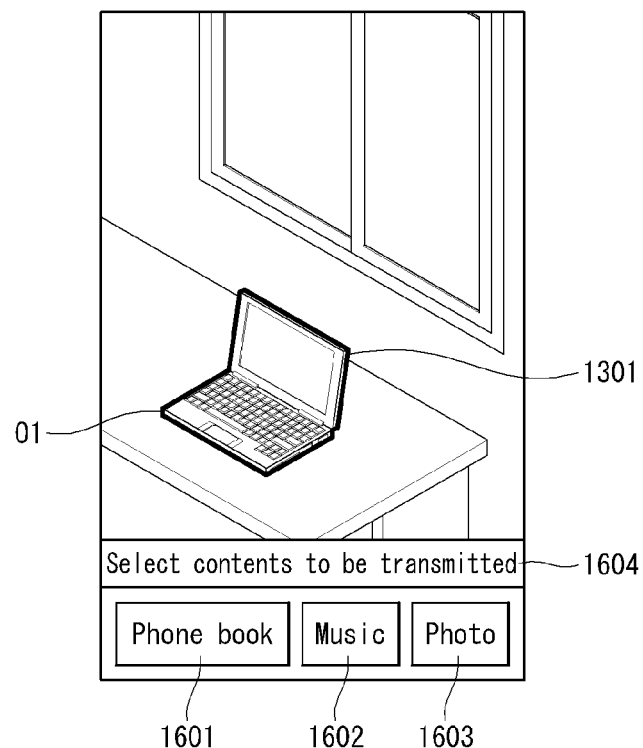
FIGS. 16A to 16C illustrate the process of communicating with the electronic device according to FIG. 4.
Figure 16B:
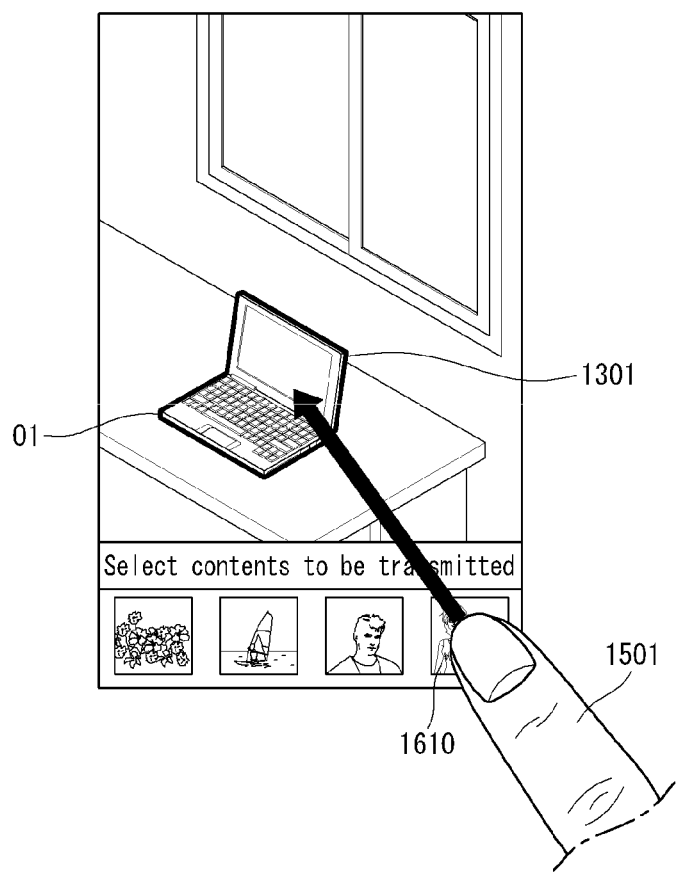
Figure 16C:
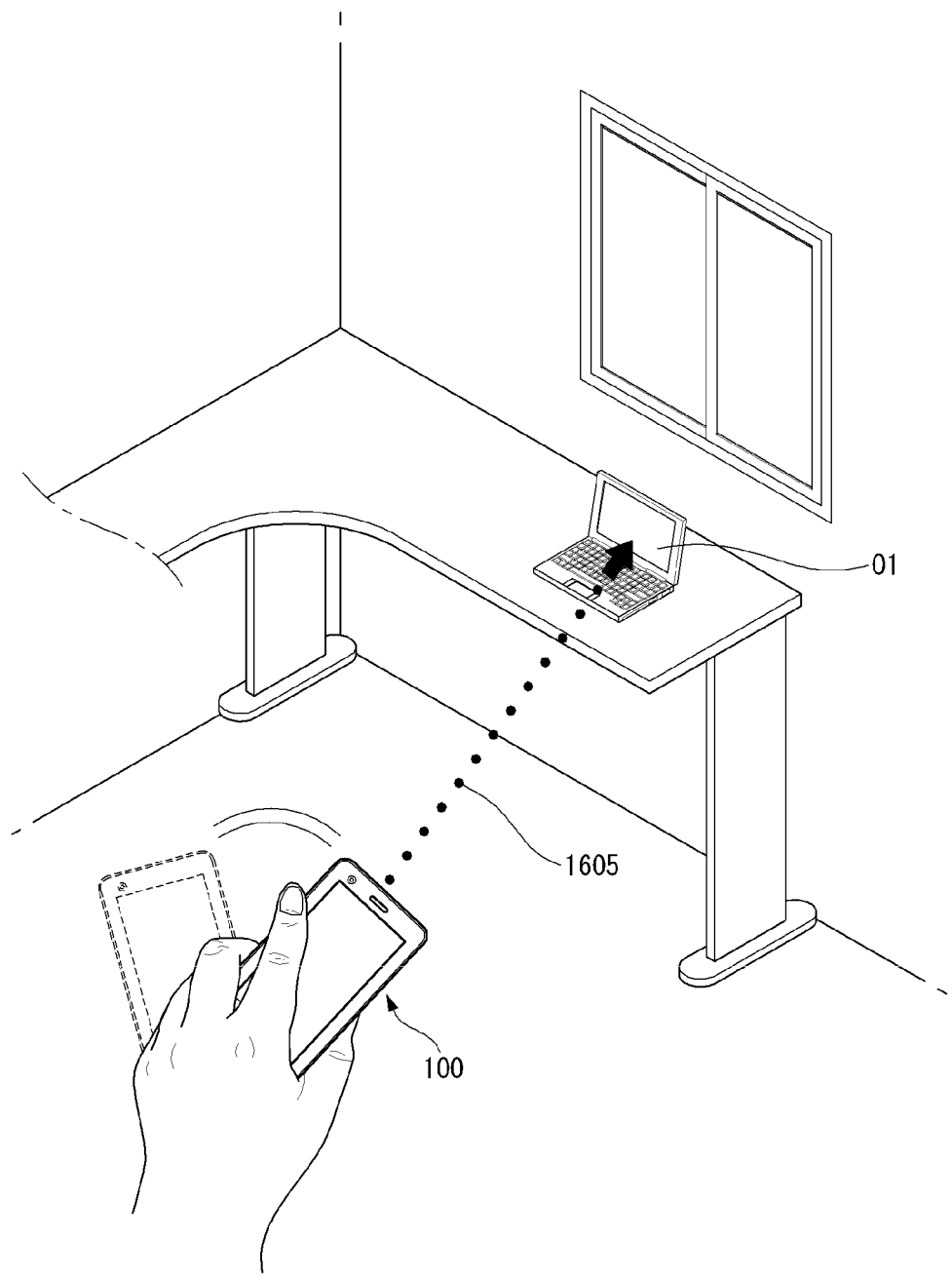

FIGS. 16A to 16C illustrate the process of communicating with the electronic device according to FIG. 4.

The first notebook computer O1 may be displayed on the display module 151. Meanwhile, a pop-up window 1604 may be displayed at a lower end of the display module to allow for a selection of content to be transmitted. Buttons may be provided to select at least one of content including phone book 1601, music 1602, and photo 1603. The user may select a button for content desired to be transmitted.

As shown in FIG. 16B, when the user selects the photo 1603, various photo content of the mobile terminal 100 may be displayed. The user may drag and drop a specific photo 1610 to the first notebook computer O1 displayed on the display module 151. In other words, the content may be moved to the different electronic device via dragging-and-dropping the image displayed on the display module 151.

As shown in FIG. 16C, after selecting the data desired to be transmitted, the user may wobble or shake the mobile terminal 100 in a direction 1605 of the target electronic device to which data is to be transferred. Specifically, the content may be moved to the different device via movement which does not involve touching the display module 151.

Figure 17:
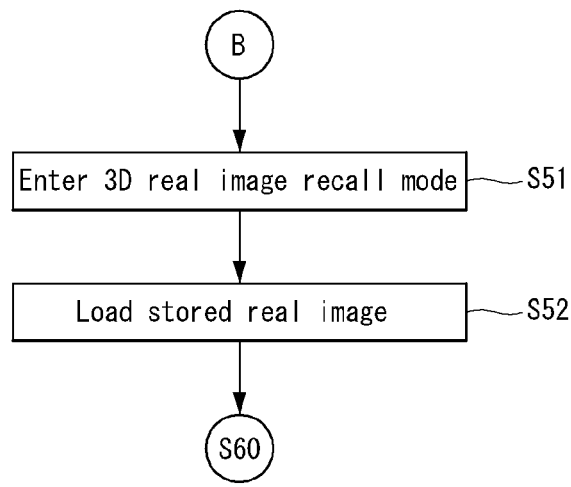
FIG. 17 is a flow chart regarding a 3D real image recall mode according to FIG. 6.
Figure 18:
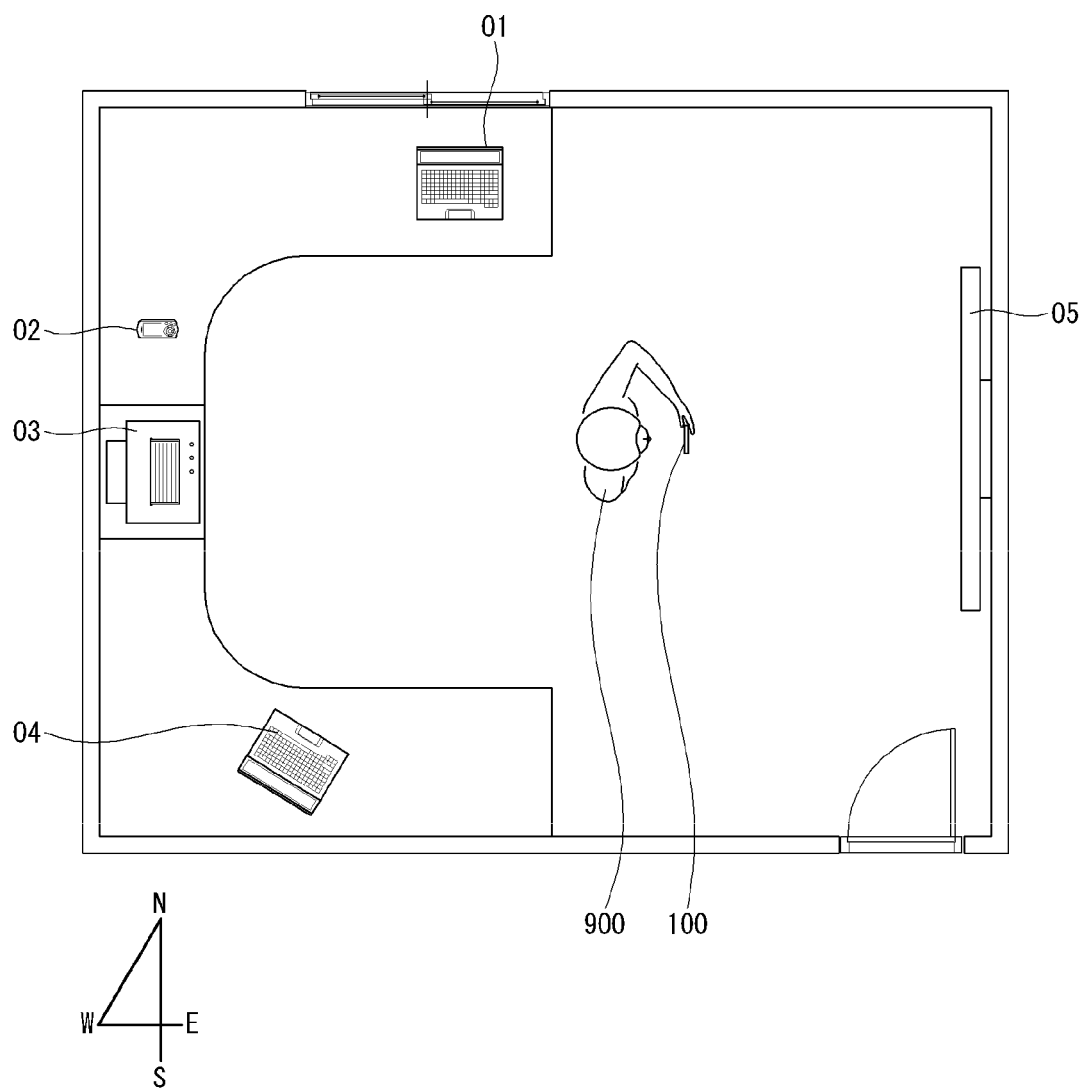
FIG. 18 is a plan view illustrating a state of the mobile terminal according to FIG. 17.
Figure 19A:
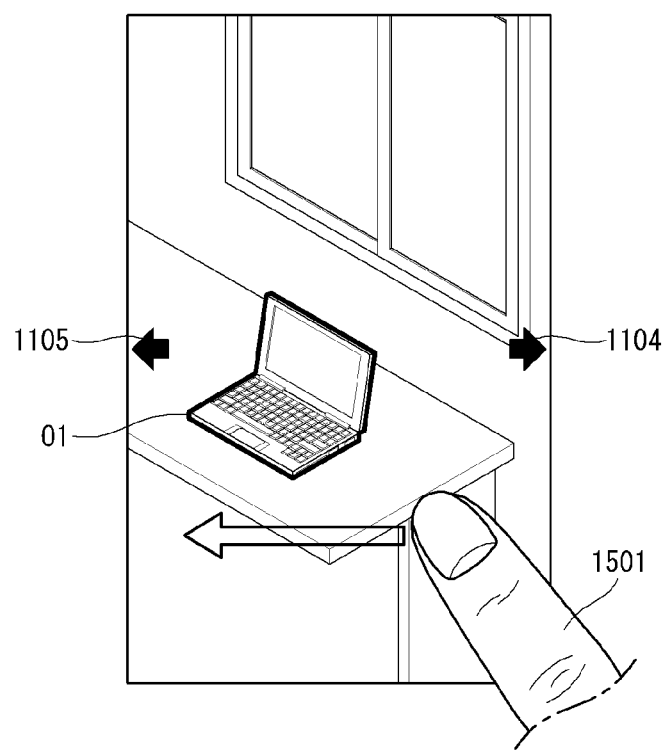
FIGS. 19A and 19B illustrate the operation of the mobile terminal according to FIG. 17.
Figure 19B:
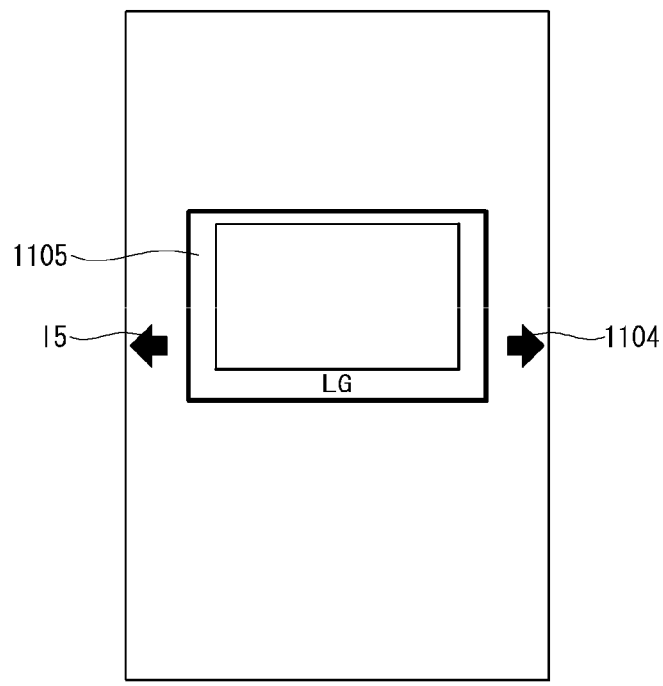

FIG. 17 is a flow chart regarding a 3D real image recall mode according to FIG. 6. FIG. 18 is a plan view illustrating a state of the mobile terminal according to FIG. 17. FIGS. 19A and 19B illustrate the operation of the mobile terminal according to FIG. 17.

As shown in these drawings, the acquiring of an image reflecting a real space (S50 in FIG. 4) may include entering a 3D real image recall mode (S51).

When the mobile terminal enters the 3D real image recall mode, a stored real image may be loaded (S52).

As shown in FIG. 18, the user 900 may hold the mobile terminal 100 toward the TV O5. In the recall mode, an image which was previously stored in the mobile terminal 100, rather than a current image, is used; the current location of the user 900 does not affect a display state of the mobile terminal 100.

As shown in FIG. 19A, the first notebook computer O1 may be displayed on the display module 151 regardless of the location of the user 900. Also, the left and right indicators 1104 and 1105 may be displayed on the display module 151. Specifically, the user may drag the display module 151 with his finger 1501 from the right to the left.

FIG. 19B illustrates the result of the screen image scrolling performed in FIG. 19A. As shown, the TV O5, which has been at the right side of the first notebook computer O1 (FIG. 19A), is displayed according to the user's scrolling of the screen image.

Figure 20:
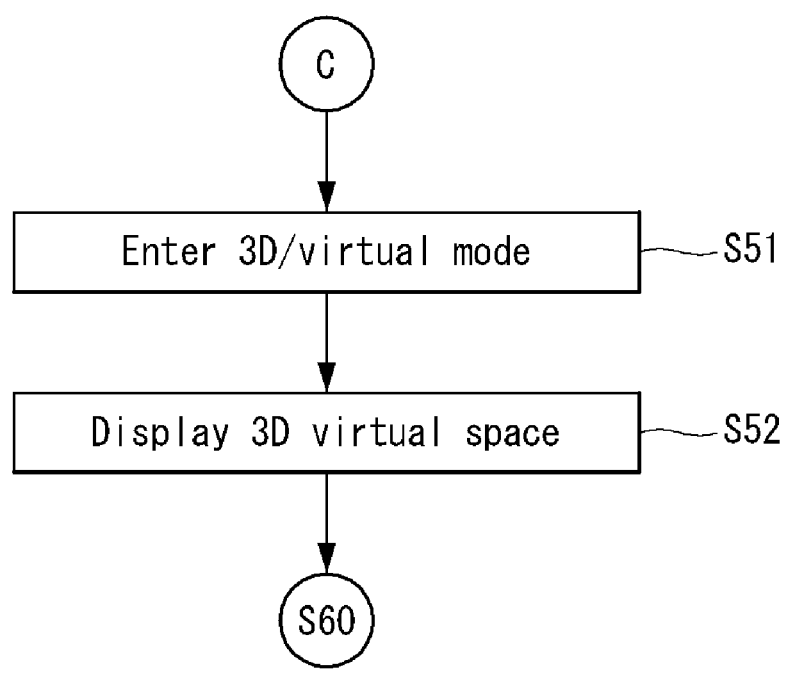
FIG. 20 is a flow chart regarding a 3D virtual mode according to FIG. 6.
Figure 21A:
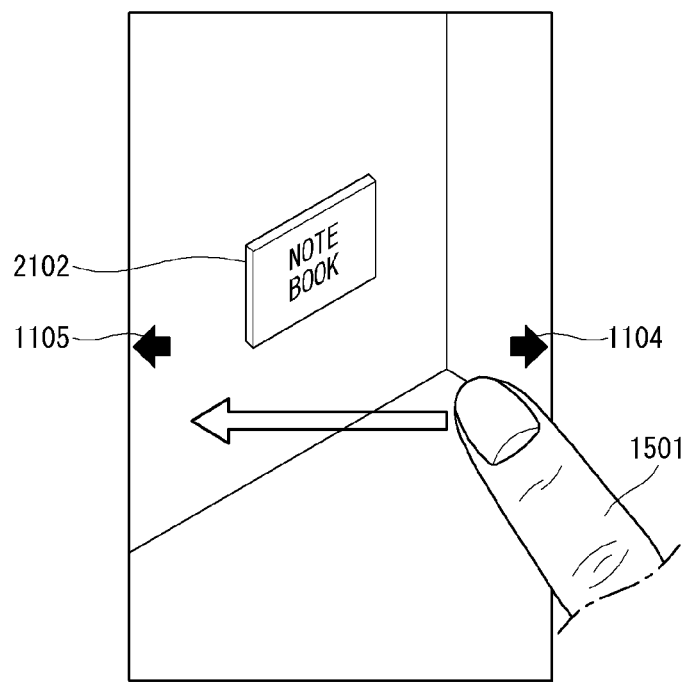
FIGS. 21A and 21B illustrate an operational process of a mobile terminal according to an exemplary embodiment of the present invention.
Figure 21B:
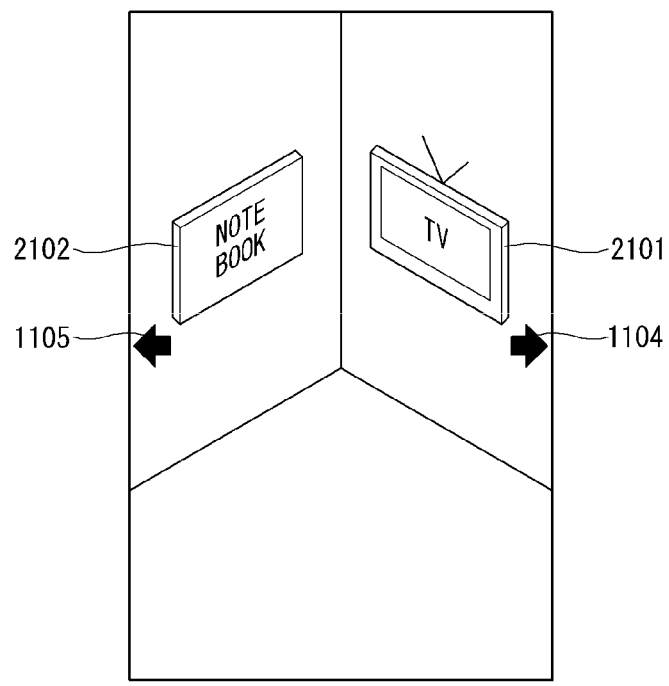

FIG. 20 is a flow chart regarding a 3D virtual mode according to FIG. 6. FIGS. 21A and 21B illustrate an operational process of a mobile terminal according to an exemplary embodiment of the present invention.

As shown in FIGS. 20, 21A and 21B, the acquiring of an image reflecting a real space (S50 in FIG. 4) may include entering the 3D virtual mode (S51).

A 3D virtual space may be displayed (S52) when the mobile terminal enters the 3D virtual mode. The 3D virtual space refers to a state in which a virtual image is three dimensionally output.

As shown in FIG. 21A, an image allowing the user to acquire a sense of depth and perspective may be displayed on the display module 151. Additionally, the electronic device (notebook computer 2102) available for short-range communication may be displayed on the image.

The user may change the screen image displayed on the display module 151 via a dragging motion.

FIG. 21B illustrates the result obtained after scrolling the screen image of FIG. 21A. As the screen image of FIG. 21A is scrolled, the TV 2101 may be displayed with the first notebook computer 2102.

Figure 22:
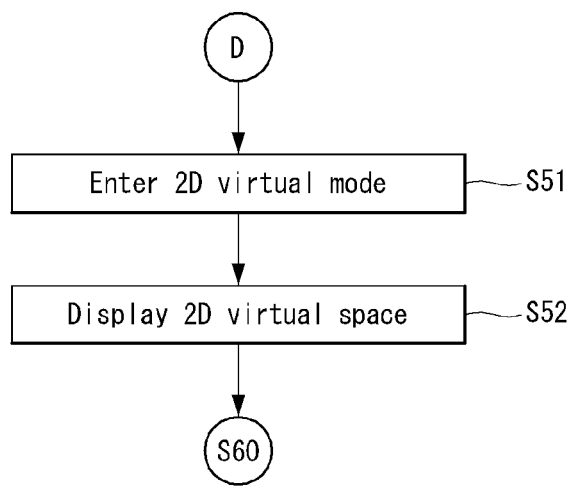
FIG. 22 is a flow chart regarding a 2D virtual mode according to FIG. 6.
Figure 23A:
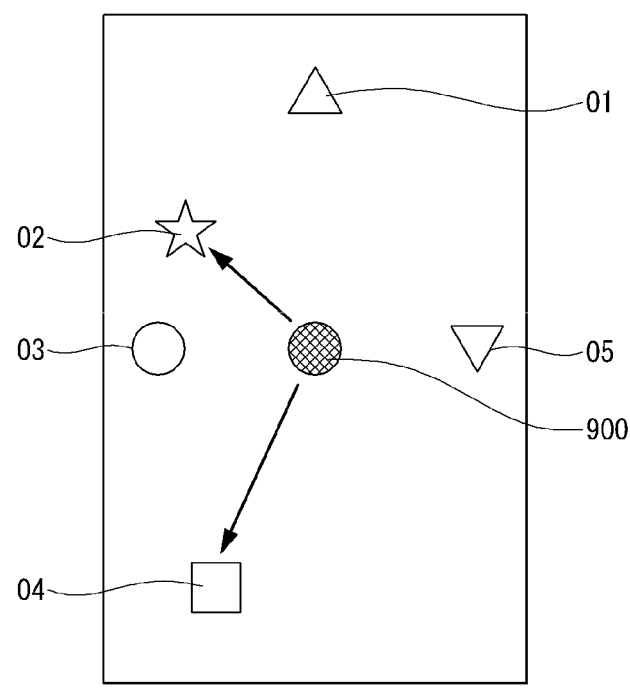
FIGS. 23A and 23B illustrate a display state of the mobile terminal according to FIG. 22.
Figure 23B:
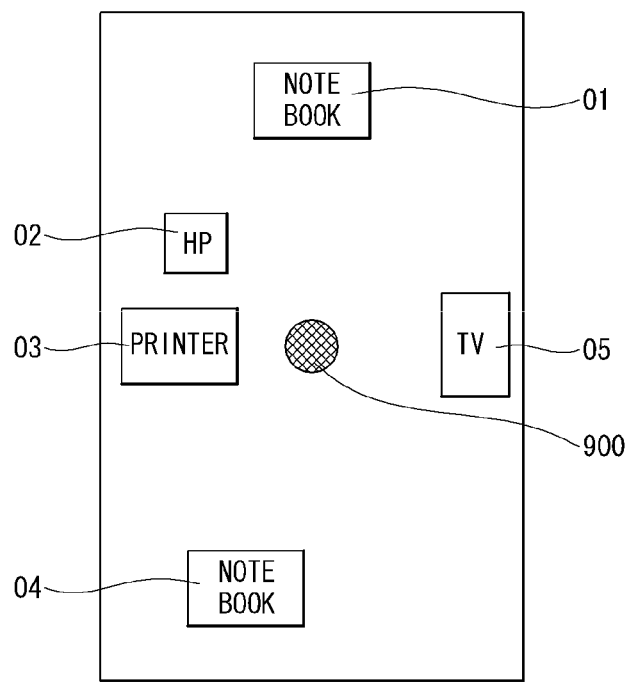

FIG. 22 is a flow chart regarding a 2D virtual mode according to FIG. 6. FIGS. 23A and 23B illustrate a display state of the mobile terminal according to FIG. 22.

As shown in the various figures, the acquiring of an image reflecting a real space (S50 in FIG. 4) may include entering the 2D virtual mode (S51) and displaying a 2D virtual space (S52).

As shown in FIG. 23A, a user 900 may be displayed at the center of the display module 151 in the 2D virtual mode. In addition, icons indicating electronic devices may be displayed around the user 900 according to the distance between the user and the electronic devices. For example, the second electronic device O2 may be displayed as being closer to the user in comparison to the fourth electronic device O4.

As shown in FIG. 23B, the electronic devices O1 to O5 may be displayed by icons each having the name of the electronic devices.

Figure 24:
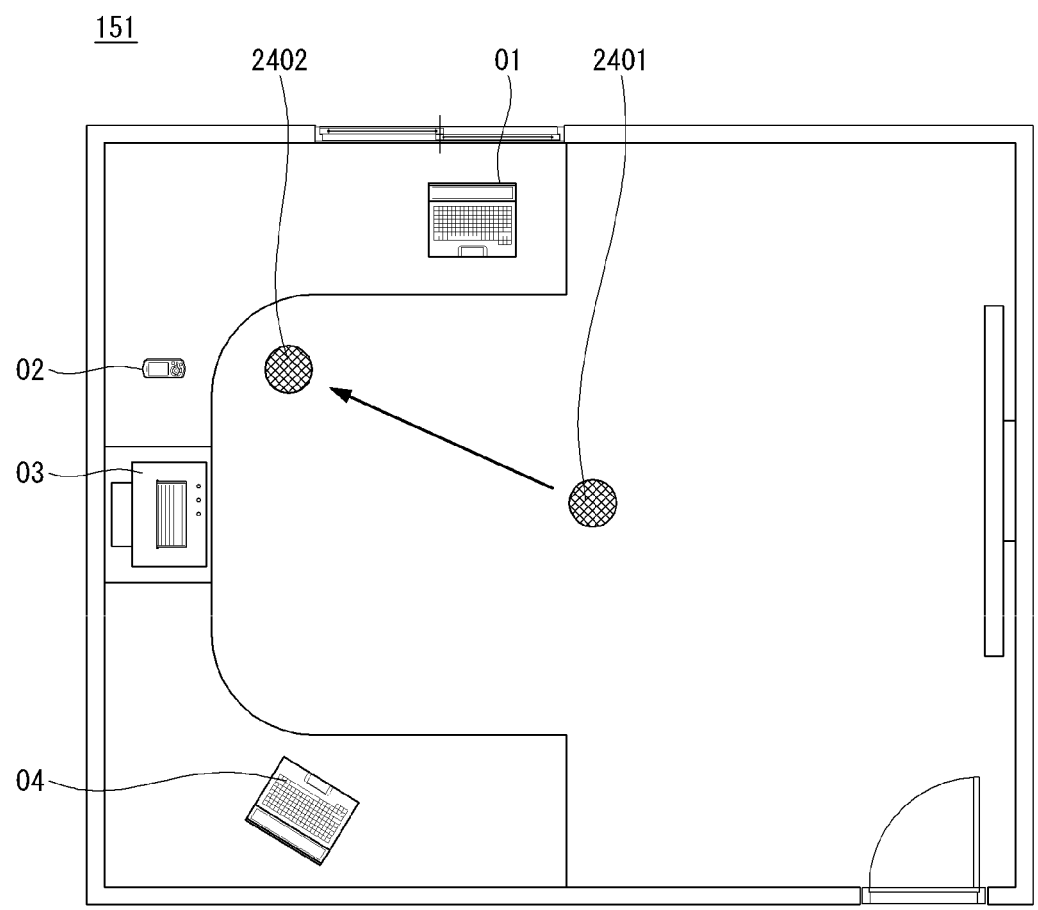
FIG. 24 illustrates the operation of the mobile terminal in a 2D real image mode in FIG. 6.

FIG. 24 illustrates the operation of the mobile terminal in the 2D real image mode in FIG. 6.

As shown in FIG. 24, a real image may be displayed in a planar form on the display module 151. Here, the real image refers to an image such as a photo image obtained by capturing an image of a particular space. With the image displayed, when the user at a first location 2401 moves to a second location 2402, the locations of the electronic devices O1 to O5 are not moved while the icon indicating the location of the user may be moved.

Figure 25:
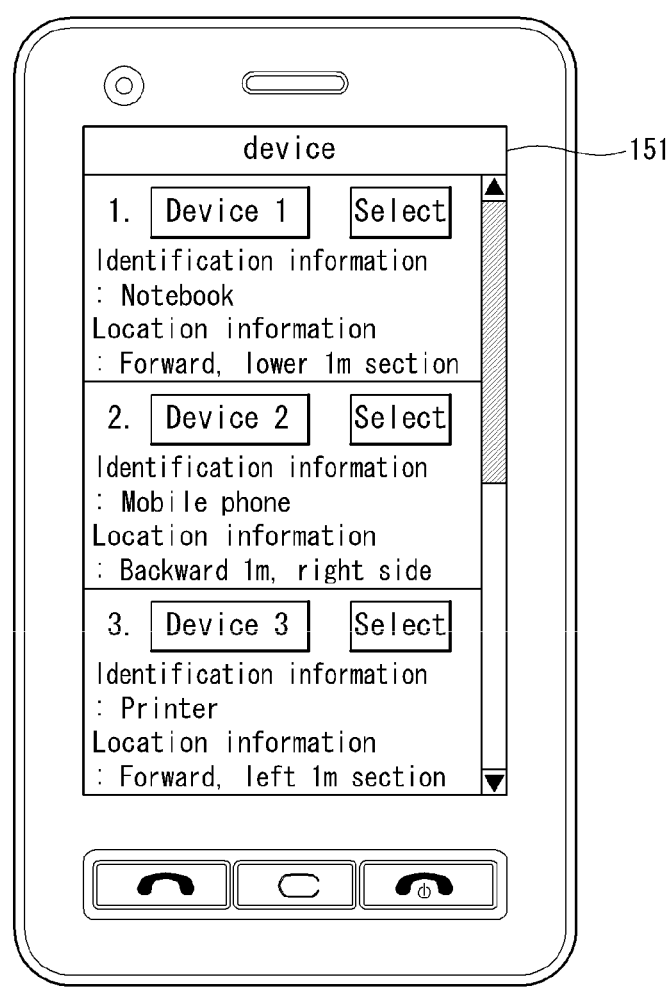
FIGS. 25 and 26 illustrate a mobile terminal according to an embodiment of the present invention.
Figure 26:
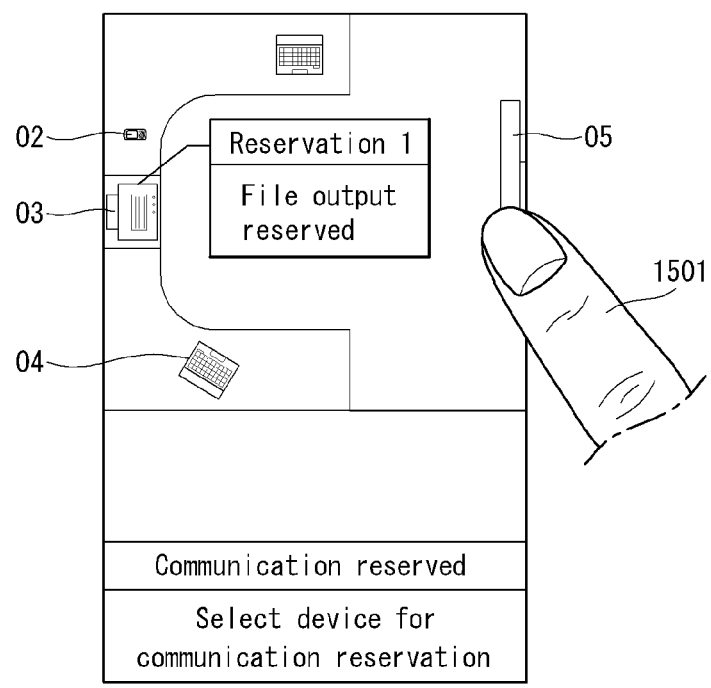

FIGS. 25 and 26 illustrate a mobile terminal according to an exemplary embodiment of the present invention.

As shown in FIG. 25, the mobile terminal 100 according to the present embodiment may display the location and identification information of an electronic device in characters as opposed to icons.

As shown in FIG. 26, the mobile terminal according to the present embodiment may set a reservation in advance for an electronic device which is not currently available for communication. Specifically, while in the recall mode or the virtual mode, the user may not be at a location within the current screen image. For example, the printer O3 may be in the office while the user is at home. In this example, the user may select the printer O3 and make a reservation for communication with the printer O3.

When the user has made a reservation for communication with an electronic device, such as the printer O3, the reserved operation may be automatically performed when communication with the electronic device, such as the printer O3, is available. For example, once the user reaches the location of the printer, such as the office, a corresponding file may be transmitted from the mobile terminal to the printer for printing.

A data communication method in the mobile terminal using a device map and a mobile terminal implementing the method according to an embodiment of the present invention will now be described with reference to FIGS. 27 to 53.

The present invention provides a data communication method allowing the user to transmit a screen image or content the user is currently viewing via the display module of the mobile terminal to a different electronic device in a fast and intuitive manner, additionally, the method provides a data communication method allowing the user to simply share particular data with a different electronic device.

According to embodiments of the present invention, a device map is employed to display notification information regarding at least one electronic device, such as a target for data communication, in the form of an icon on the display screen. Hereinafter, for the sake of brevity, the icon displaying the notification information regarding the electronic device will be referred to as a device icon.

In addition, the present invention provides a data communication method whereby an electronic device displayed on a device map is selected via a touch action on a touch screen or a motion action detected from a motion sensor.

Furthermore, the present invention provides a method of setting, registering, and changing a device icon displayed on the device map, a method of managing the device map by groups, a method of grouping and managing two or more device icons, a method of automatically aligning device icons, and a method of intuitively and visually displaying various types of device maps, such as a device map reflecting a relative location relationship with other electronic devices based on a current location of the terminal, a device map reflecting a spatial location relationship of a real space, or a device map reflecting real map information related to a current location or a searched location.

The general process and technical content of the data communication method of a mobile terminal using a device map according to an embodiment of the present invention will now be described with reference to FIGS. 27 to 44.

Figure 27:
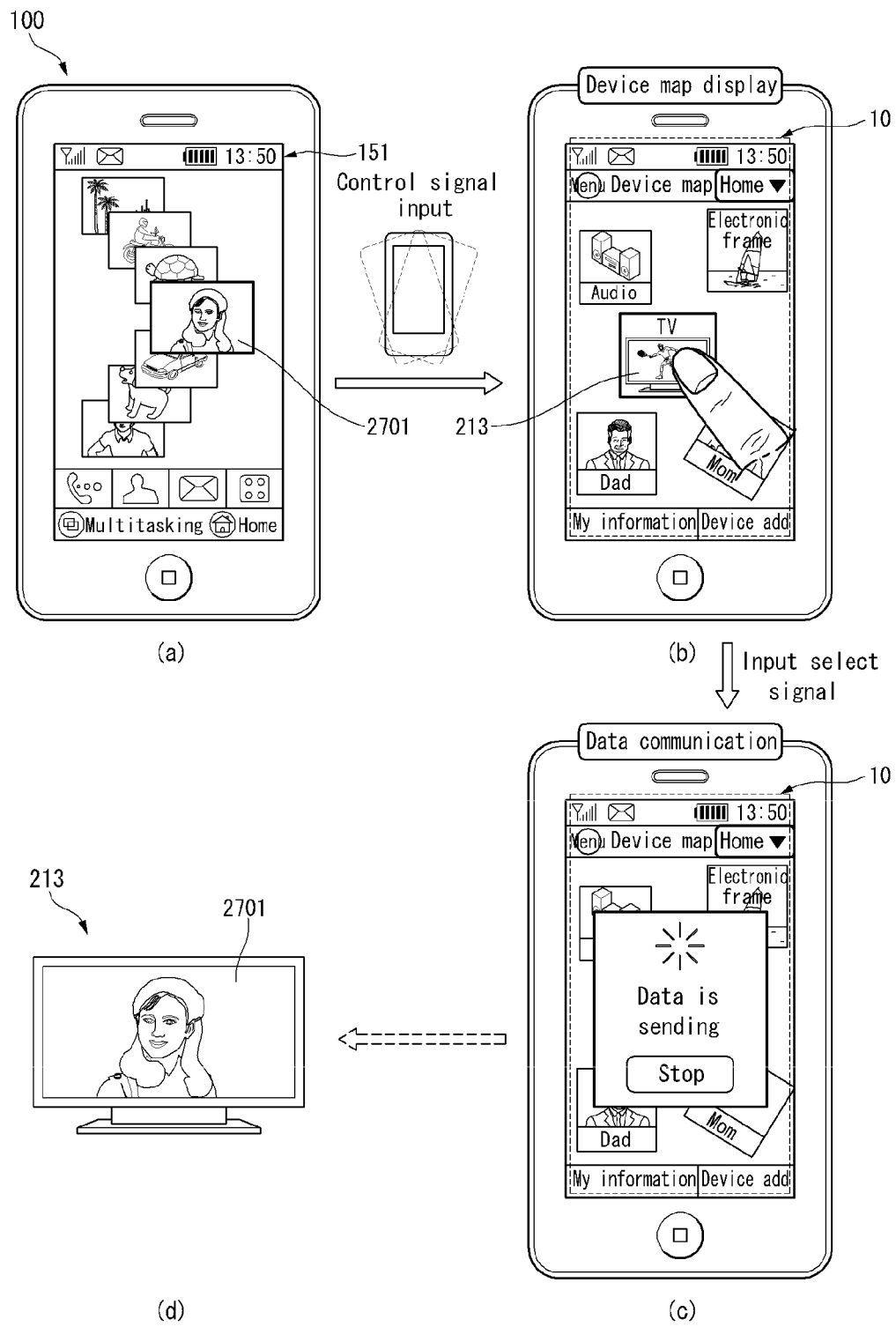
FIG. 27 is an overview of display screens illustrating a data communication method of a mobile terminal using a device map according to an embodiment of the present invention.
Figure 43:
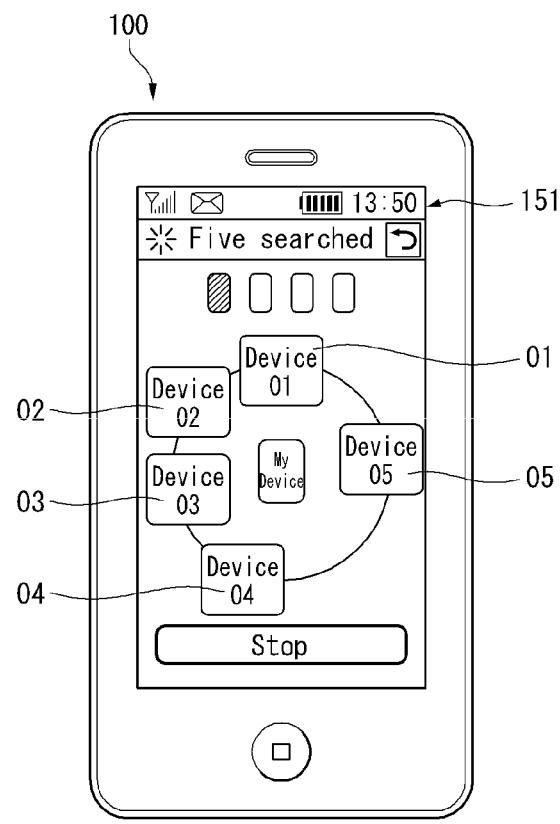
Figure 44:
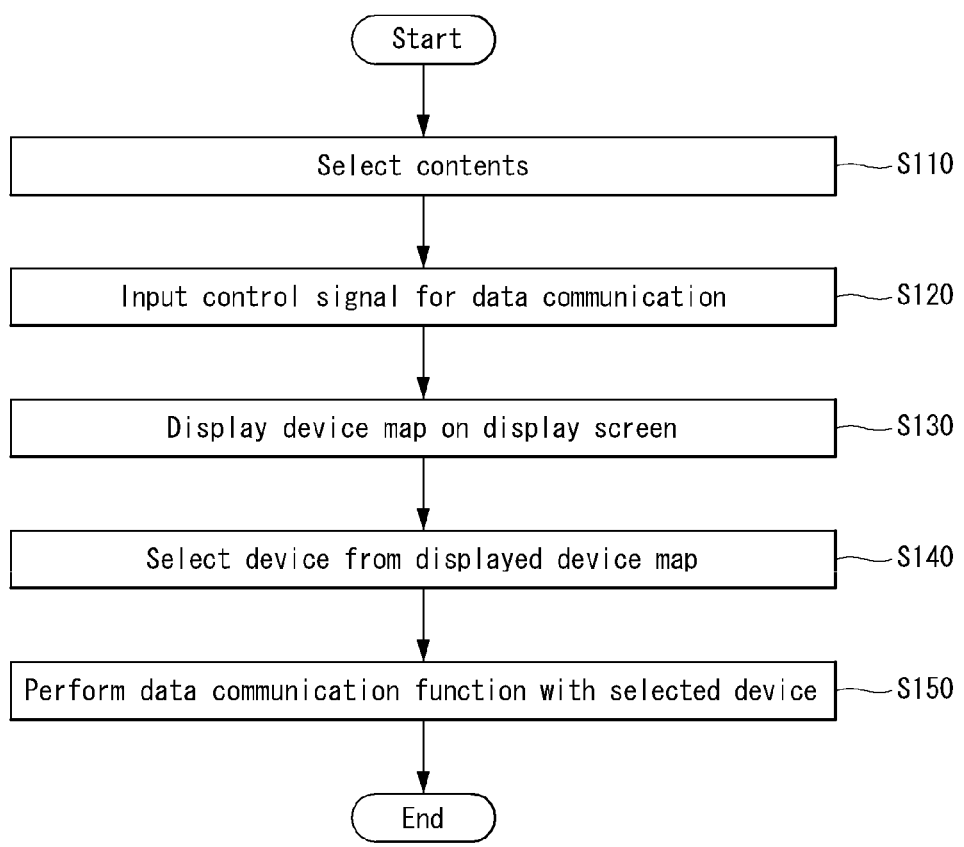
FIG. 44 is a flow chart illustrating the process of a data communication method of a mobile terminal using a device map according to an embodiment of the present invention.

With reference to FIGS. 27 to 44, after content 2701 desired to be transmitted to a different electronic device is selected (S110 in FIG. 44 and FIG. 27(*a*)), the controller 180 of the mobile terminal 100 displays a device map 10 comprising one or more device icons on the screen of the display 151 (S130 in FIG. 44 and FIG. 27(*b*)) when a control signal for data communication is input to the mobile terminal 100 (S120 in FIG. 44).

The controller 180 performs data communication with a selected electronic device via the short-range communication module 114 equipped in the mobile terminal 100 (S150 in FIG. 44) when a select signal for selecting one of the device icons included in the device map 10 is input (S140 in FIG. 44).

As an example of performing data communication with the selected electronic device (FIG. 27), a device icon 213 for the TV device, among the device icons included in the device map 10, may be selected (FIG. 27(b)), and the controller 180 may transmit the content 2701 which has been selected in step S110 to the selected TV device (FIG. 27(c)), finally, the selected content 2701 may be displayed on the TV device (FIG. 27(d)).

FIGS. 27 and 44 illustrate an example where the data desired to be transmitted is first selected and the electronic device desired for data communication is then selected. Alternatively, the electronic device desired for data communication may be selected from the device map before the data desired to be transmitted is selected.

Additionally, in FIGS. 27 and 44, the data desired to be transmitted is expressly selected by the user, still, in an alternate embodiment, if the data is not selected by a user, a screen image being displayed on the display module 151 may be transmitted to the different electronic device at a point in time when a control signal for data communication is input.

In other words, in the present embodiment, when the user wants to share specific content, the user may select and transmit the specific content to the different electronic device in such manners as shown in FIGS. 27 to 44. When the user wants to share a screen image currently viewed via the display module of the terminal, the user may immediately input a control signal for data communication, select a specific electronic device from the device map, and transmit the currently viewed screen image to the selected electronic device.

The following description will focus on an example where a control signal for data communication is input after the data to be transmitted is selected.

There may be various input methods to generate a control signal for the data communication. The control signal may be generated via a general input method. For example, the control signal may be generated by pressing a button provided on the input unit 130 or by selecting a specific item included in a menu list. Additionally, when the display module 151 is implemented as a touch screen, the control signal may be generated by selecting a specific key displayed on the touch screen.

Alternatively, the control signal may be generated via a non-contact type proximity touch based on a proximity sensor mounted on the mobile terminal 100. Additionally, the control signal may be generated via a touch gesture of a pre-set pattern on the touch screen, such as a touch in the shape of an alphabetical letter "D."

Moreover, when a motion sensor, such as a gyro sensor, is mounted in the mobile terminal 100, the control signal may be generated via a movement, such as shaking (FIG. 27).

Alternatively, when a voice recognition module is mounted in the mobile terminal 100, the control signal may be generated by inputting pre-set content by voice. Furthermore, the control signal may be generated by applying a blow input.

The various input methods as described above may be applied in the same manner to the case of selecting a device from the device map. Namely, a device select signal may be generated via the touch gesture, the motion gesture, a key input, a touch input, voice recognition, or the blow input toward a device icon displayed on the device map. According to one embodiment, the received input may enable a screen image to display the content as if selected contents is blown away or flown to the corresponding device.

The control signal or the device select signal may be implemented according to an input method previously set in the terminal or according to an input method set, registered, or selected by the user.

The general content of the data communication method of the mobile terminal using a device map according to an embodiment of the present invention has been described. Hereinafter, in order to better understand the present invention, the process of displaying the device map among the data communication method of the mobile terminal using a device map will be described with reference to FIGS. 28 to 43. Additionally, the process of selecting a device and performing data communication using a device map will be described with reference to FIGS. 45 to 53.

Here, it is assumed that the display 151 is implemented in the form of a touch screen.

Figure 28:
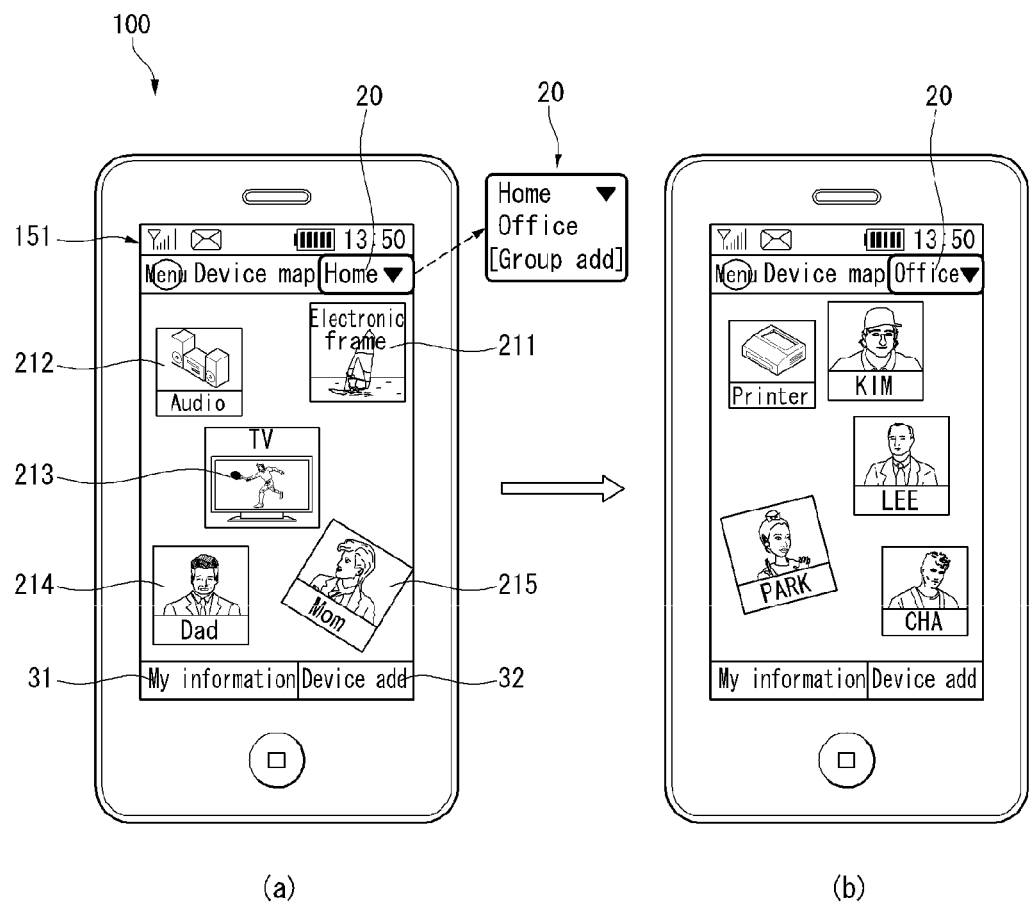
FIG. 28 is an overview of display screens illustrating the management of the device map by groups according to an embodiment of the present invention.

FIG. 28 is an overview of display screens illustrating the management of the device map by groups according to an exemplary embodiment of the present invention. As shown in FIG. 28, a device map displayed on the screen of the display 151 according to an embodiment of the present invention may be managed by groups.

With reference to FIG. 28(a), a group of the device map, such as a "home" group, may include an electronic frame device 211, an audio device 212, a TV device 213, and mobile terminals 214 and 215, as electronic devices that can be subjects of data communication with the mobile terminal 100.

With reference to FIG. 28(b), the mobile terminal 100 may include a second group such as an "office" group. The "office" group may include other electronic devices that can be subjects of data communication with the mobile terminal 100.

Accordingly, as shown in FIG. 28, for example, the user may select a specific group from a group select item 20 positioned at one area of the display screen. In this example, the particular group may be selected by applying a touch to the group select item 20 or via a motion gesture based on a particular gesture.

In addition, the user may add a new group via the group select item 20. By adding a group, the user may set the number of groups to be classified and managed. Additionally, an electronic device belonging to a group of the device map may be duplicated or moved to a different group of the device map. Moreover, a specific electronic device may be newly added to a particular group by using a device add item 32.

In this manner, according to an embodiment of the present invention, the user can easily register and manage a plurality of electronic devices according to a desired classification method, as necessary, via the device map of each group.

The device map according to an embodiment of the present invention may not be necessarily configured as the groups as shown in FIG. 28, and a single device map may be configured. If the device map is configured by the groups, a previously set default group of the device map may be displayed on the screen of the display 151 when a control signal for data communication is input. For example, the "office" group of the device map may be set as a default group during a daily work time slot, and the "home" group may be set as a default group during the other time slots. For another example, the device map of the group which has been mostly recently used, the device map of a group having the highest use frequency, or the device map of a particular group set by the user may be set as a default map.

Figure 29:
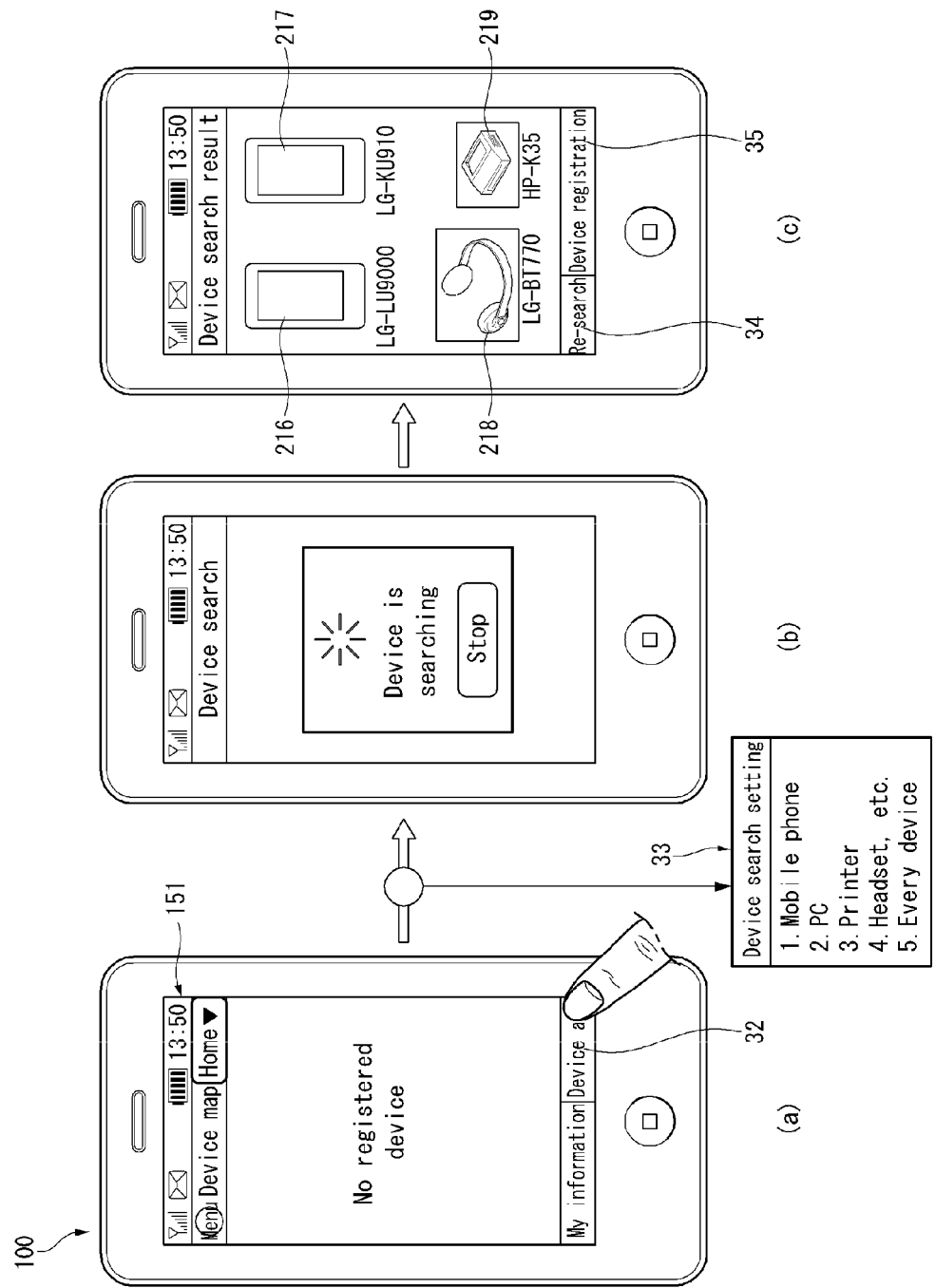
FIGS. 29 and 30 are overviews of display screens illustrating a device registration process in the device map according to an embodiment of the present invention.
Figure 30:
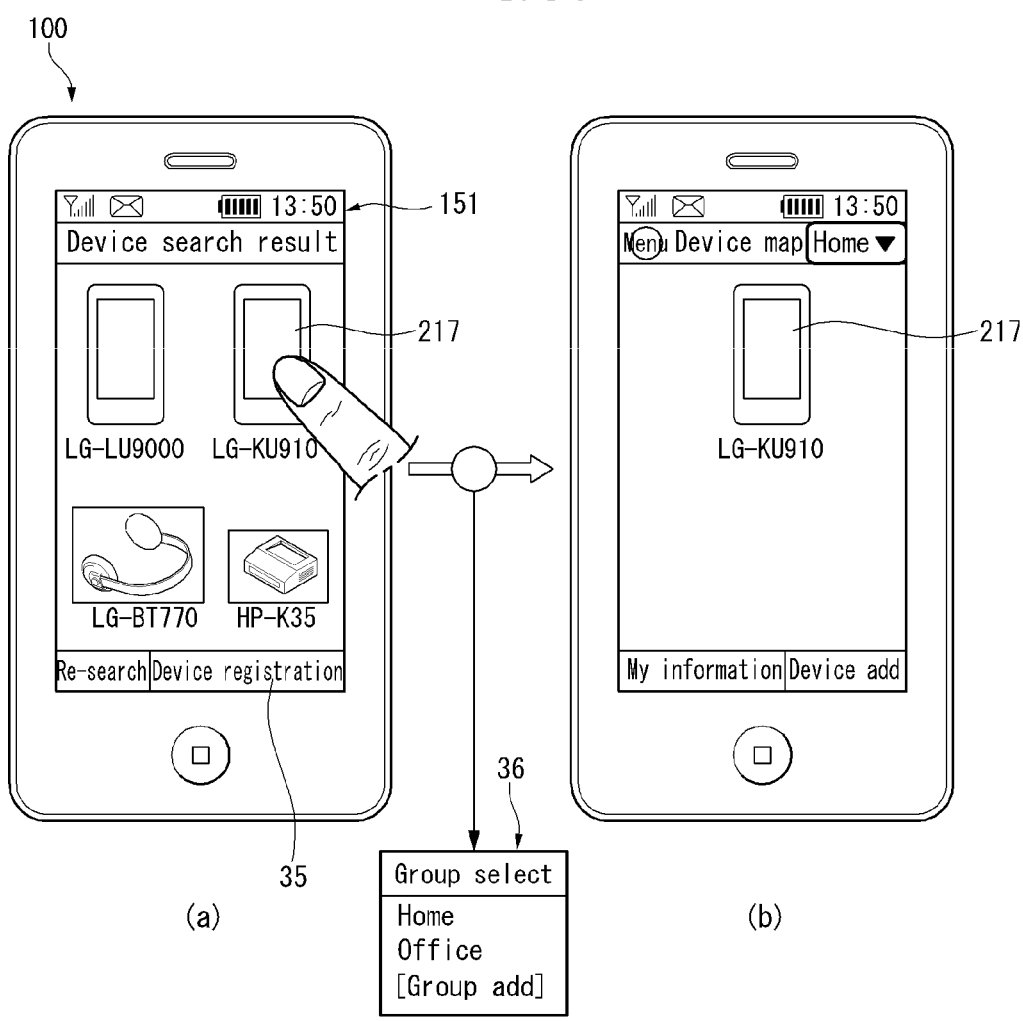

FIGS. 29 and 30 are overviews of display screens illustrating a device registration process in the device map according to an embodiment of the present invention. For the sake of brevity, the example where the user initially registers an electronic device within the device map of the "home" group at home (FIG. 29(a)) will be described.

For example, when the device add item 32 displayed in the form of a soft key on the display screen is selected as shown in FIG. 29(a), the controller 180 searches electronic devices within a user's house available for data communication with the mobile terminal 100 through the short-range communication module 114 (FIG. 29(b)). The searching may be performed on all of the electronic devices within the house or may be performed on only particular types of electronic devices. Additionally, when the user selects the device add item 32, a pop-up window 33 for "device search setting" is displayed on the display screen of the terminal, thus allowing a user to selectively search for a type of an electronic device.

The result of the device searching may be displayed on the screen of the display 151 (FIG. 29(c)). With reference to FIG. 29(c), a total of four electronic devices 216, 217, 218, and 219 are searched. In this example, of course, if the searching of an electronic device desired by the user fails in the previous searching process or if searching of a different type of electronic device is required, a re-search item 34 displayed in the form of a soft key may be selected to perform a re-searching function.

Thereafter, one (217) of the four searched electronic devices is touch-selected (FIG. 30(a)) and a register registration item 35 displayed in the form of a soft key on the display screen may be selected. The selected electronic device 217 may then be registered to the "home" group (FIG. 30(b)).

In the above description, the "home" group is selected and the electronic device within the house available for data communication is then searched. However, if a searched electronic device is registered in a state where a particular group is not selected, an additional group selecting process may be performed following the selection of the device registration item 35. For example, in a state that no particular group is selected in advance, when an electronic device is available for short-range communication based on a current location of the mobile terminal 100, a pop-up window (36 in FIG. 30) for selecting a group in the searched electronic device registration process may be displayed to allow the user to select a group to which the searched electronic device may be registered.

Through the process as described above, the image, name, or size, of the device icon regarding an electronic device registered to the device map may be altered.

Figure 31:
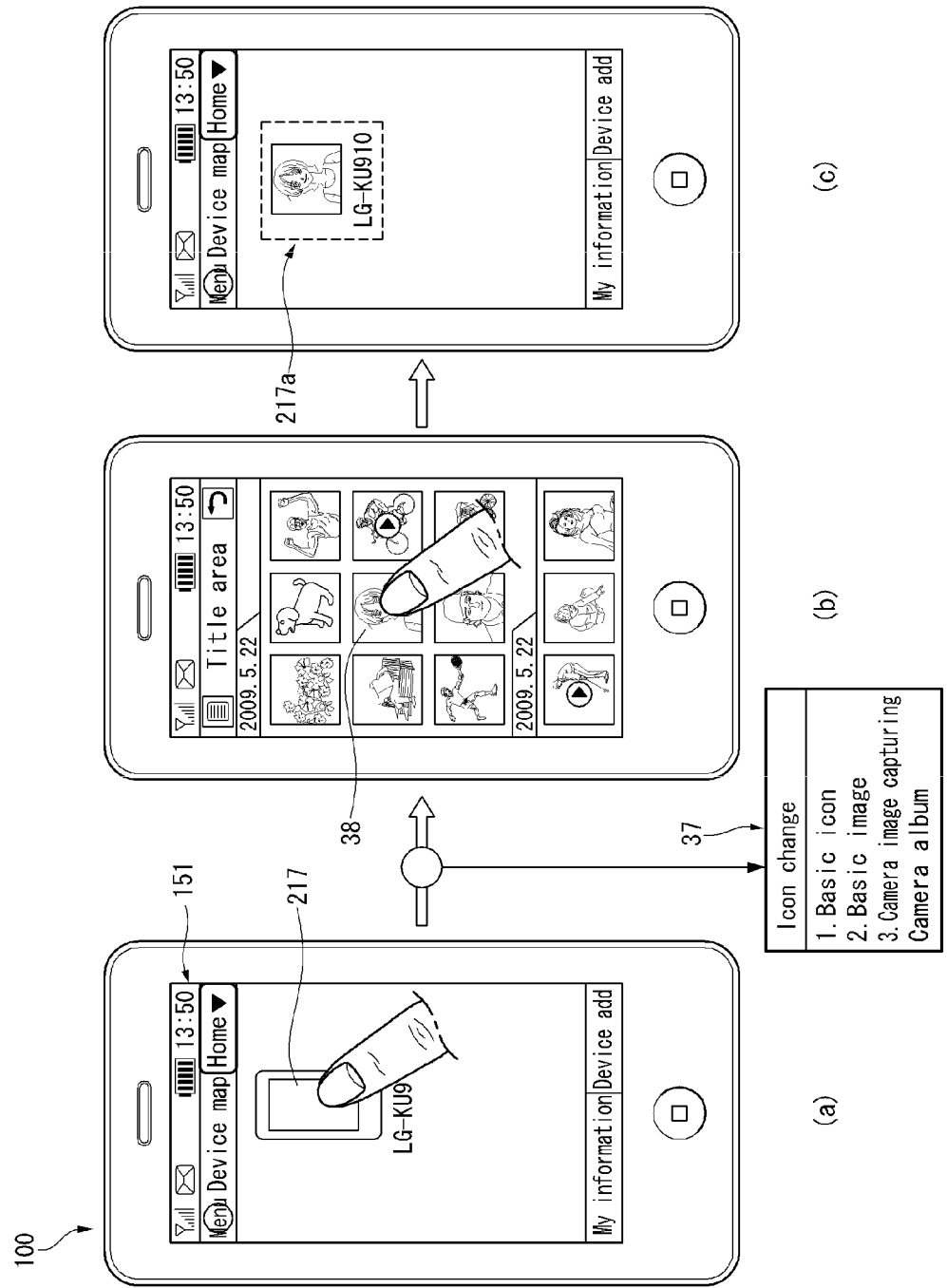
FIG. 31 is an overview of display screens illustrating a change in an image of a device icon registered in the device map according to an embodiment of the present invention.

The image alteration of the device icon may be performed in such a manner as illustrated in FIG. 31. The icon image of the device icon 217 may be selected (FIG. 31(a)) and an icon alteration may be selected via a menu item. A pop-up window 37 for an icon alteration may be displayed on the display screen. Thereafter, one of selection items displayed on the pop-up window 37 may be selected and an icon image 38 for alteration may be designated (FIG. 31(b)), thereby changing the device icon 217 of the existing image into the device icon 217a of the altered image (See FIG. 31(c)).

Figure 32:
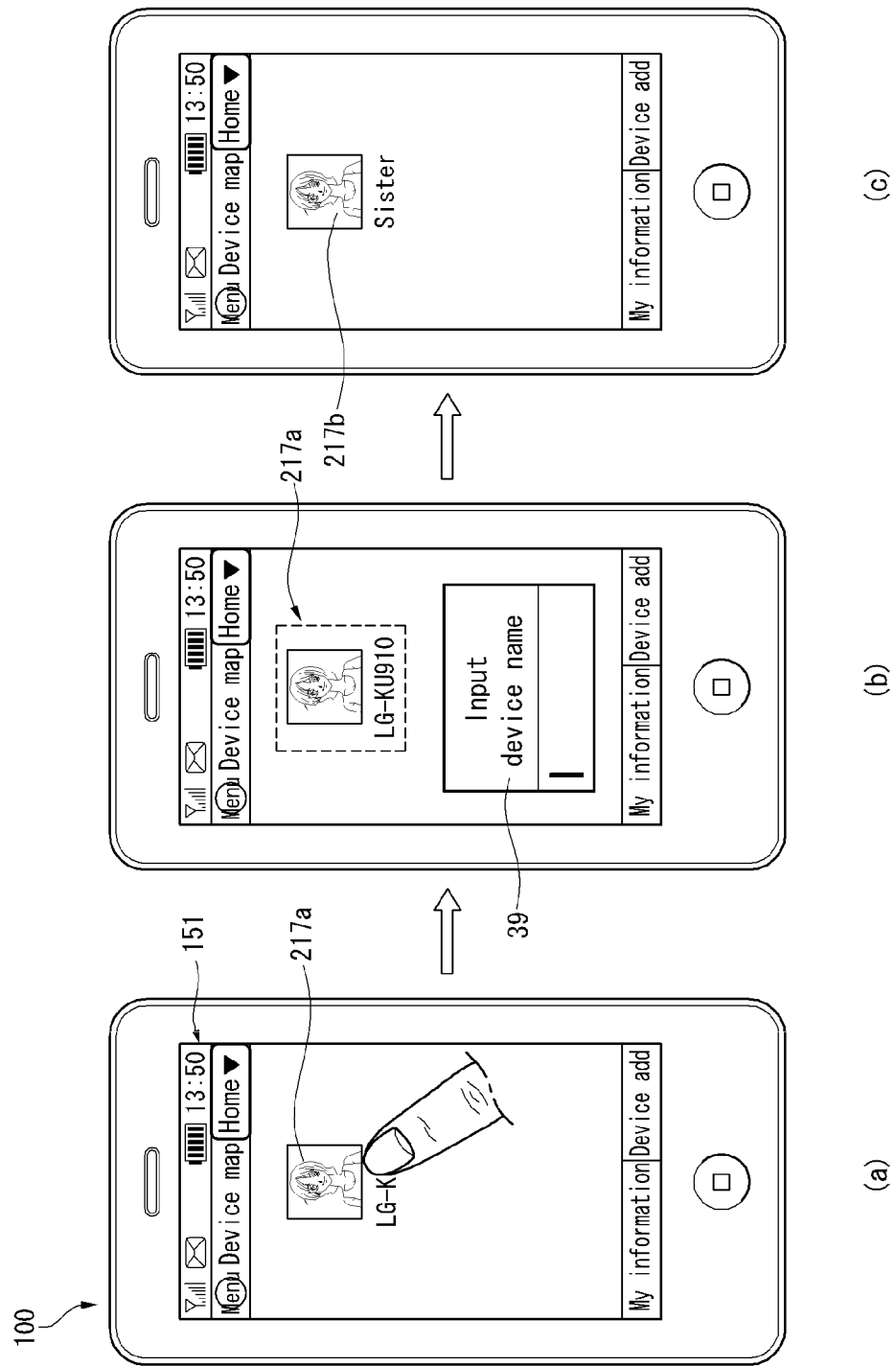
FIG. 32 is an overview of display screens illustrating a change in the name of the device icon registered to the device map according to an embodiment of the present invention.

The name alteration of the device icon may be performed in such a manner as illustrated in FIG. 32. The icon name of the device icon 217a may be selected (FIG. 32(a)) to generate a device icon 217b having the changed name via a device name pop-up window 39 (FIG. 32(b)) displayed on the display screen (FIG. 32(c)).

As illustrated in FIG. 32, only the name of the device icon is altered, moreover, the background, color, the edges of the name may be altered as necessary. Through this, a display effect, such as highlighting, may be set for the device icon name.

Figure 33:
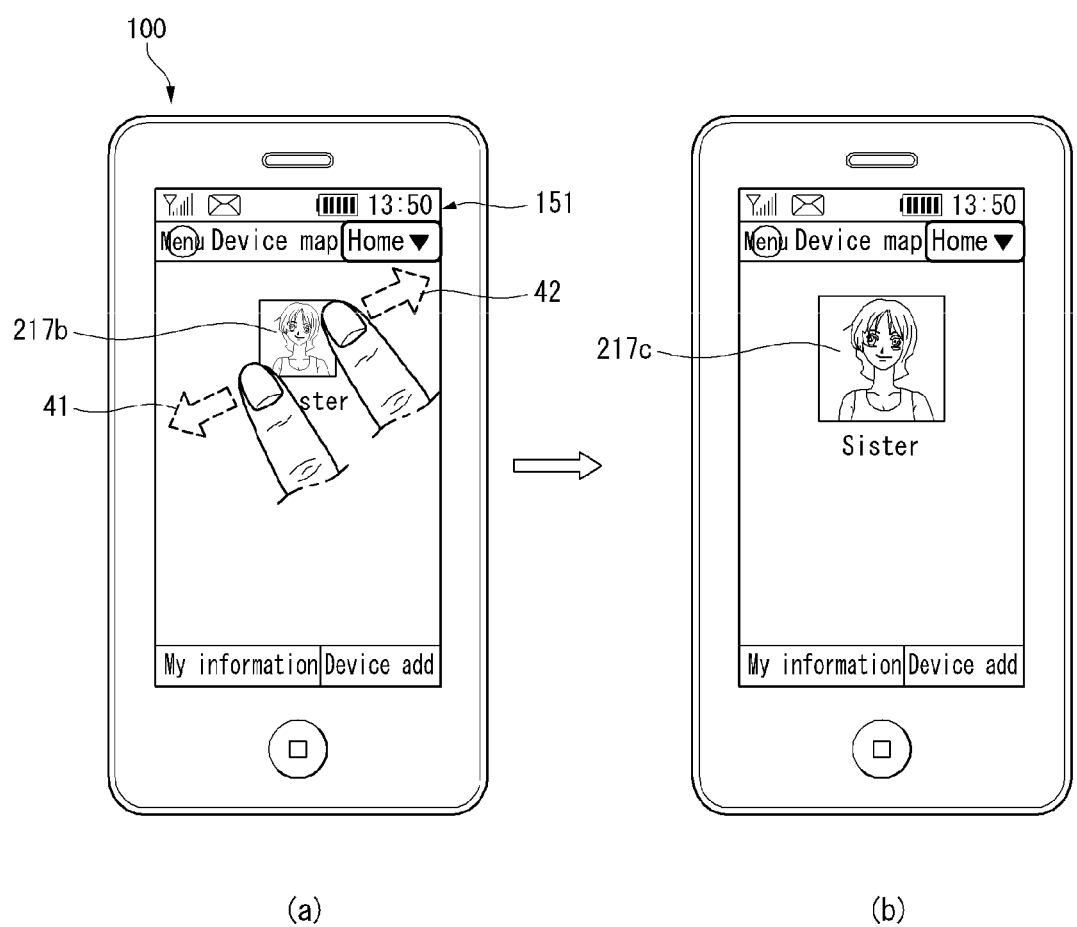
FIG. 33 is an overview of display screens illustrating a change in the size of the device icon registered to the device map according to an embodiment of the present invention.

Additionally, the size of the device icon may be altered in such a manner as illustrated in FIG. 33. When the user performs a touch operation of widening both corners of the device icon 217b displayed on the display screen with his two fingers, an enlarged device icon 217c may be generated (FIG. 33(b)).

Figure 34:
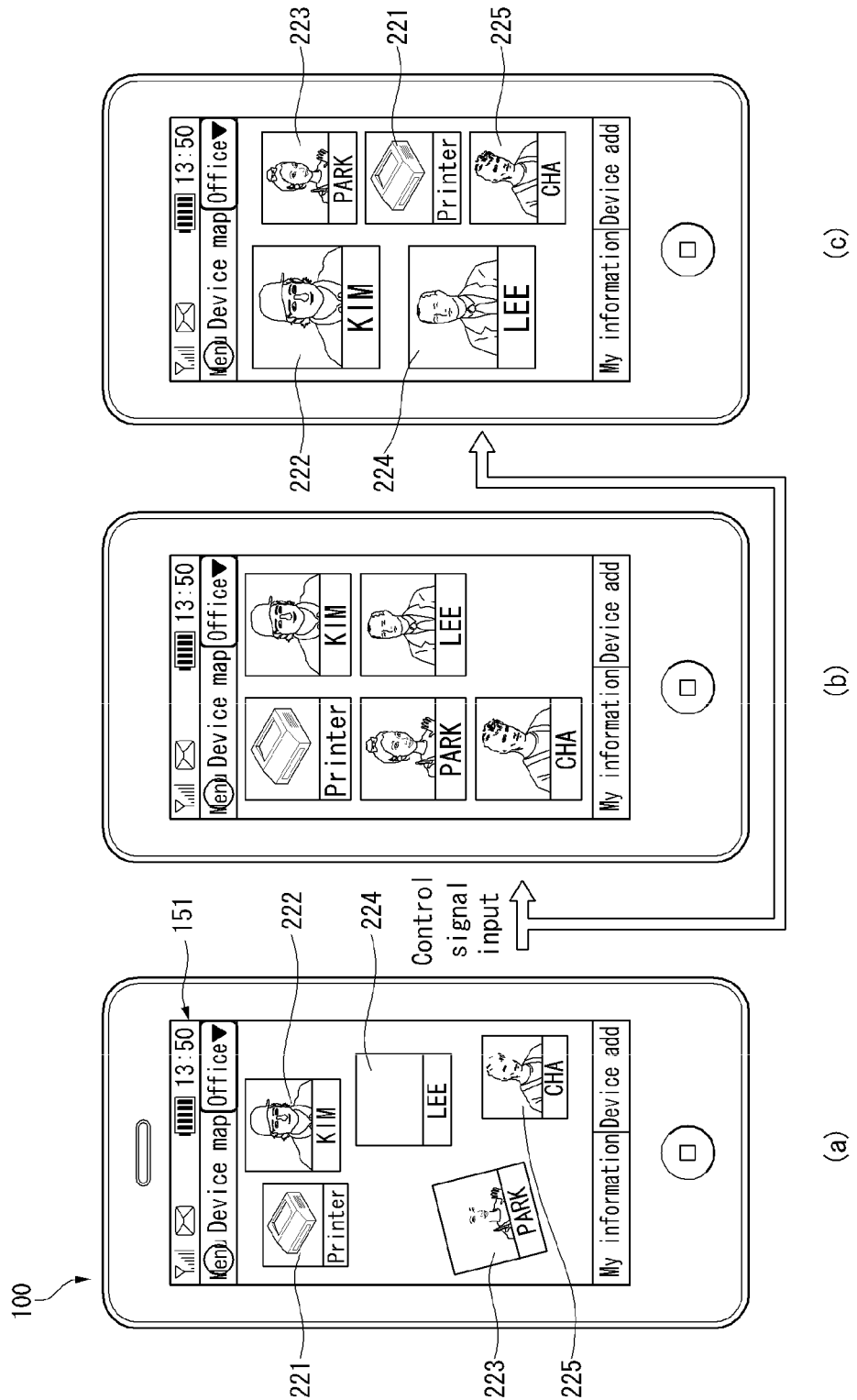
FIG. 34 is an overview of display screens illustrating the method of aligning device icons included in the device map according to an embodiment of the present invention.
Figure 35:
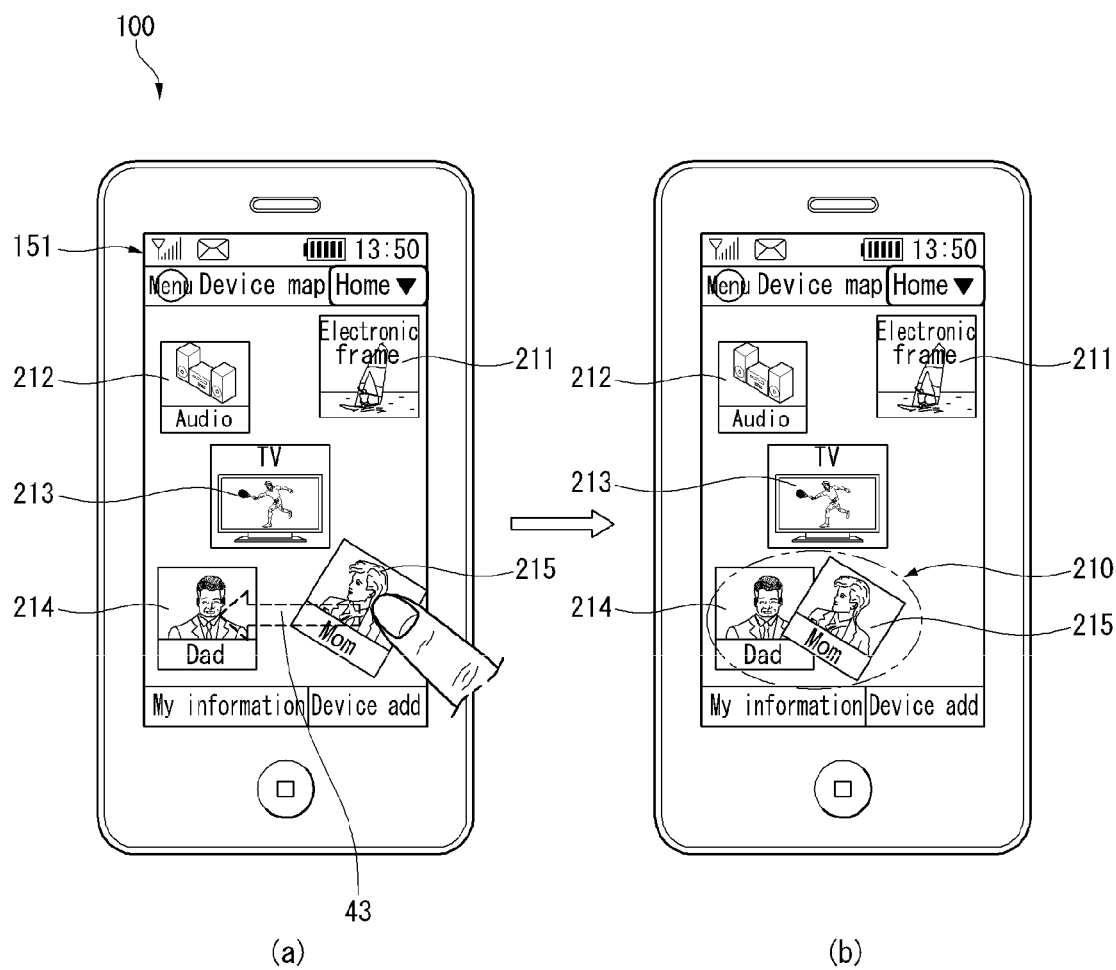
FIG. 35 is an overview of display screens illustrating the process of grouping two or more device icons included in the device map according to an embodiment of the present invention.

Furthermore, aligning and grouping of the device icons displayed on the device map may be performed in such manners as shown in FIGS. 34 and 35.

As shown in FIG. 34(a), device icons 221, 222, 223, 224, and 225 are randomly arranged and displayed on the device map, when a particular control signal for aligning the device icons is input, such as an "icon alignment" item, a motion, such as wobbling the terminal, may align the device icons 221 to 225.

In this example, the device icons 221 to 225 may be aligned to be displayed with the same size as shown in FIG. 34(b), or may be aligned to be displayed with different sizes as shown in FIG. 34(c). For example, according to the motion of wobbling the terminal, the device icons on the device map are aligned to be displayed such that the device icons regarding frequently used electronic devices (device icons 222 and 224 in FIG. 34) are automatically displayed to be larger while device icons regarding less frequently used electronic devices (device icons 221, 223, and 225 in FIG. 34) may be automatically displayed to be smaller.

Two or more device icons included in the device map may be displayed and managed as a group. For example, two device icons 214 and 215 included in the device map may overlap through a touch manipulation such as a touch-and-drag operation as shown in FIG. 35(a) into a group 210 as shown in FIG. 35(b).

Figure 36:
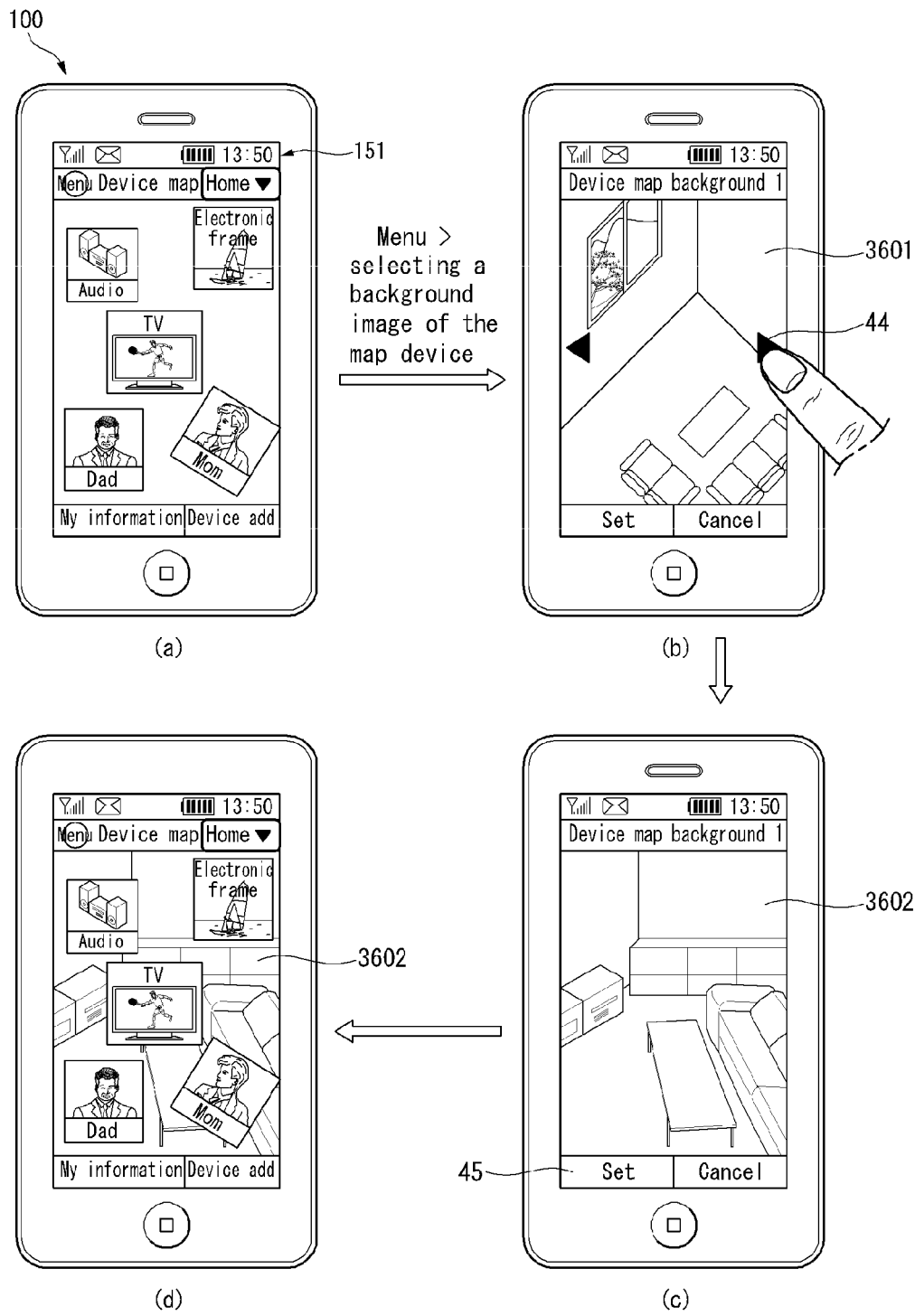
FIG. 36 is an overview of display screens illustrating the process of setting a background image of the device map according to an embodiment of the present invention.

FIG. 36 is an overview of display screens illustrating the process of setting a background image of the device map. For example, as shown in FIG. 36(a), the background image of the device map may be selected or altered by selecting a "map background selection" item. Specifically, when the "map background selection" item is selected, a first background image 3601 is displayed on the display screen (FIG. 36(b)). In this example, when a direction key 44 is selected, a second background image 3602 may be displayed (FIG. 36(c)). When the second background image 3602 is desired to be used as the background image of the device map, a "setting" item displayed in the form of a soft key on the display screen may be selected in order to change the current background image of the device map into the second background image 3602 (FIG. 36(d)).

In FIG. 36(b), the first background image 3601 is changed into the second background image 3602 by selecting the direction key 44 displayed on the display screen, but the present invention is not limited thereto, and the background image may be changed through a motion such as tilting the terminal or a motion such as snapping the terminal based on the motion sensor mounted in the mobile terminal 100.

In this example, the background image may be selected from an image stored in the memory unit 160 or an image captured by the camera 121.

Figure 37:
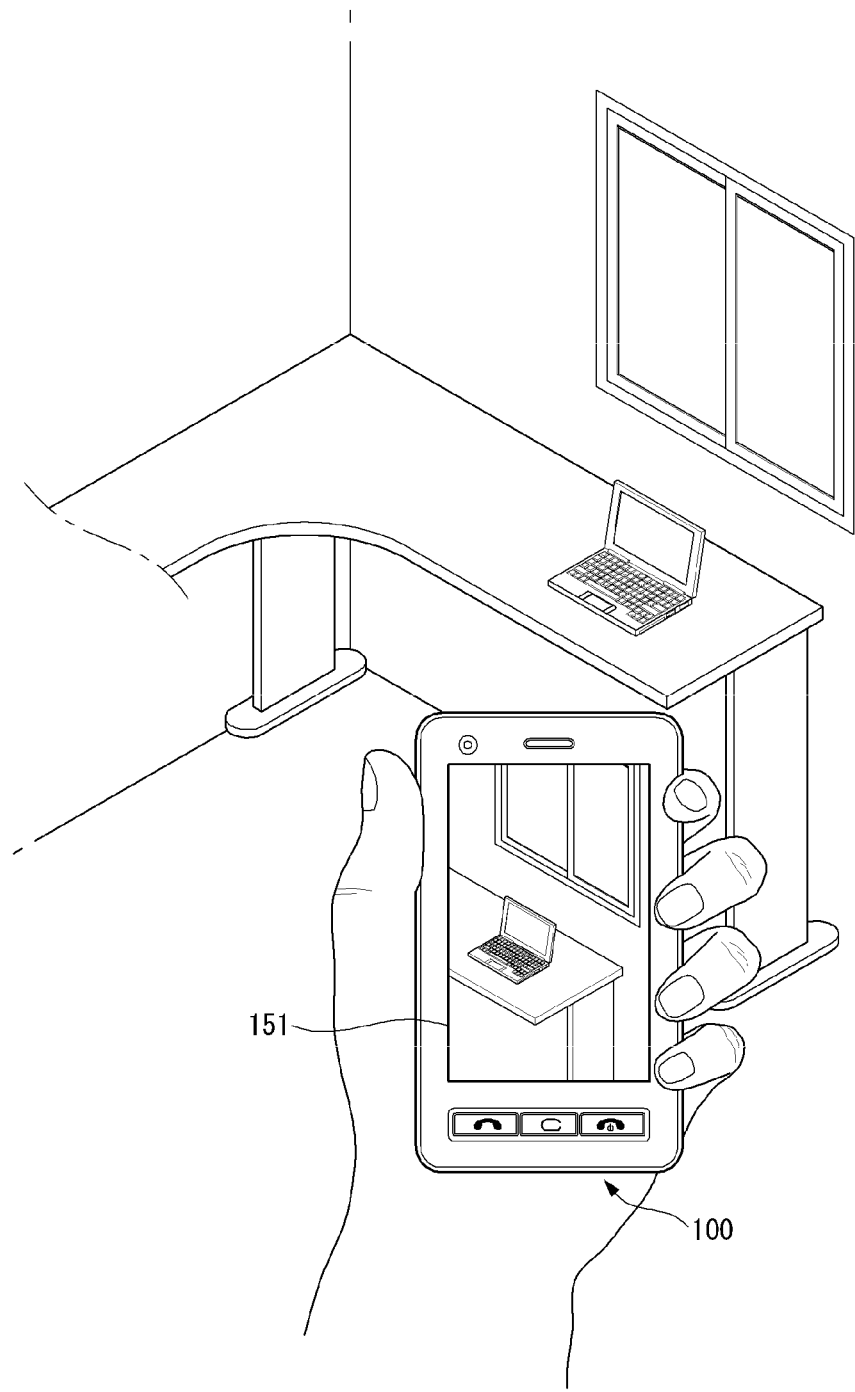
FIG. 37 is a view for explaining the case of utilizing an image of a real space as a background image of the device map according to an embodiment of the present invention.

Additionally, an image reflecting a real space may be used as the background image. For example, a virtual image simulating the real space of the user's home may be used as the background image of the device map regarding the "home" group (FIG. 42), or a real image of the user's home captured by the user via the camera may be used as the background image (FIG. 37).

By utilizing the image reflecting the spatial arrangement form, the user can recognize and use the device map by intuition for the location relationship of the place such as "home," "office," "school," etc.

In particular, the user may combine the user's location or the location of the mobile terminal according to the spatial arrangement form of a corresponding place and configure the device map by reflecting the location relationships, specifically, the relative direction and distance, of the electronic devices available for data communication based on the user or the current location of the user's terminal, thus maximizing user convenience in the follow-up data communication process.

For example, a device map of the "office" group may be configured with the location of a mobile phone of a colleague available for data communication with the user's mobile terminal by reflecting the relative location relationships based on a working location of the user in the office, such as the user's cubicle. In this example, the user may check where his colleague is located according to the corresponding device icon on the device map of the "office" group displayed on the mobile terminal 100.

From a similar point of view, FIG. 38 illustrates the case where a map image is utilized as the background image of the device map. In the device map state as shown in FIG. 38(*a*), for example, a "bring map" item may be selected through the menu to use a map image as the background image of the device map.

As the "bring map" item is selected, a screen image for searching a map may be displayed on the display screen of the terminal. When the user inputs a location on the map desired to be searched through the map search screen image (FIG. 38(*b*)), the controller 180 may acquire a corresponding map image including map information corresponding to the input location by using the position-location module 115 mounted in the terminal and display the acquired map image on the display screen.

In this example, when a map image 3801 is desired to be used as the background image of the device map, the user may select a "setting" item 46 displayed in the form of a soft key on the display screen (FIG. 38(*c*)) to change the background image of the device map into the map image 3801 as shown in FIG. 38(*d*).

In FIG. 38, a process of manually inputting the user's location is included in the process of acquiring the map image to be used as the background image of the device map as an example. Nevertheless, the process of manually inputting the user's location may not be necessarily included in the process of acquiring the map image.

For example, when the "map" item is selected through the menu as described above or when a pre-set motion gesture enabling the "map" is detected, the controller 180 of the mobile terminal 100 may automatically acquire a map image including map information corresponding to the current location of the terminal and display the acquired map image 3801.

In this example, the device icons previously registered to the terminal as shown in FIG. 38(*a*) may be displayed on the device map using the acquired map image 3801 as the background image (FIG. 38(*d*)). Alternatively, electronic devices available for short-range communication may be searched according to the current location of the terminal and device icons associated with the searched electronic devices may be displayed (not shown). Specifically, in this example, the device icons associated with the newly searched electronic devices may be displayed by reflecting actual locations of the electronic devices on the map image. For example, the user may visit a research center of his alma mater and search for alumni who are available for short-range communication according to his current location. Those who are present may perform data communication with the user.

Figure 39:
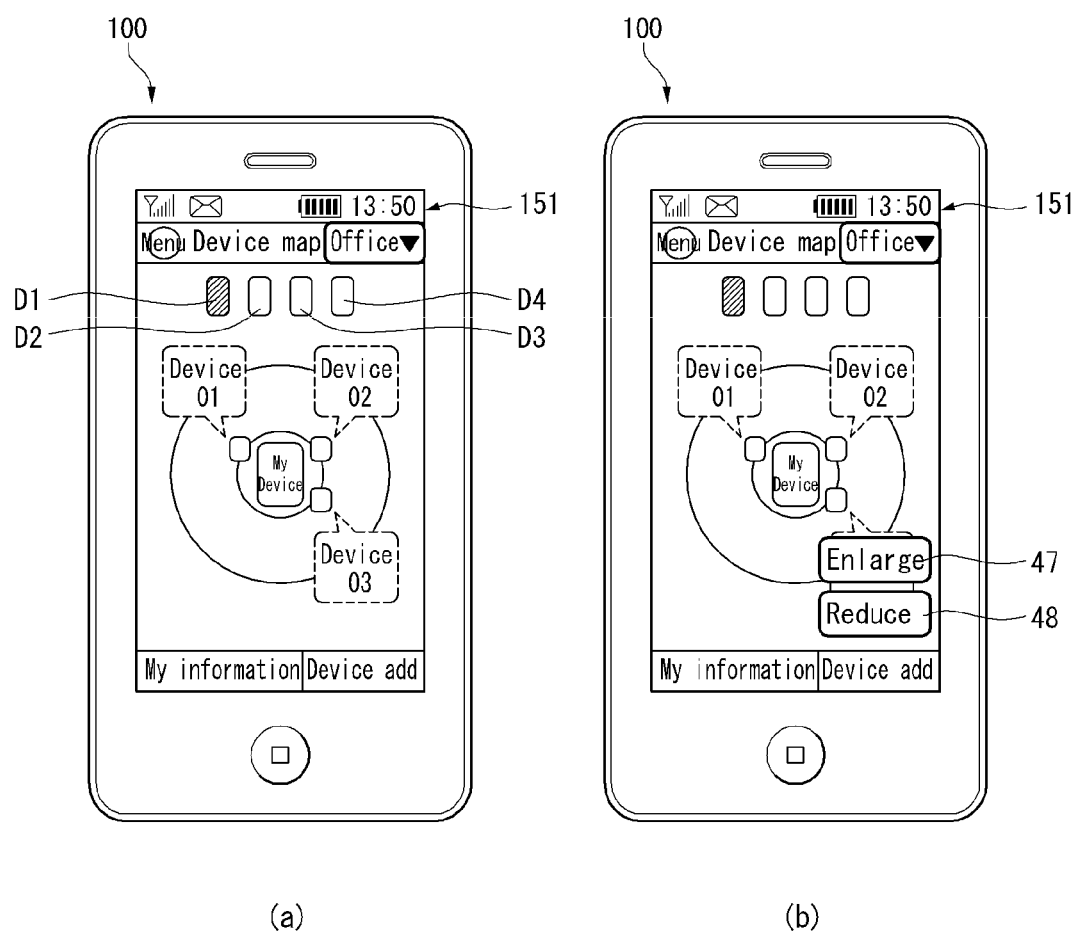
FIGS. 39 and 40 are overviews of display screens illustrating the device map having a radial arrangement according to an embodiment of the present invention.
Figure 40:
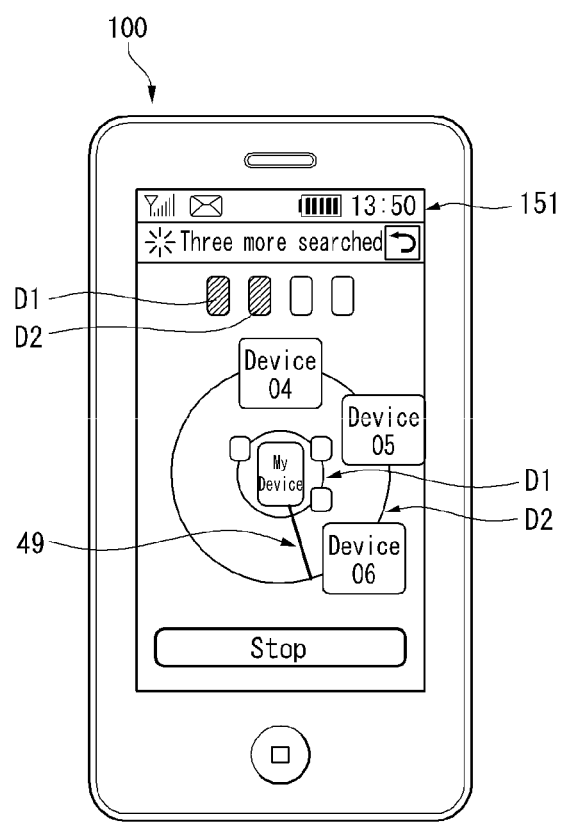

Other examples of the method for displaying a location-based device map as described above are illustrated in FIGS. 39 to 43. FIGS. 39 and 40 are overviews of display screens illustrating the device map having a radial arrangement.

Referring to the device map illustrated in FIG. 39, device icons, such as Device 01, Device 02, and Device 03, are arranged to be displayed on a radial line based on the current location of the terminal according to the distance between the user's terminal, My Device, and the corresponding devices.

With reference to FIG. 39(*a*), distance indication icons D1, D2, D3, and D4 are displayed on the device map. Here, for example, the indication icon D1 indicates that an electronic device is located within a radius of 10 m based on the user's terminal. The indication icon D2 indicates that an electronic device is located within a radius of 10 m to 20 m based on the user's terminal. The indication icon D3 indicates that an electronic device is located within a radius of 20 m to 30 m based on the user's terminal. Finally, the indication icon D4 indicates that an electronic device is located in a radius of 30 m or beyond based on the user's terminal.

According to the foregoing references, the total of three device icons (Device 01, Device 02, and Device 03) displayed on the device map of FIG. 39 indicate that a total of three electronic devices are located within the radius of 10 m from the user's terminal. In this example, only the indication icon D1 is highlighted.

A list of previously searched device icons may be displayed on an enlarged circular line when an enlargement icon 47 in FIG. 39(*b*) is selected. Specifically, among the two circular lines displayed in FIG. 39, the inner circular line corresponding to the indication icon D1 may be enlarged and a total of three searched device icons may be displayed with an increased size on the enlarged line (not shown).

Conversely, when a reduction icon 48 in FIG. 39(*b*) is selected, new electronic devices located at a greater distance from the user's terminal are searched and corresponding device icons are displayed on the device map along with the previously searched device icons, one example of which is shown in FIG. 40.

With reference to FIG. 40, device icons, such as Device 04, Device 05, and Device 06, representing three other electronic devices located at the distance corresponding to the indication icon D2 based on the user's terminal are displayed. In this example, it is noted that the distance indication icon D2 is also highlighted with the distance indication icon D1.

When the electronic devices are additionally searched according to the selection of the reduction icon 48, as shown in FIG. 40, an animation screen image, such as a search bar 49 in the from of a radar rotates centering around 'My Device', may be provided on the device map. Additionally, in this example, electronic devices may sequentially appear on the track of the search bar 49 in the radar form.

As discussed with respect to FIG. 39(b), the enlargement icon 47 or the reduction icon 48 displayed in the form of a soft key on the display screen are selected in order to enlarge or reduce the search distance based on the current location of the user's terminal, but other various methods can be applicable.

For example, in configuring the location-based device map, only the electronic devices located within the distance corresponding to the indication item D1 may be first searched and displayed, and when the user makes a motion of snapping down the terminal, the controller 180 may detect the corresponding motion and additionally search the electronic devices located within the next distance, such as the distance corresponding to the indication icon D2. The controller would then display the newly searched electronic devices along with the previously searched electronic devices on the device map. Additionally, the controller 180 may distinguish the device candidate group of each distance to be displayed on the device map, as well as adjusting the distance based on which devices are to be searched.

Moreover, as described above, the controller 180 may confine the category of the electronic devices to be searched to a particular electronic device, such as only "mobile phones," according to a user selection.

Figure 42:
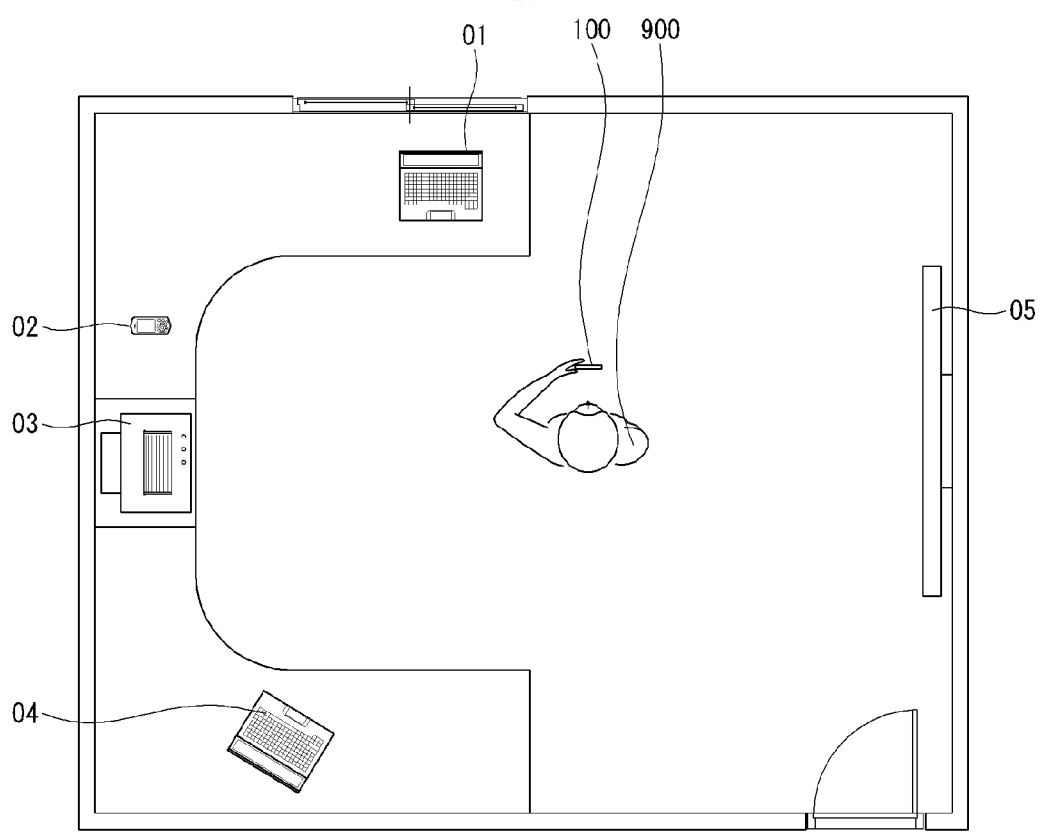
FIGS. 42 and 43 are views for explaining a device map reflecting device locations of a real space according to an embodiment of the present invention.

In displaying the device icons on the circular lines by the distances, the controller 180 may display the device icons by reflecting the directions in which the electronic devices are located. For example, as illustrated in FIG. 42, surveyed locations and directions or other electronic devices 01 to 05 located around the mobile terminal 100 may be reflected on the device map according to their position with respect to the mobile terminal 100 (FIG. 43).

Figure 41:
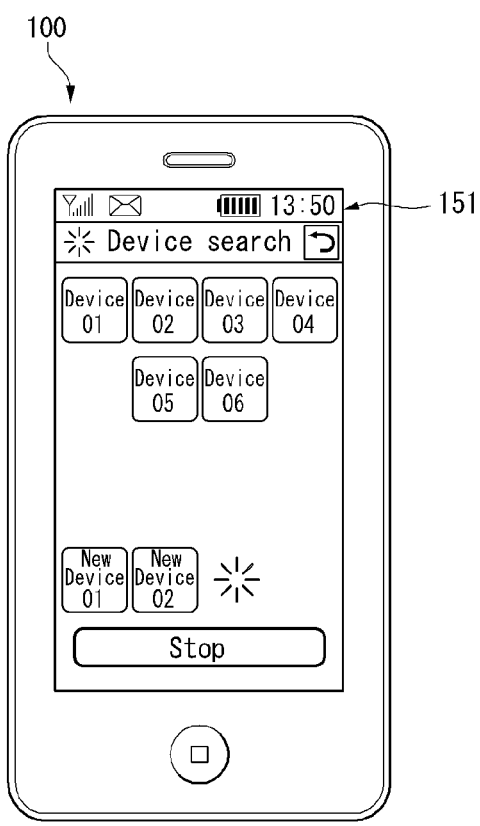
FIG. 41 is an overview of a display screen illustrating a device map including registered device icons and searched device icons according to an embodiment of the present invention.

In addition to the previously discussed embodiments, electronic devices may be displayed on the device map according to the following example. The controller 180 may display the previously registered electronic devices on the device map when a control signal for data communication is input, the controller may then search other electronic devices available for short-range communication based on the current location of the terminal and display the searched new electronic devices on the device map (FIG. 41).

Thus far, the various embodiments have focused on the method of displaying a device map. Hereinafter, a method for selecting an electronic device and a method for performing data communication with the selected electronic device will now be described with reference to FIGS. 45 to 53.

Figure 45:
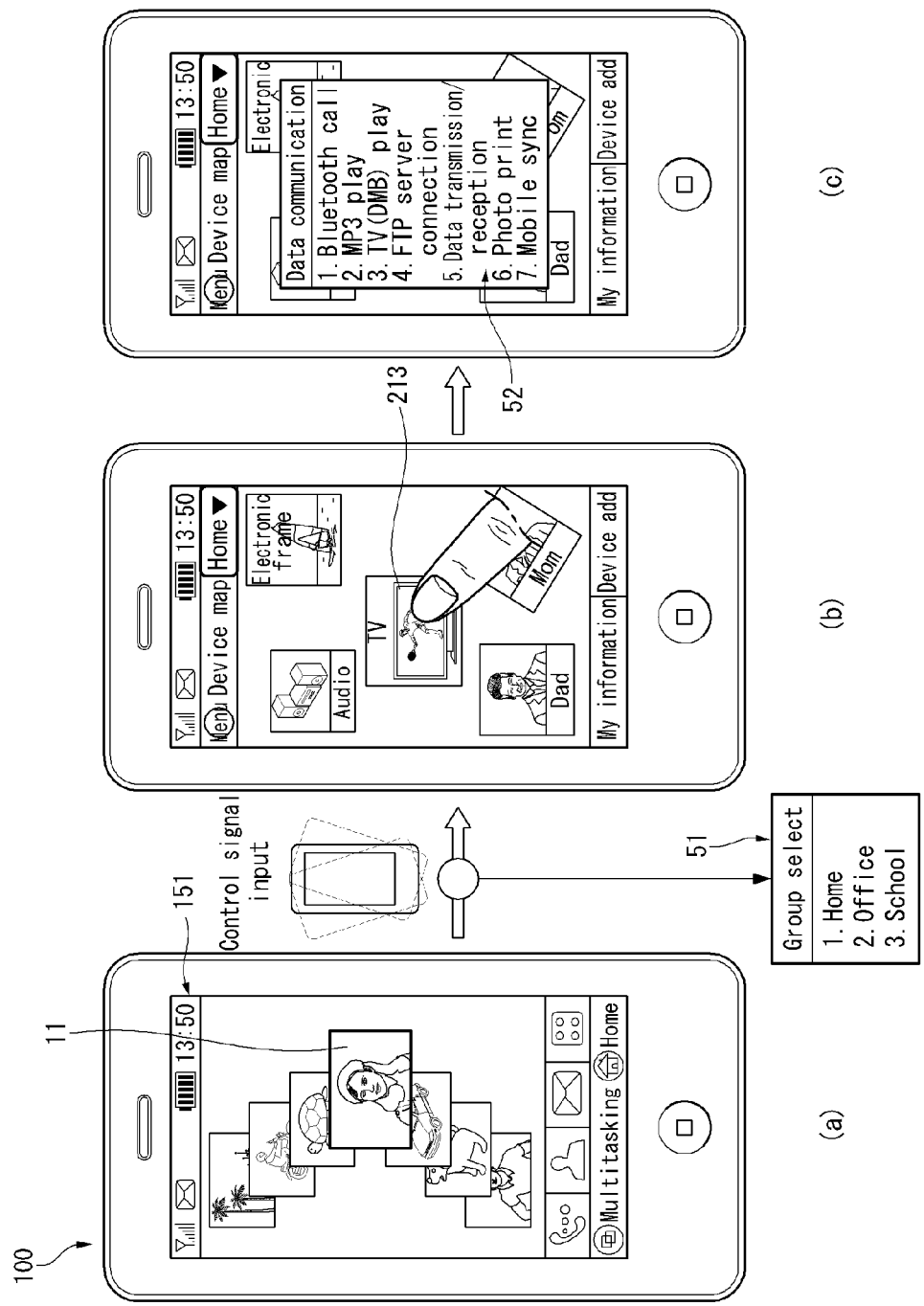
FIGS. 45 and 46 are overviews of display screens illustrating the data communication method of FIG. 44 according to an embodiment of the present invention.
Figure 46:
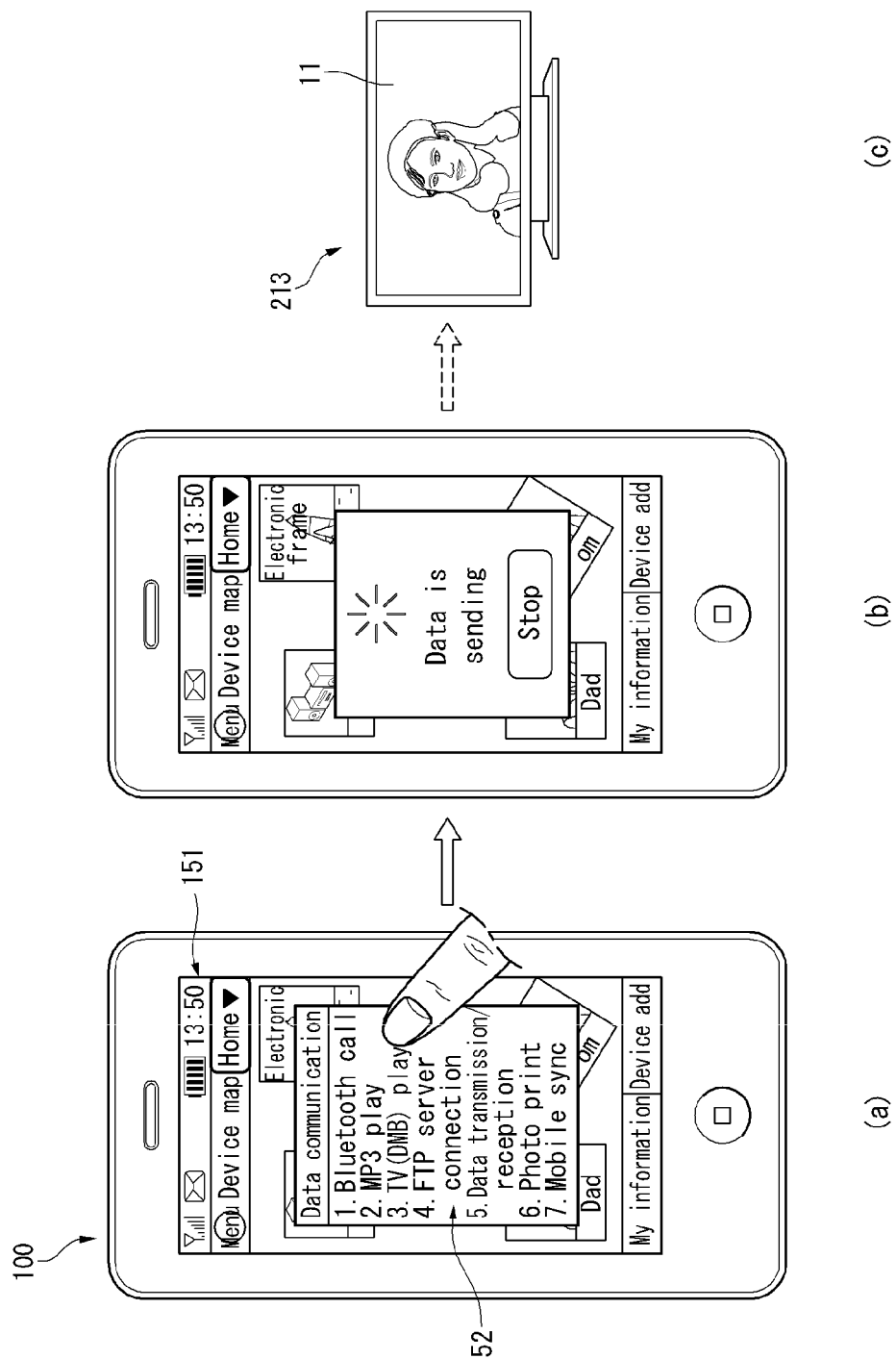

FIGS. 45 and 46 are overviews of display screens illustrating the data communication method of FIG. 44 according to an embodiment of the present invention.

As illustrated in FIG. 44, a user may select content (S110) and then input a control signal for data communication (S120). The mobile terminal may then display a device map (S130) from which the user may select a device from the device map (S140). The mobile terminal may then communication with the selected device (S150).

As illustrated in FIG. 45, a process of selecting a data communication with a device via a pop-up window 52 after a group selection, via a group pop-up window 41, is performed.

With reference to FIGS. 45(c) and 46(a), it is noted that after a device select signal is input (FIG. 45(b)), a process of selecting whether to perform data communication by the user according to a certain function via a pop-up window 52 is additionally performed (FIG. 45(c)). In this example, the functions displayed on the pop-up window 52 for selecting the function of the data communication may be previously set according to type or attribute of the selected electronic device.

According to the present example, a user may select a "TV (DMB) play" function from the pop-up window 52 for selecting the function of the data communication (See FIG. 46(a)) and contents 11 is played on the TV device 213 (See FIG. 46(c)) after performing the data communication (FIG. 46(b)).

FIGS. 45 and 46 present the example where the user directly selects a group of the device map to be displayed on the display screen, but it is merely illustrative and various other examples can be provided.

Figure 47:
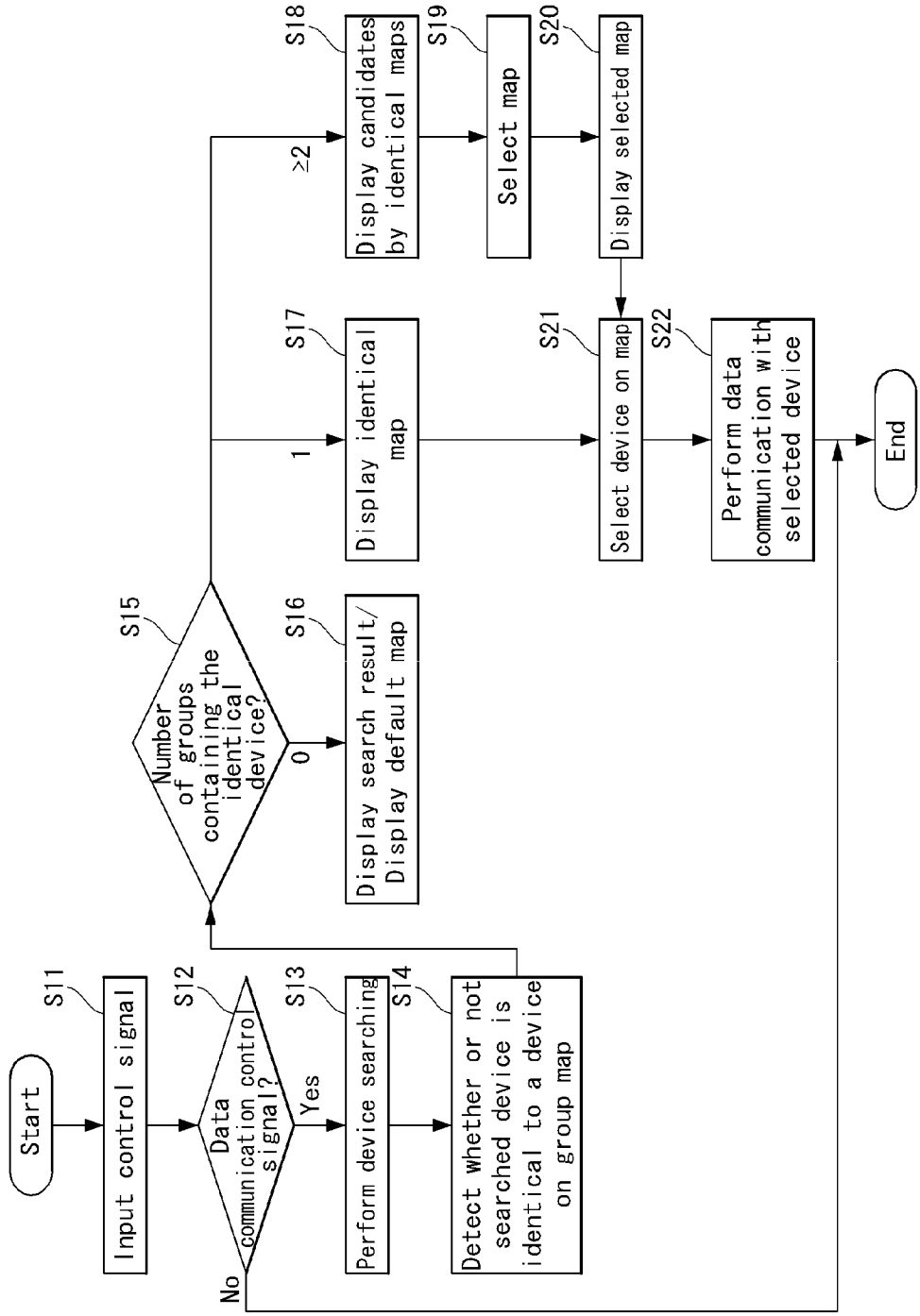
FIG. 47 is a flow chart illustrating a data communication method of a mobile terminal using a device map including a device search process according to an embodiment of the present invention.

For another example, as shown in FIG. 47, when an input control signal is a control signal for data communication (S11 and S12), the controller 180 searches for an electronic device available for short-range communication according to the current location of the mobile terminal 100 (S13). The controller will then determine if the searched electronic device is identical to one of the electronic devices previously registered to the device map (S14). The controller will also determine the number of groups which the device belongs to (S15).

When a registered electronic device is identical to the searched electronic device according to the reading result, the controller 180 automatically displays a device map of the group including the registered electronic device identical to the searched electronic device on the display screen of the terminal (S17). Specifically, in this example, the process of selecting a group by the user, as illustrated in FIG. 45, is not required. For example, when the user is at home and the TV device is searched (S13), the device map of the "home" group to which the TV device has been registered is automatically displayed, and an additional group selecting process is not performed.

If there are two or more groups of device maps identical to the searched device, the controller 180 displays a candidate list according to the identical device maps of the two or more groups on the display screen (S18). This allows the user to select one of the device maps of the groups (S19). Then, the device map of the group selected by the user is displayed (S20).

Unlike the foregoing two examples, if there is no registered electronic device identical to the searched electronic device, the controller 180 may display the search result on the display screen. Alternatively, the terminal may have been set to display a default map according to a setting (S16). Here, the search result may be a pop-up window with content indicating that there is no registered electronic device identical to the searched electronic device, a pop-up window indicating that there is no identical device map, or a device map of a newly generated group including the searched electronic device.

Thereafter, a device is selected from the device map displayed on the display screen (S21) and data communication is performed with the selected device (S22).

In FIG. 47, it is illustrated that when the control signal for data communication is input, the electronic devices around or in the vicinity of the terminal are automatically searched and the device map corresponding to the device search result is displayed.

Figure 48:
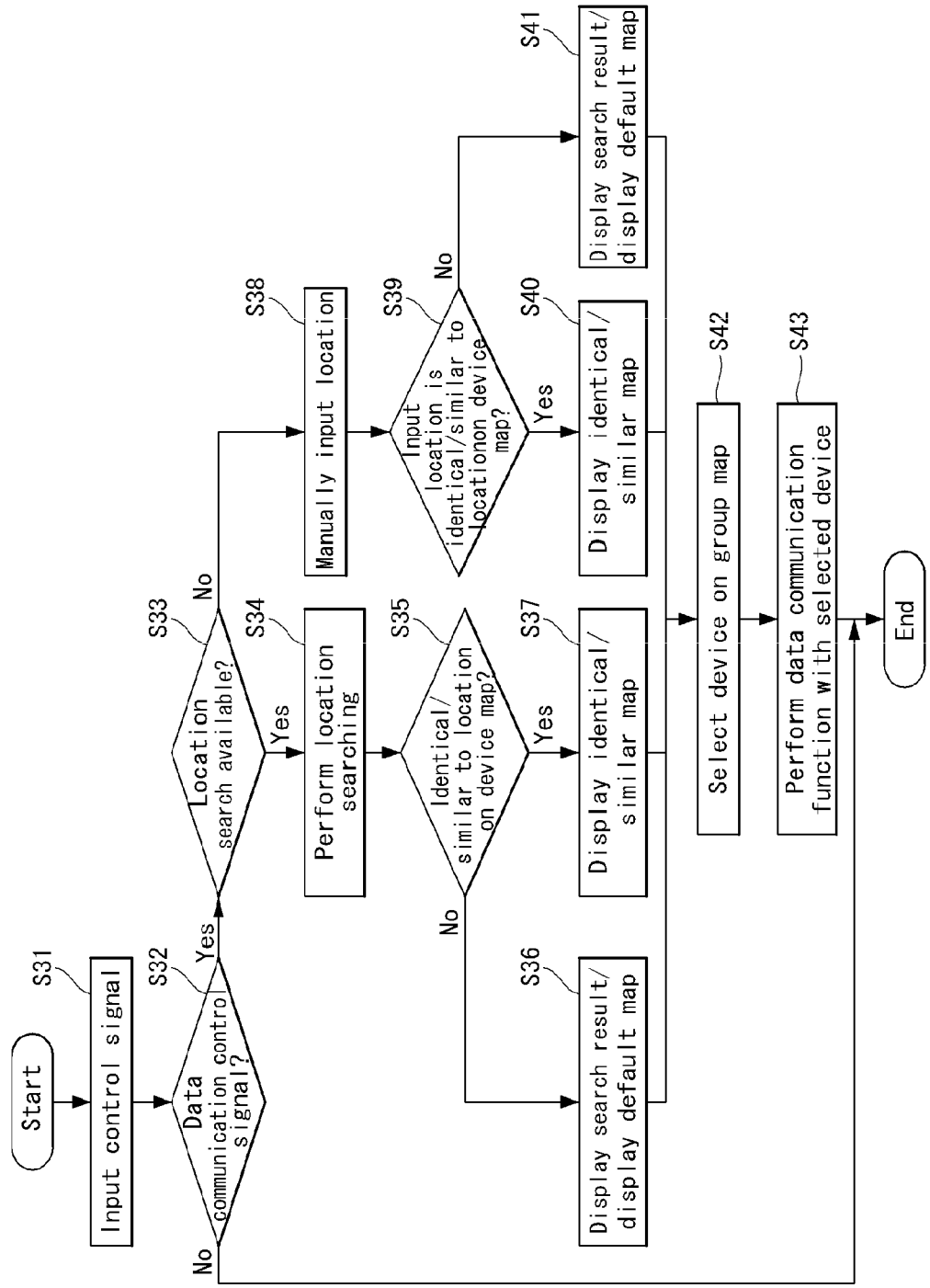
FIG. 48 is a flow chart illustrating a data communication method of a mobile terminal using a device map including a location search process according to an embodiment of the present invention.

Unlike the example of FIG. 47, FIG. 48 illustrates that when the control signal for data communication is input (S31 and S32), it is determined if a current location of the terminal can be searched (S33) and a device map is displayed according to the result.

When it is determined that the current location of the terminal can be searched by using the position-location module 115, location searching is performed (S34). When a device map indicating a location identical to or similar to the searched location has been registered, the identical or similar device map is displayed on the display screen (S35 and S37). If, however, the device map indicating a location identical to or similar to the searched location has not been registered, the search result or a default map may be displayed on the display screen (S35 and S36).

Meanwhile, if it is determined that searching of the current location of the terminal using the position-location module 115 may not be performed according to the determination result of the controller 180, the user may manually input the current location of the terminal (S38), and when a device map indicating a location identical to or similar to the manually input location has been registered, the identical or similar device map is displayed (S39 and S40). If, however, the device map indicating a location identical to or similar to the manually input location has not been registered, the search result or the default map may be displayed on the display screen (S39 and S41).

Additionally, in the example illustrated in FIG. 48, a device is selected from the device map displayed on the display screen (S42) and data communication is performed with the selected device (S43).

Figure 49:
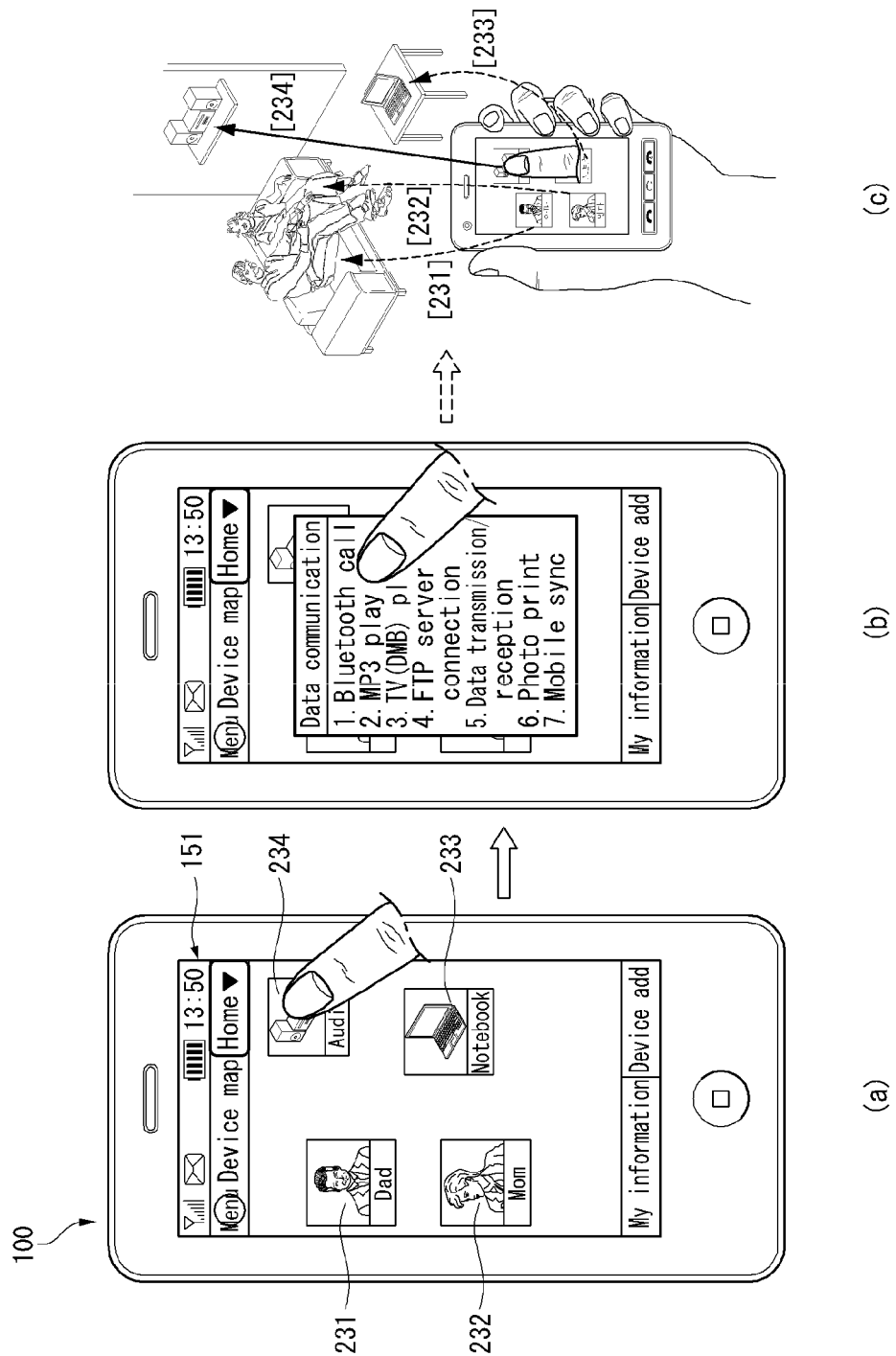
FIG. 49 is an overview of display screens illustrating a data communication method of a mobile terminal using a location-based device map according to an embodiment of the present invention.

In addition to the embodiments illustrated in FIGS. 46 to 48, the device map according to an embodiment of the present invention may display electronic devices located near or around the terminal according to acquired location information of the terminal, an example of which is illustrated in FIG. 49.

FIG. 49 is an overview of display screens illustrating a data communication method of a mobile terminal using a location-based device map.

As shown in FIG. 49, when the control signal for data communication is input, the controller 180 searches for electronic devices actually available for short-range communication based on the current location of the mobile terminal 100 by using the short-range communication module 114. The controller will display a new device map including only the electronic devices 231 to 234 found via the search on the display screen (FIG. 49(*a*)). FIG. 49(*c*) illustrates the location of the actual devices which results in the device map of FIG. 49(*a*).

In this example, the controller 180 may acquire the current location information of the mobile terminal 100 by using the position-location module 115 and automatically sort the device map into a group corresponding to the acquired location information. For example, in the example illustrated in FIG. 49, because the current location of the mobile terminal 100 is the user's home, the controller 180 may automatically sort the device map as a device map of the "home" group.

It is noted that the device map of the "home" group in FIG. 49 displayed on the display screen according to the process is different from the device map (See FIG. 45(*b*)) of the "home" group which has been previously registered.

As illustrated in FIG. 49, the user may select the audio device 234 from among the electronic devices 231 to 234 displayed on the device map (FIG. 49(*a*)) and then select a data communication function, such as an "MP3 play" function (FIG. 49(*b*)), associated with the audio device 234, such that data communication is performed with the selected audio device 234.

Figure 50:
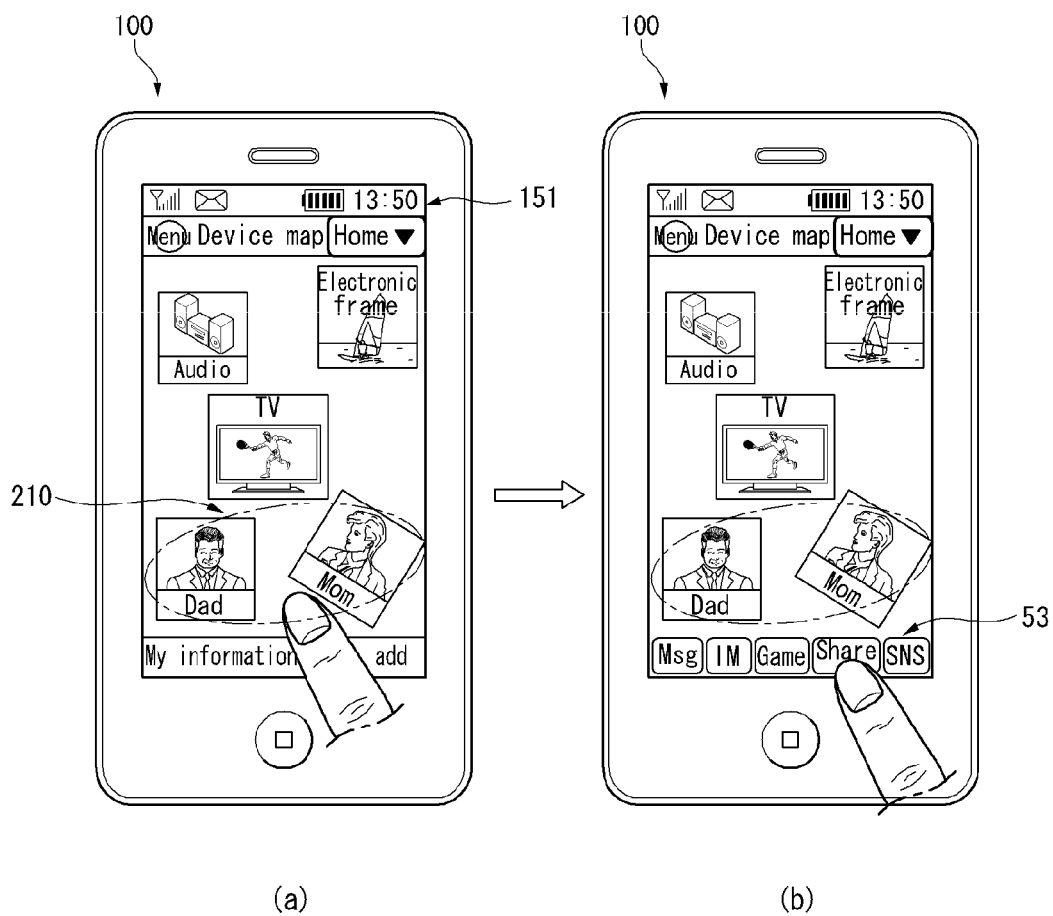
FIG. 50 is an overview of display screens illustrating a data communication method through device grouping on a device map according to an embodiment of the present invention.

FIG. 50 is an overview of display screens illustrating a data communication method via device grouping on a device map. In the data communication method using a device map according to an embodiment of the present invention, the process of selecting electronic devices may be performed by grouping two or more electronic devices.

In a state that the device map is displayed, when a grouping of two or more electronic devices included in the device map is selected, an executable data communication menu 53 according to the grouping may be displayed on the display screen of the terminal (FIG. 50(*b*)).

In this example, when the data communication menu is selected (FIG. 50(*b*)) or the grouped electronic devices are touch-and-dragged to the data communication menu, the data communication according to the selected function may be executed.

According to an embodiment of the present invention, by selecting the electronic devices using the grouping scheme, a common community environment can be provided to the plurality of electronic devices. For example, friends, family members, or colleagues, who have the grouped electronic devices, can perform instant messaging (IM), share messages, or simultaneously access online games.

In the data communication method using the device map according to an embodiment of the present invention, selection of an electronic device or data communication with the selected electronic device may be performed through an operation 5100 (FIG. 51) such as shaking the mobile terminal 100 at another electronic device present in a particular direction and location.

In this example, the controller 180 may detect the direction indicated by the shaking motion from a detect signal transferred from the motion sensor mounted in the mobile terminal 100. Additionally, the controller 180 may check an electronic device present at the location corresponding to the direction indicated by the detected shaking motion. Accordingly, the controller 180 may perform data communication with the checked electronic device via the short-range communication module 114.

In this example, the data communication with the location-checked electronic device may be performed such that data desired to be transmitted is transmitted to the electronic device via various methods. One of such methods is illustrated in FIG. 52.

Figure 52:
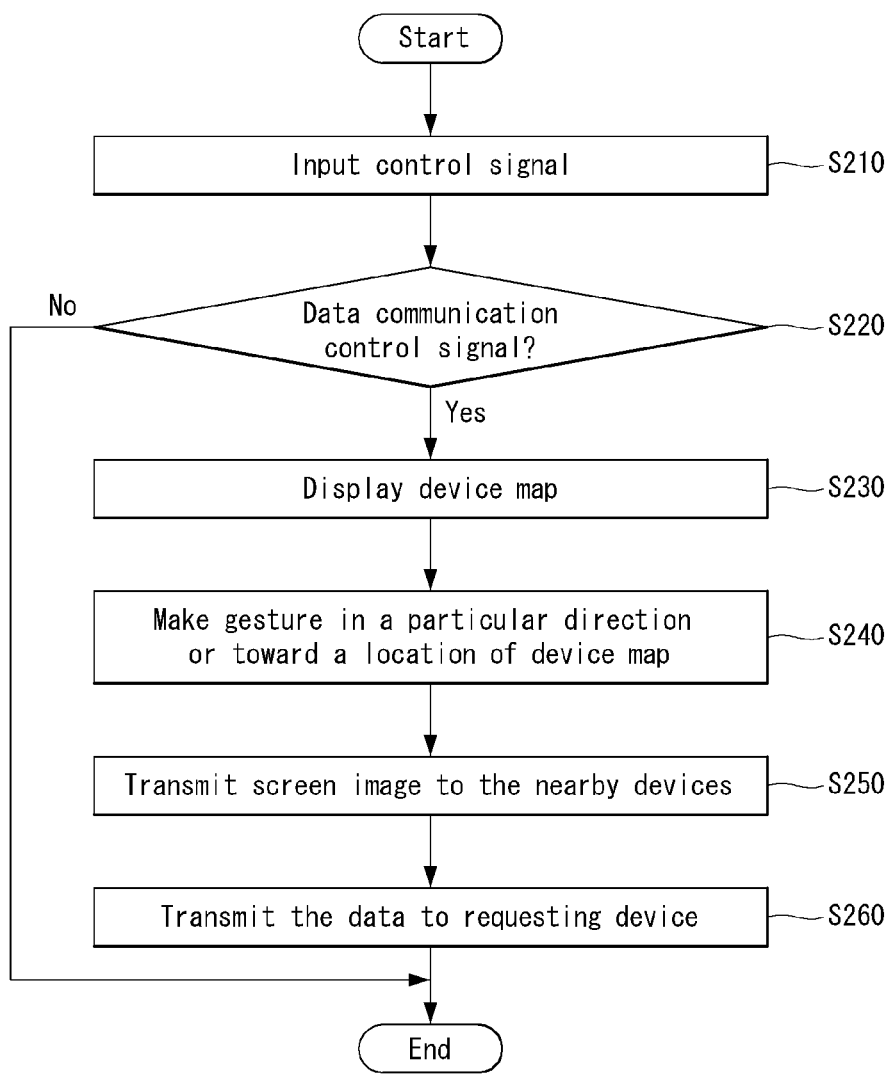
FIG. 52 is a flow chart illustrating a data communication method of a mobile terminal using a device map according to an embodiment of the present invention.
Figure 53:
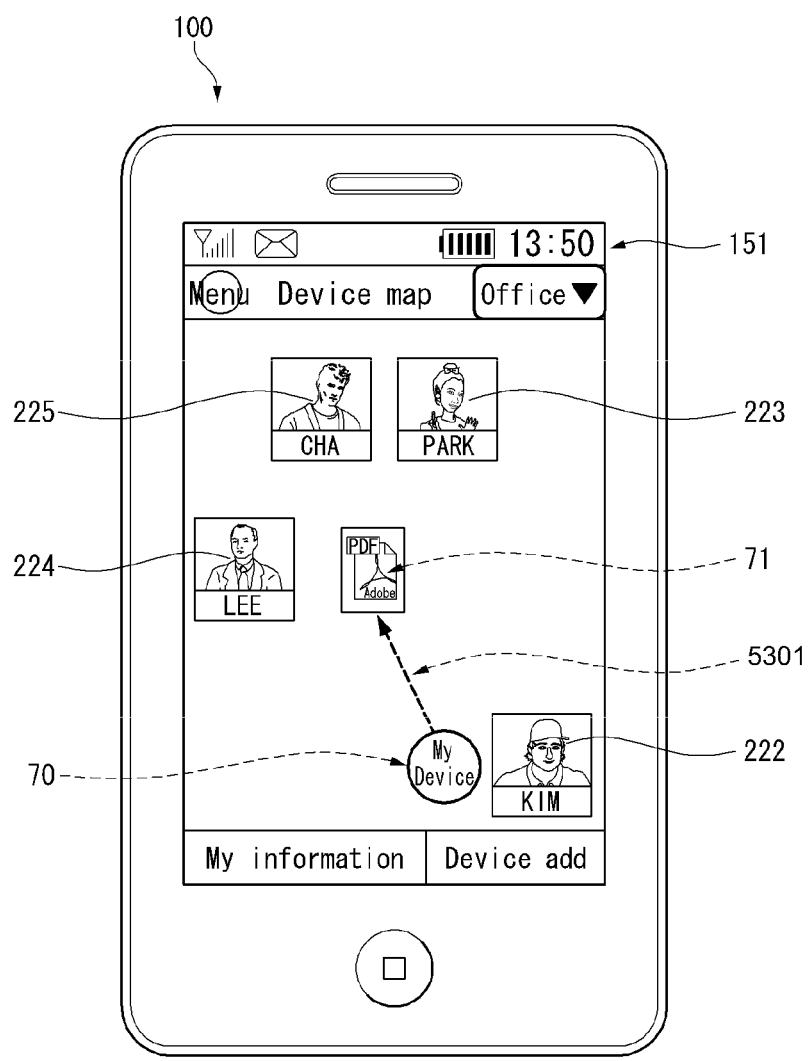
FIG. 53 is an overview of a display screen illustrating the data communication method of FIG. 52.

FIG. 52 is a flow chart illustrating a data communication method of a mobile terminal using a device map according to an exemplary embodiment of the present invention. FIG. 53 is an overview of a display screen illustrating the data communication method of FIG. 52.

When the input control signal is a control signal for data communication (S210 and S220), the controller 180 displays a device map on the display screen (S230). In this example, the method of displaying a device map has been described above through various embodiments, thus a detailed description will be omitted.

Figure 51:
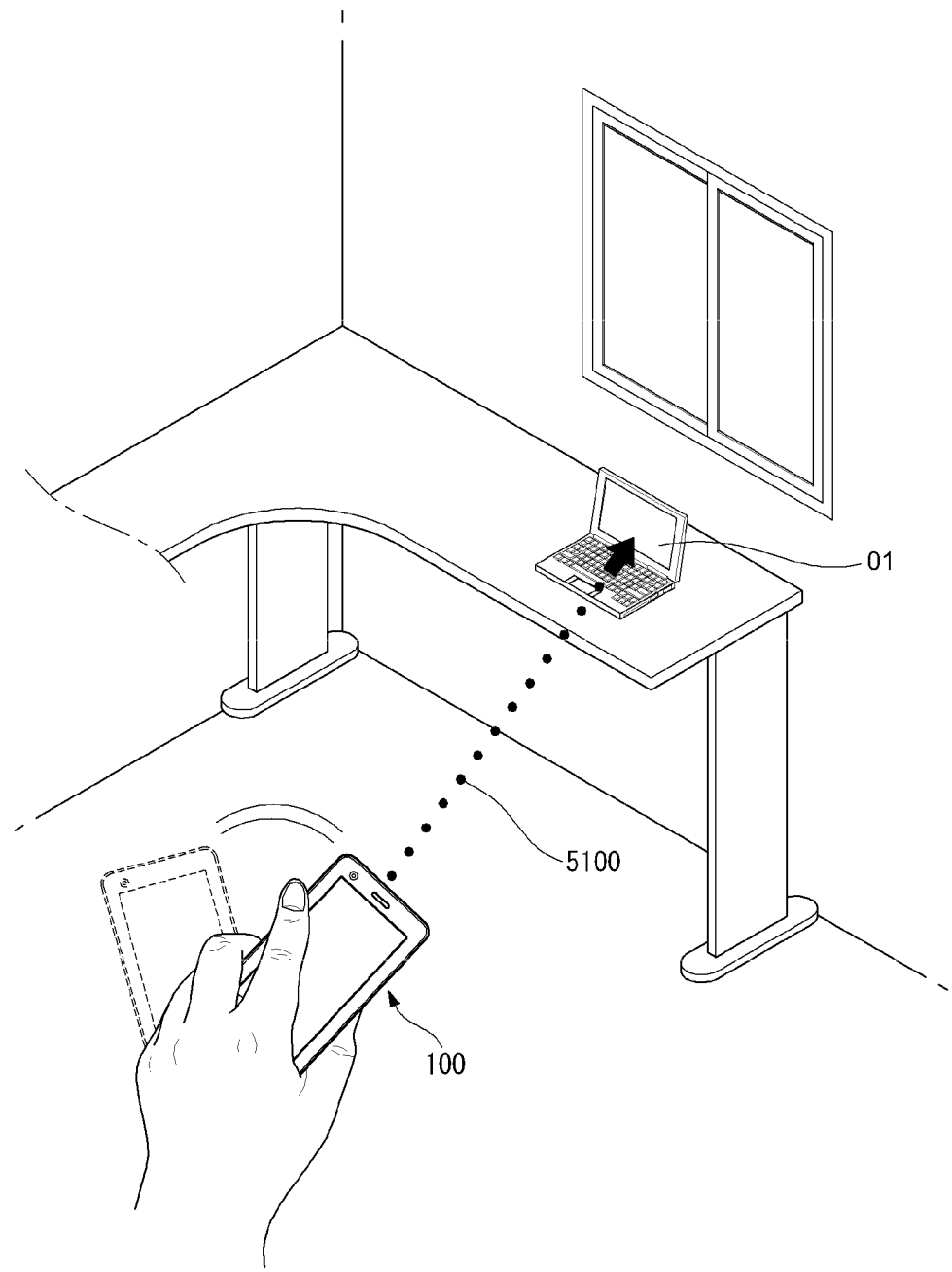
FIG. 51 is a view for explaining a data communication method according to a motion as if a mobile terminal is cast according to an embodiment of the present invention.

With the device map displayed, when the user makes a gesture, such as shaking the terminal in a particular direction or at a location as shown in FIG. 51 (S240), the controller 180 transmits a display screen image to the electronic devices located in the direction or location indicated by the motion (S250).

Thereafter, when an electronic device requests the content, the controller 180 transmits the content to the requesting electronic device (S260).

The process of the data communication method according to the flow chart of FIG. 52 will now be described with reference to FIG. 53. For the sake of brevity, it is assumed that the device map illustrated in FIG. 53 is a location-based device map reflecting relative location relationships with mobile phones based on the location of the terminal 70.

According to the location-based device map illustrated in FIG. 53, a mobile phone 222 of "KIM," is located at the very right side of the user's location 70, a mobile phone 223 of "PARK" is located in a forward direction from the user's location 70, a mobile phone 225 of "CHA" is located in the direction forward and to the left of the user's location 70, finally a mobile phone 224 of "LEE" is located to the left and above the user's location 70.

When the user wants to transmit data 71 to "PARK," "CHA" and "LEE," the user may make a gesture, such as shaking the terminal, in the direction 5301 in which device icons 223, 225 and 224 are displayed.

The controller 180 may then display an animation of the data 71 moving on the displayed device map, as if the data 71 is being thrown towards the device icons 223, 225, and 224.

In this example, the controller 180 may transmit the displayed screen image, specifically, the controller 180 may transmit the displayed device map in the state that the data is thrown around, or simply transmit the display screen image including the device map, to the electronic devices associated with the device icons 223, 225, and 224. The controller 180 may then transmit the data 71 to an electronic device which requests the data 71 upon viewing the screen image.

Thus far, an example where the electronic device is selected and data communication is performed according to a movement of the terminal has been described. However, in another embodiment of the present invention, the selection of the electronic device and data communication may be also executed by a touch gesture or a different type of motion gesture.

For example, "T," an initial of TV, may be registered as a touch input for selecting the TV device.

For another example, a 3D motion input may be utilized to select an electronic device. A 3D motion input of a circle may be previously registered to a particular electronic device for data communication, and when such a 3D motion input is detected, the controller 180 may determine the input to be a signal for selecting the associated electronic device.

In addition to the inputs described above, various motion inputs such as a wobbling motion, a tilting motion, or a snapping motion, may also be associated as signals for selecting the electronic device.

Figure 54:
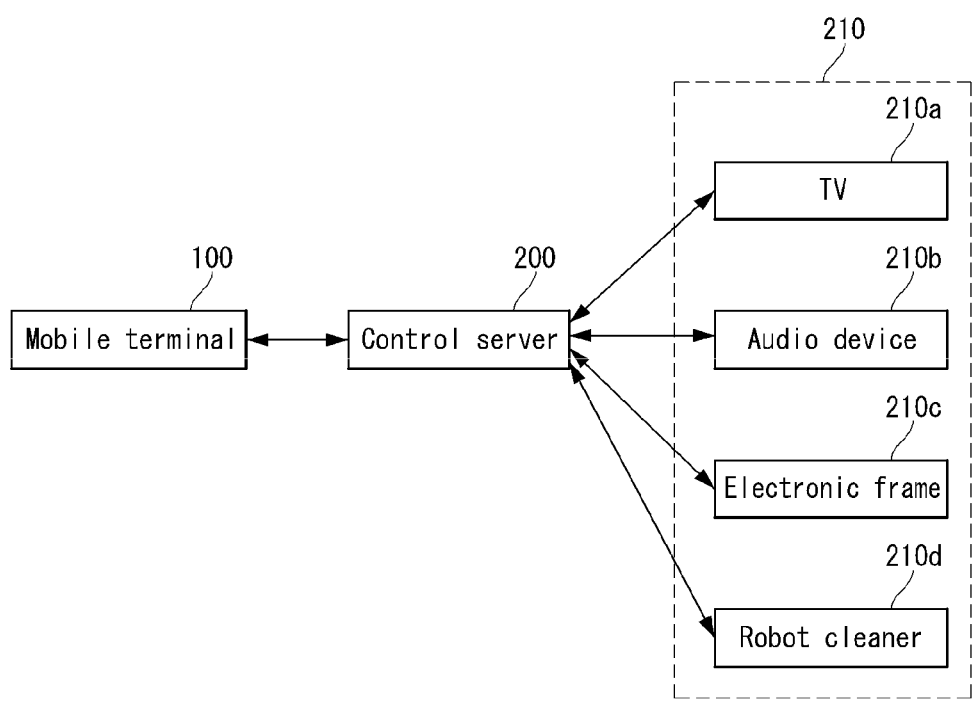
FIG. 54 is a schematic block diagram of a network system employing an operation control method of a mobile terminal according to an embodiment of the present invention.

FIG. 54 is a schematic block diagram of a network system employing an operation control method of a mobile terminal according to an embodiment of the present invention.

With reference to FIG. 54, the mobile terminal 100 is connected to communicate with a control server 200 via a connection such as the Internet, or a short-range communication. The control server 200 is connected to communicate with electronic devices 210 such as a TV 210a, an audio device 210b, an electronic frame 210c, and a robot cleaner 210d, via wired or wireless communication. The electronic devices 210 may be located in a building, and the control server 200 may be installed outside a building or within the building.

With such a configuration, the mobile terminal transmits a command for controlling the operation of at least one of the electronic devices 210 to the control server 200, and the control server 200 may control the operation of an electronic device according to the command received from the mobile terminal 100. Additionally, data may be directly transmitted and received between the mobile terminal 100 and the electronic devices 210.

Accordingly, the operation of the electronic devices 210 may be remotely controlled outside or within the building in which the electronic devices 210 are located via the mobile terminal 100.

Figure 55B:
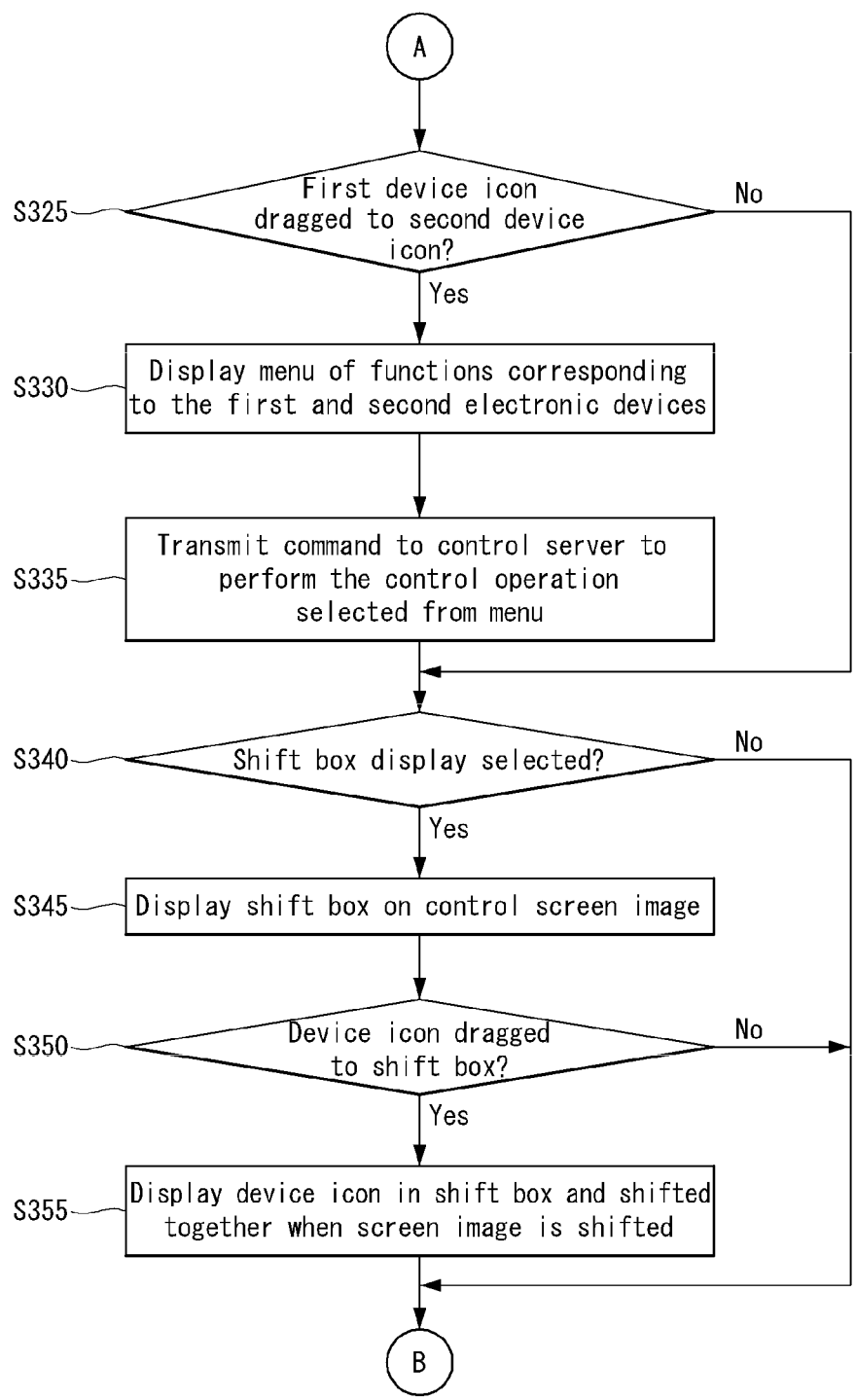
Figure 55C:
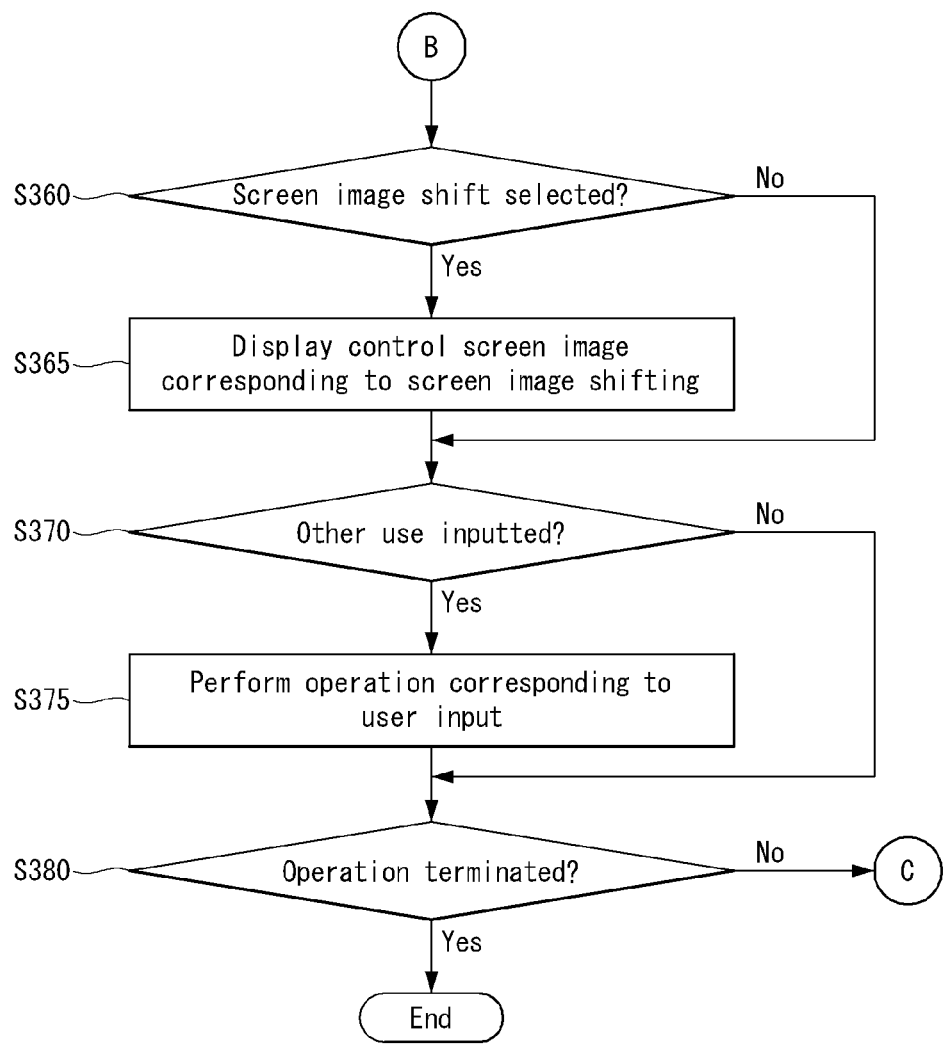

FIGS. 55A to 55C are flow charts illustrating an operation control method of a mobile terminal according to an exemplary embodiment of the present invention. With reference to FIG. 55A, when a mode for remotely controlling an electronic device according to a user instruction is selected, the controller 180 displays a control screen image representing the space in the building where the electronic device is located as a 3D virtual reality image (S300).

The control screen image expressed as the 3D virtual reality image may be produced directly by the user by synthesizing photo images obtained by capturing images of the space in the building where the electronic device is located with the mobile terminal 100 or produced by a network service provider and provided to the user.

When the control screen image is displayed, the controller 180 sets device icons corresponding to each electronic device and displays the device icons on the control screen image according to a user instruction (S305). In this example, the device icons may be set by displaying icon images on the control screen image and then matching the actual electronic devices to the icon images. Alternatively, an image corresponding to an electronic device may be selected from the control screen image and then matched to the actual electronic device. The device icon may be freely moved to be displayed on the control screen image.

When the device icons corresponding to the respective electronic devices are set and one of the device icons displayed on the control screen is selected via an input (S310), the controller 180 displays a control menu for controlling the operation of the electronic device associated with the selected device icon (S315). The controller 180 transmits a command corresponding to a control operation selected from the control menu to the control server 200, such that the selected control operation can be performed on the corresponding electronic device (S320). Accordingly, the control server 200 controls the operation of the corresponding electronic device.

With reference to FIG. 55B, when the icon of a first device on the control screen image is dragged to the icon of a second device (S325), the controller 180 displays a control menu for functions corresponding to the first and second electronic devices associated with the first and second device icons, respectively (S330). The controller 180 transmits a command corresponding to a control operation selected from the control menu to the control server 200 such that the selected control operation can be performed between the first and second electronic devices (S335). Accordingly, the control server 200 provides control to perform interworking operations between the first and second electronic devices.

When a command for displaying a shift box is selected (S340), the controller 180 displays a shift box on one area of the control screen image (S345). A shift box may be represented as a dashed line, or any distinguishing feature. When one of the device icons is dragged to the shift box (S350), the controller 180 displays the dragged icon in the shift box, and when the control screen image is shifted, the controller 180 shifts and displays both the shift box and the device icon (S355). Thus, because the device icon displayed in the shift box can be moved to be displayed on the control screen image of a difference space, controlling can be cooperatively performed with the electronic device located in the different space.

With reference to FIG. 55C, when screen image shifting is selected (S360), the controller 180 displays a control screen image corresponding to the screen image shifting on the display module 151 (S365). The screen image may be shifted to an area of the control screen image where a device icon is not displayed. Additionally, in a state that an overall map of the building is displayed on the control screen image, the control screen image may be shifted to be displayed correspondingly according to an area selected from the overall map.

When there is a user input such as a touch input or a key input (S370), the controller 180 controls an operation corresponding to the user input (S375). When termination of the operation is not selected, the controller 180 repeatedly performs the process following step S210 of FIG. 52 (S380).

Through such a process, the control screen image illustrating the space in the building as a three-dimensional virtual reality image is displayed, and the electronic devices in the building can be individually or separately controlled or cooperatively controlled via the control screen image.

Figure 56:
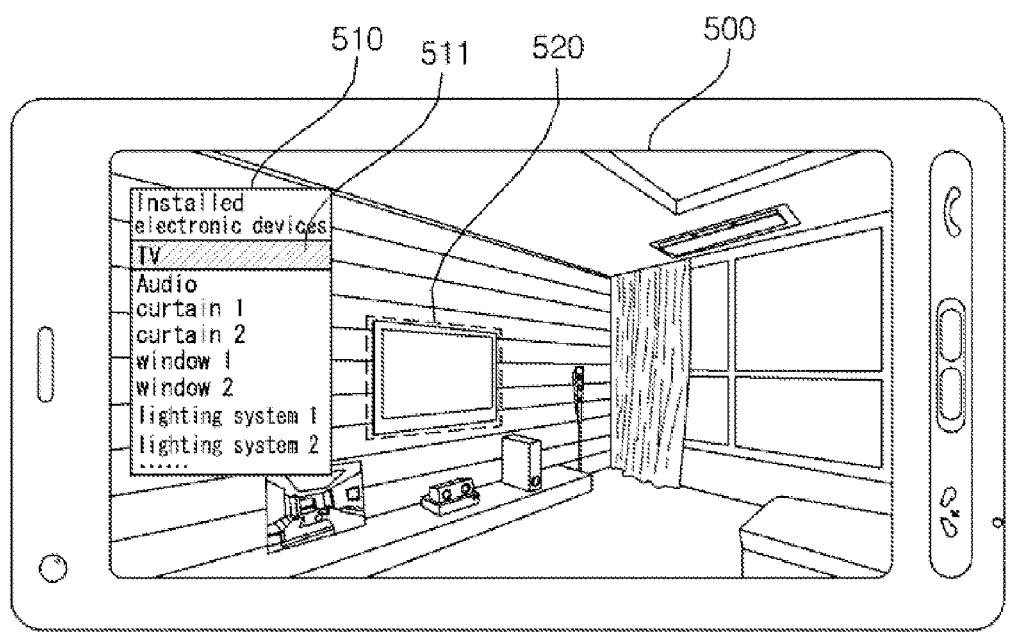
FIGS. 56 to 58 are overviews of display screens illustrating the process of setting a device icon in an operation control method of a mobile terminal according to an embodiment of the present invention.
Figure 57:
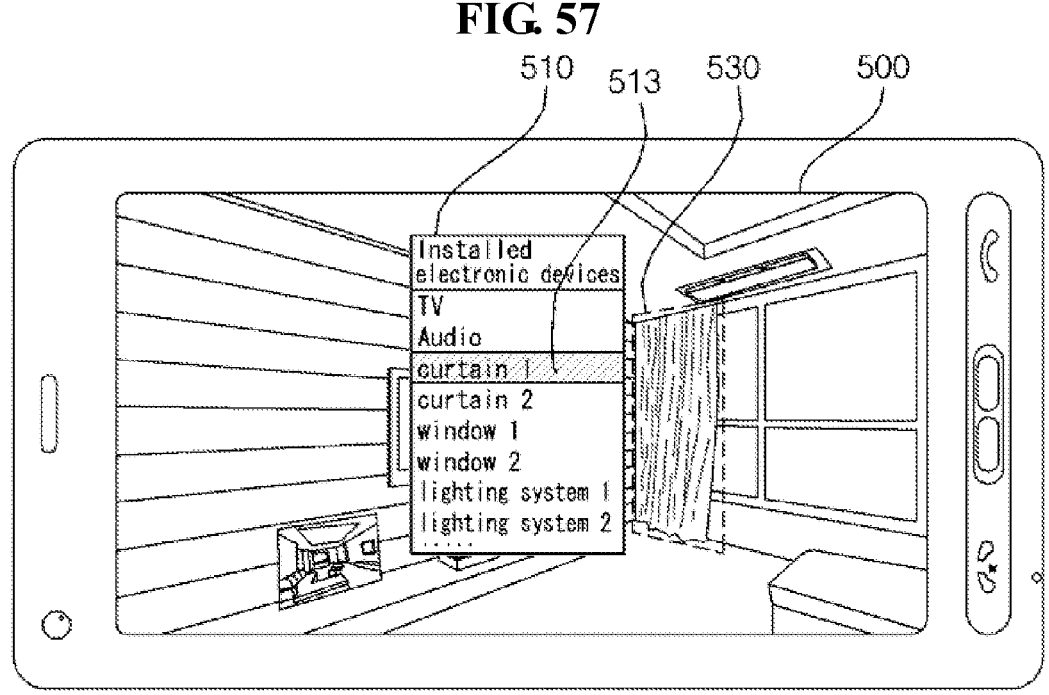
Figure 58:
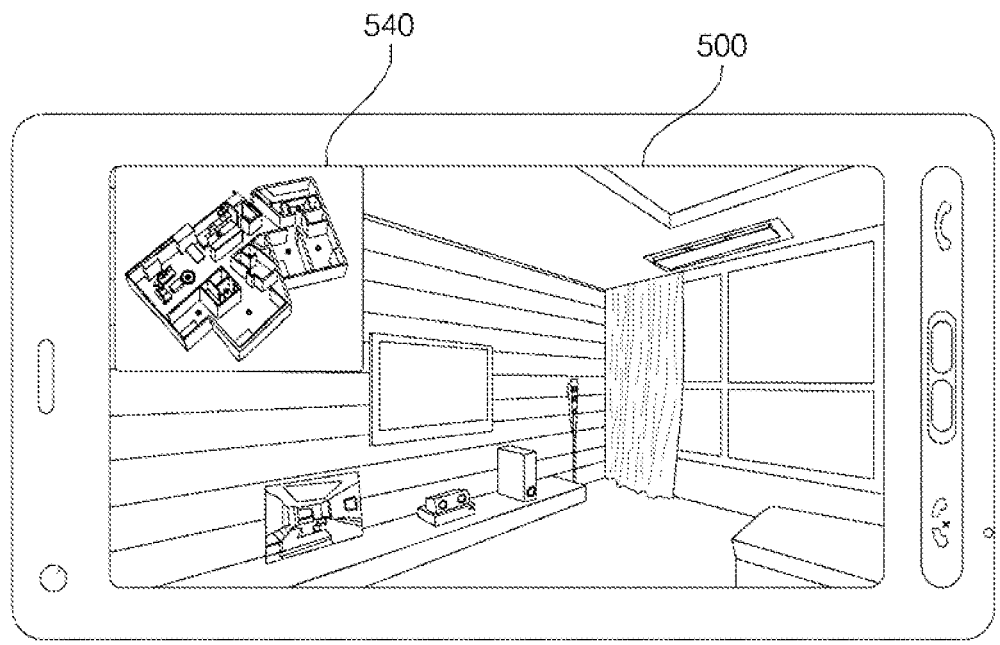

FIGS. 56 to 58 illustrate the operation control method of the mobile terminal together with screen images displayed on the display module of the mobile terminal. Specifically, FIGS. 56 to 58 are overviews of display screens illustrating the process of setting a device icon in an operation control method of a mobile terminal according to an embodiment of the present invention.

FIGS. 56 and 57 illustrate an example of a control screen image expressing the space in the building where electronic devices are located as a three-dimensional virtual reality image. An image corresponding to an electronic device on the control screen image 500 may be set as a device icon.

In FIG. 56, a TV image 520 displayed on the control screen image 500 is selected and allocated to a "TV" item 511 of a list 510 of installed electronic devices in order to set a TV device icon. In FIG. 57, a curtain image 530 displayed on the control screen image 500 is allocated to a "curtain 1" item 513 of the list 510 of the installed electronic devices to set a curtain device icon. The image set as the device icon on the control screen image 500 may be freely shifted to be displayed in a touch-and-dragging manner on the control screen image 500.

For an electronic device located in another area in the building, a device icon may be set according to a process as described above. To this end, screen image shifting may be selected to display a control screen image with respect to a different space in the building.

Selection of screen image shifting may be performed by touching-and-dragging an area of the control screen image 500 without a device icon or by inputting a direction key provided on the user input unit 130. As shown in FIG. 58, an entire map 540 in the building may be displayed on the control screen image 500 and a desired area of the entire map 540 may be touched to display a control screen image with respect to a different space of the building.

In this manner, the device icon corresponding to an actual electronic device may be set from the control screen image 500 expressed as the three-dimensional virtual reality image, and an electronic device located in the building may be controlled via the set device icon.

FIGS. 59 to 64 are overviews of display screens illustrating the process of controlling an actual electronic device by using a device icon in an operation control method of a mobile terminal according to an embodiment of the present invention.

Figure 59:
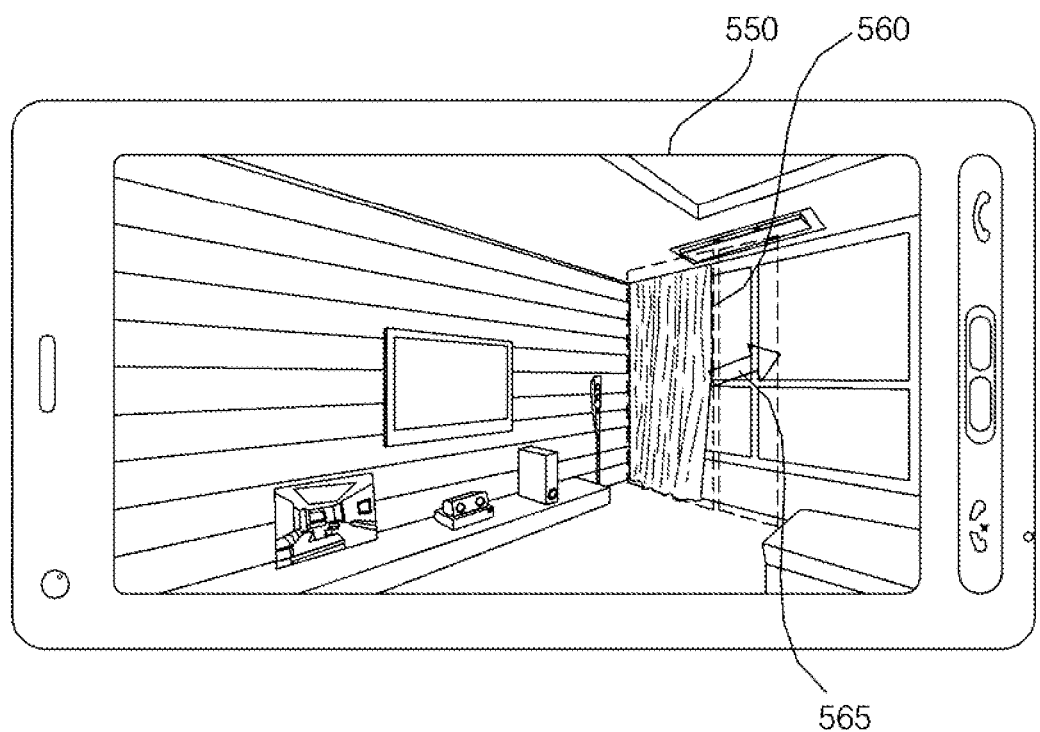
FIGS. 59 to 64 are overviews of display screens illustrating the process of controlling an actual electronic device by using a device icon in an operation control method of a mobile terminal according to an embodiment of the present invention.

FIG. 59 shows a control screen image 550 with a curtain device icon 560. When the curtain device icon 560 on the control screen image 550 is touched and dragged in a certain direction 565, the curtain located in the building is closed via the control server 200. In this manner, opening and closing the curtain can be controlled in a touch-and-drag manner.

Figure 60:
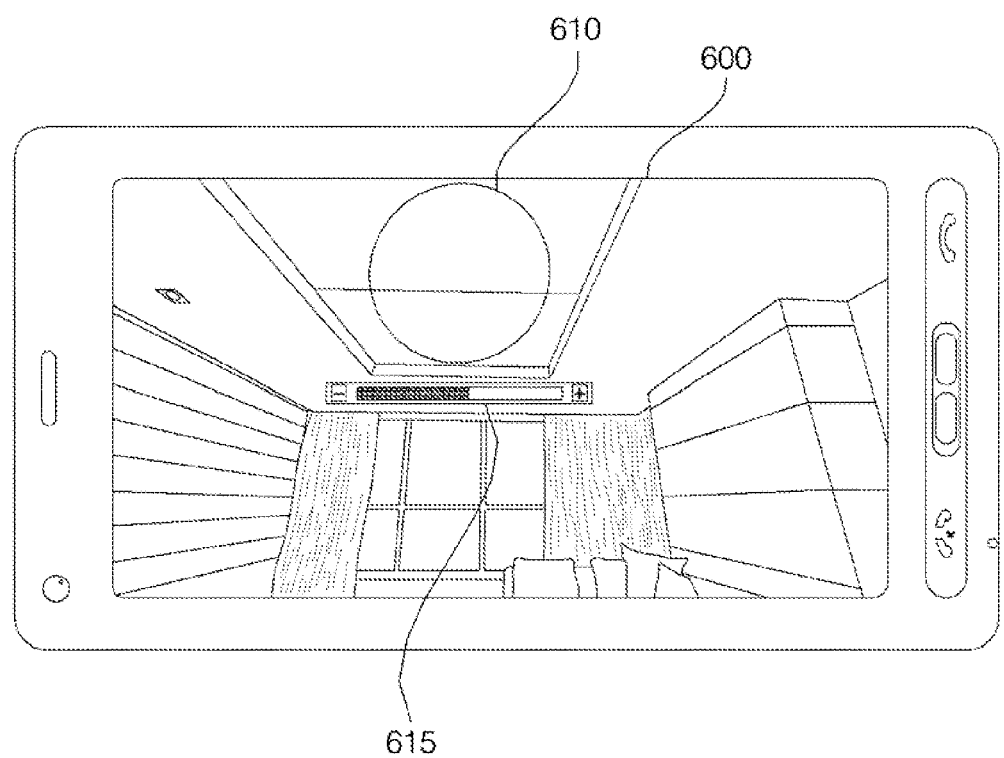

FIG. 60 shows a control screen image 600 with a lighting system icon 610. When the lighting system icon 610 on the control screen image 600 is selected, a menu 615 for adjusting brightness of illumination is displayed, and the brightness of illumination in the actual building may be adjusted via the menu 615.

Other devices such as windows, air-conditioners, and heating systems, located in the building can be also controlled in a manner similar to the examples described above.

Figure 61:
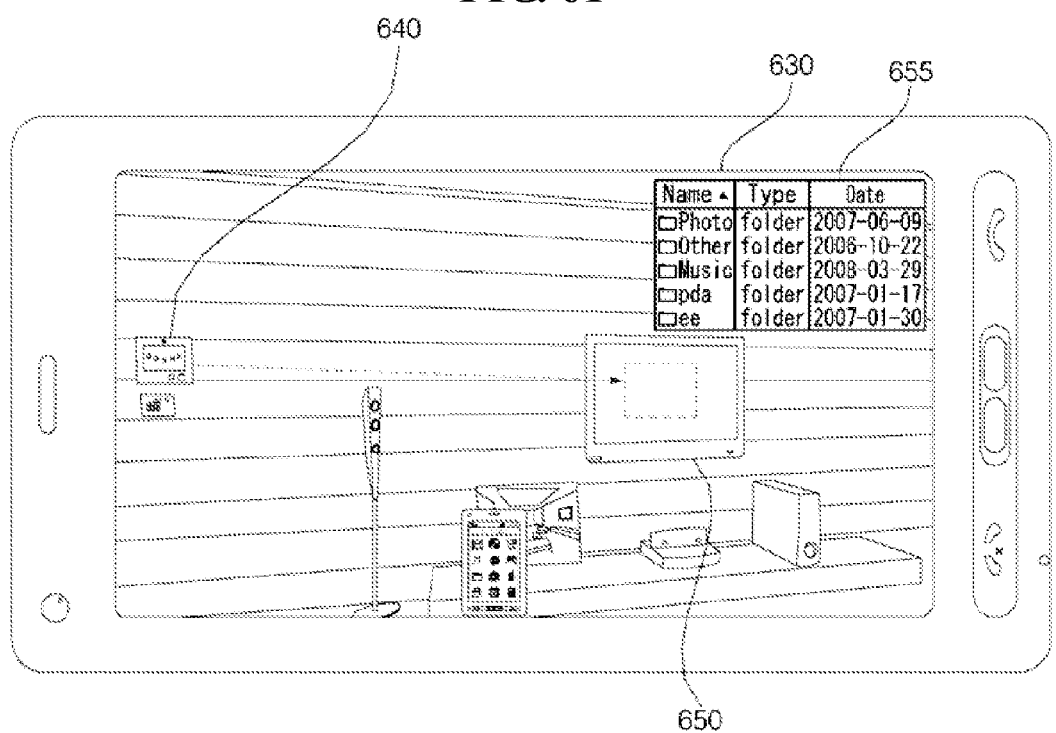

FIG. 61 shows a control screen image with a device icon. When a device icon 640 of the control server 200 is touched and dragged to a TV device icon 650, a file list 655 stored in the control server 200 may be displayed. When one of the files on the displayed file list 655 is selected, the selected file may then be played on the actual TV.

Figure 62:
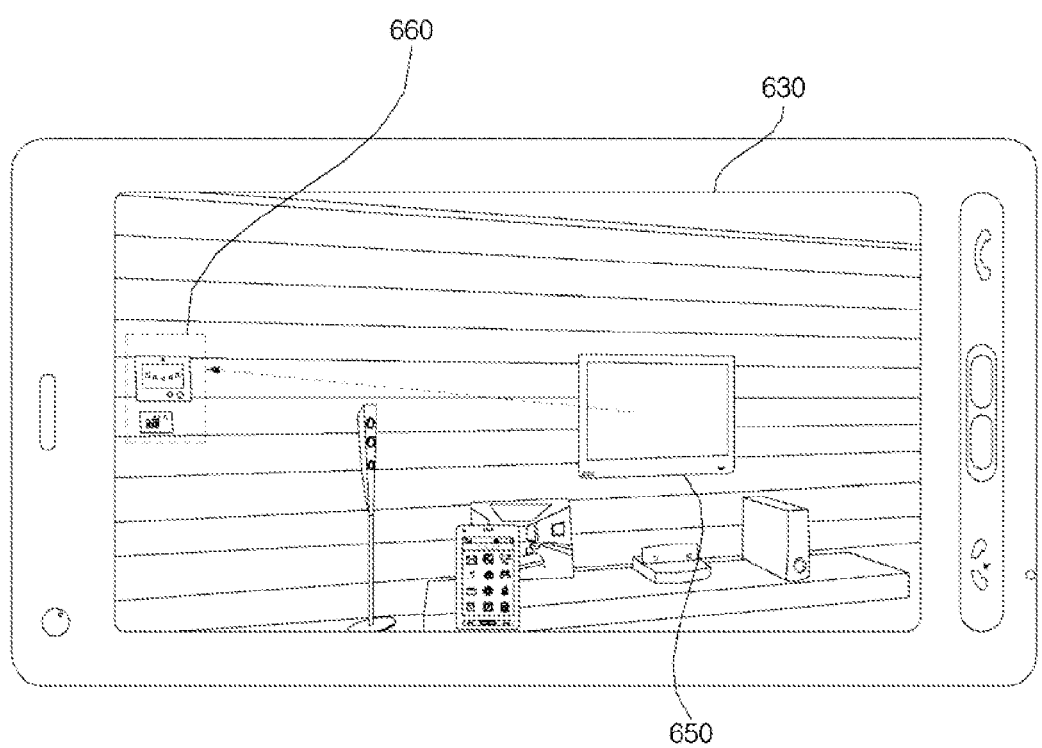

Also, as shown in FIG. 62, when the TV device icon 650 is touched and dragged to a device icon 660 of the control server 200, a broadcast program played on the actual TV can be recorded in the control server 200.

The principle of the operation between the control server 200 and the TV is based on the embodiment that the mobile terminal 100 transmits a command to the control server 200 and the control server 200 transmits and receives data to and from the TV via a wired or wireless connection.

Figure 63:
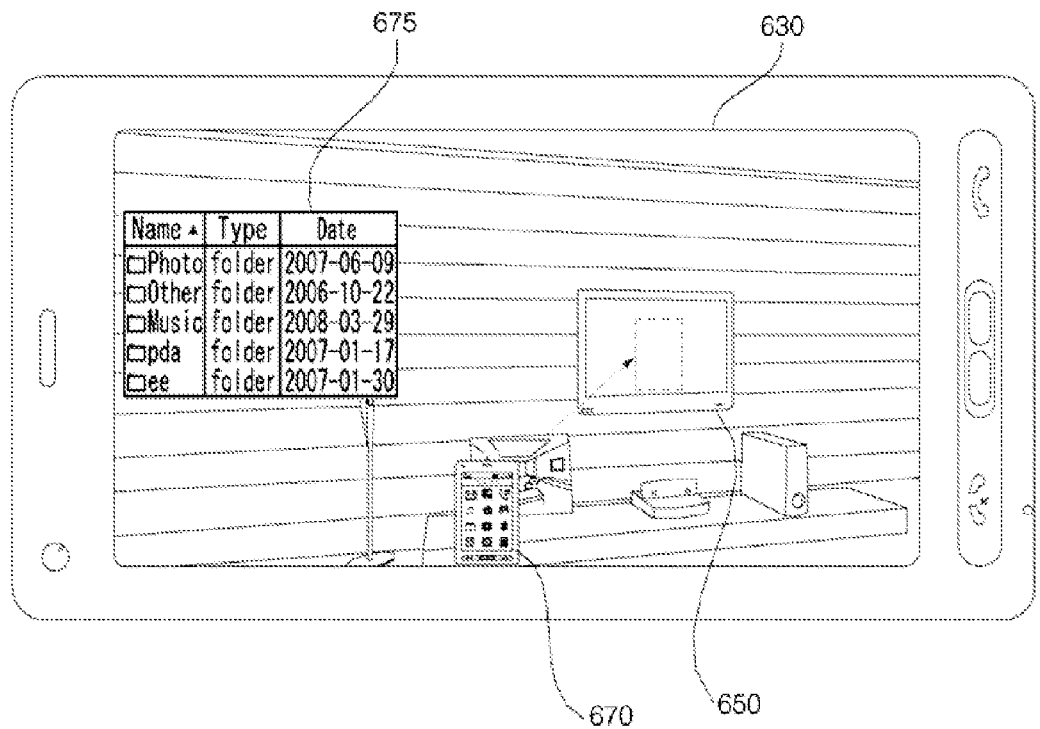

As shown in FIG. 63, a device icon 670 of the mobile terminal 100 is displayed on the control screen image 630, when the device icon 670 is touched and dragged to the TV device icon 650, a list 675 of files stored in the mobile terminal 100 may be displayed. When one of the files on the displayed list 675 is selected, the file may then be played on the actual TV.

Figure 64:
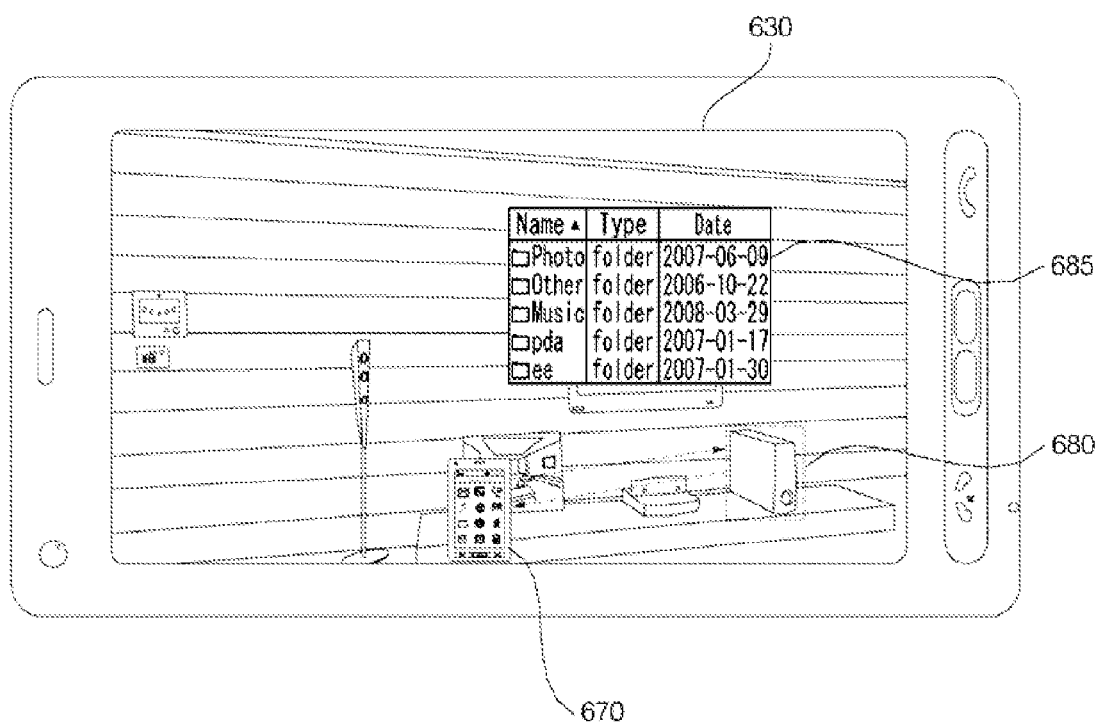

As shown in FIG. 64, when the device icon 670 of the mobile terminal 100 is touched and dragged to a device icon 680 of an audio device, a list 685 of files stored in the mobile terminal 100 is displayed. When a file on the file list 685 is selected, the selected file is played on the audio device.

Reversely, when the device icon 680 of the audio device is dragged to the device icon 670, music played from the audio device may be recorded to the mobile terminal 100.

In the same manner, when the device icon with respect to the control server 200 is dragged to the device icon 680 of the audio device, a music list of the control server 200 is displayed and a file selected from the music list may be played on the audio device. Additionally, while music is being played from the audio device, when the device icon 680 of the audio device is touched and dragged to the device icon of the control server 200, the music played from the audio device can be recorded by the control server 200.

FIGS. 65 to 68 are overviews of display screens illustrating the process of using a shift box in an operation control method of a mobile terminal according to an exemplary embodiment of the present invention.

Figure 65:
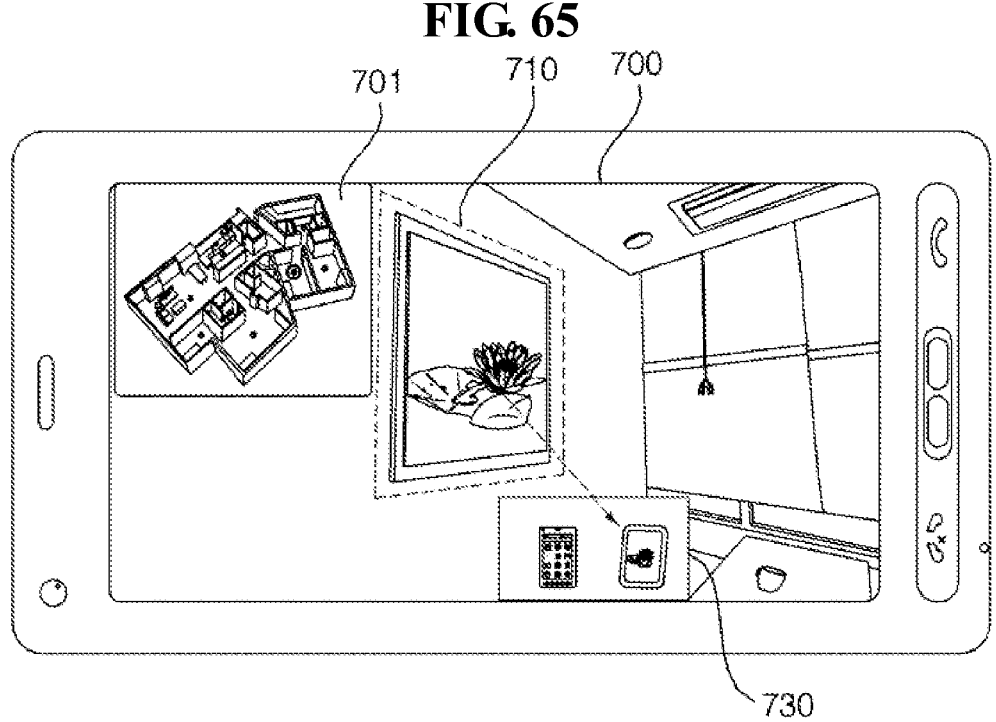
FIGS. 65 to 68 are overviews of display screens illustrating the process of using a shift box in an operation control method of a mobile terminal according to an embodiment of the present invention.

As shown in FIG. 65, a shift box 730 is displayed on a control screen image 700, and by shifting a device icon into the shift box 730, electronic devices located in different spaces can be cooperatively controlled, such as in an interworking manner. For example, as shown in FIG. 65, a device icon 710 of an electronic frame may be shifted into the shift box 730. Accordingly, the device icon of the electronic frame is displayed in the shift box 730. Furthermore, once the device icon 710 is in the shift box 730, the user may select a different room displayed in the building map 701.

Figure 66:
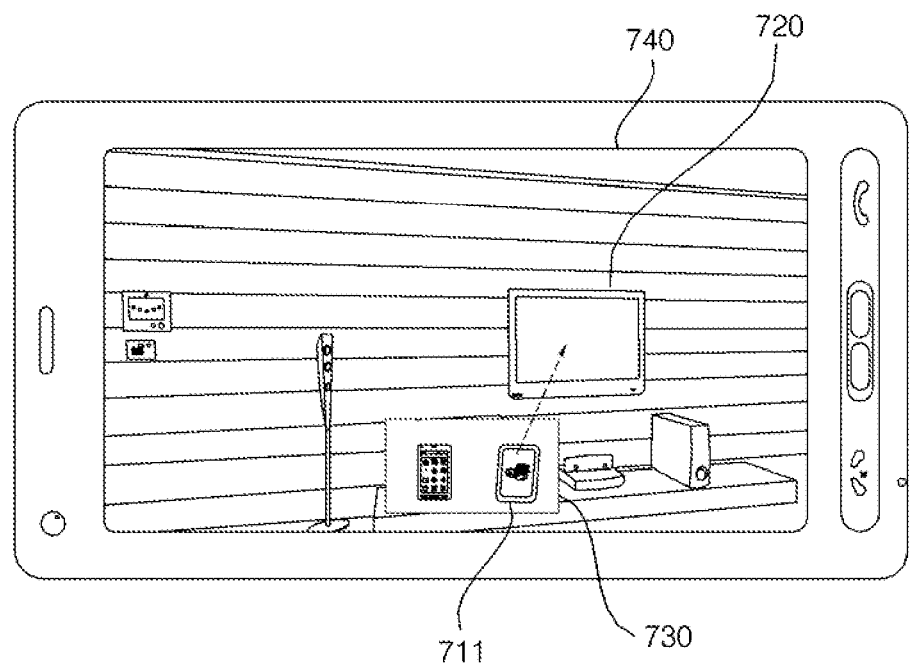

As illustrated in FIG. 66, the screen image is moved to another room which may have been selected from the building map 701 (FIG. 65) and the device icon 711 of the electronic frame in the shift box 730 may be dragged to the TV device icon 720, such that a photo image of the electronic frame can be viewed from the TV.

Figure 67:
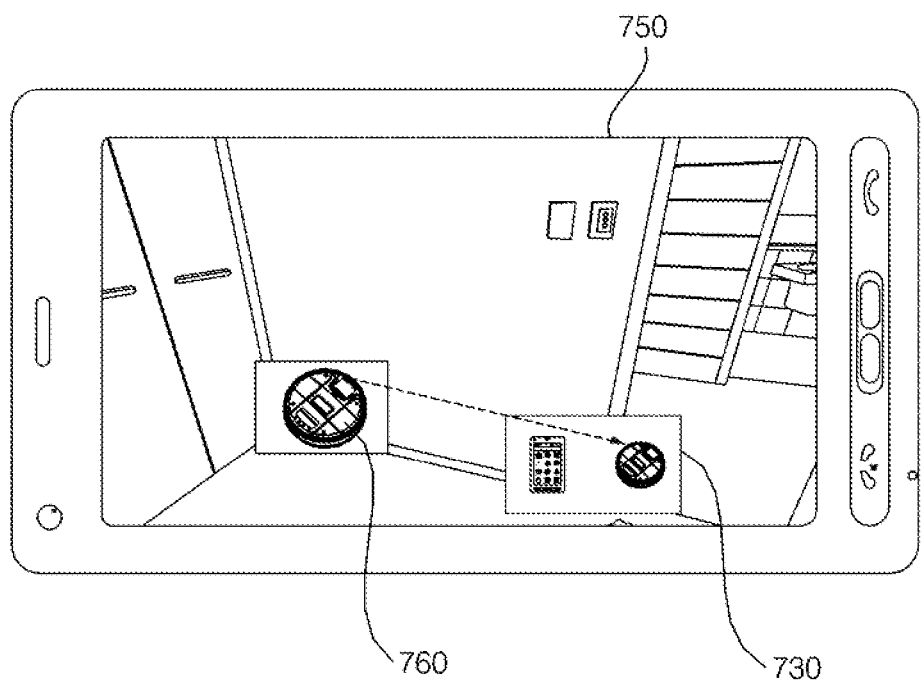
Figure 68:
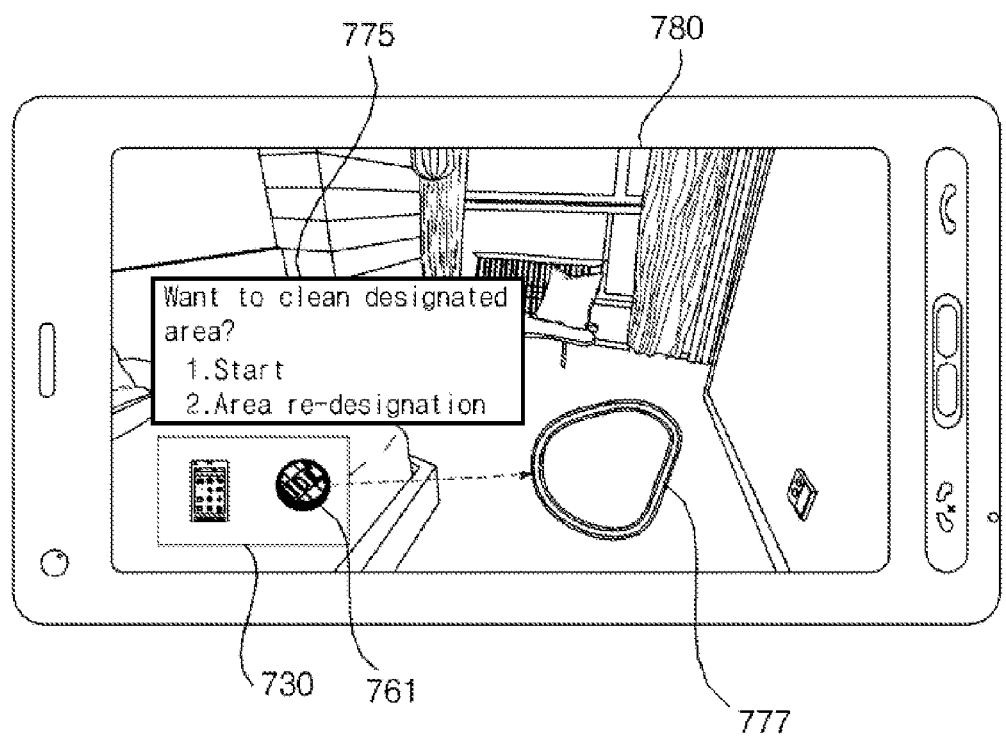

As shown in FIG. 67, a robot cleaner device icon 760 may be dragged to a shift box 730 in the room where the robot cleaner is located, in order to shift it to a space to be cleaned as shown in FIG. 68. When a device icon 761 of the robot cleaner within the shift box 730 is touch-and-dragged to a designated cleaning area 777, a relevant menu 775 is displayed and cleaning is performed according to an item selected from the relevant menu 775. In this example, the cleaning area 777 may be directly set by the user by a input through a control screen image 780. Additionally, an area to be cleaned may be designated in the overall map of the building.

As for the operational principle of the robot cleaner, the mobile terminal 100 transfers a cleaning area to the control server 200 via a wireless connection, and the control server 200 designates cleaning coordinates and an optimum cleaning route of the robot cleaner through a wired or wireless connection. The robot cleaner may perform cleaning with reference to the data transferred from the control server 200.

As described above, the spatially separated electronic devices can be controlled cooperatively or in an interworking manner. Also, the mobile terminal and its operation control method according to the embodiments of the present invention are not limited to the configuration and methods as described above but the entirety of some of the exemplary embodiments may be selectively combined into variable modifications.

The present invention can be implemented as processor-readable codes in a recording medium that can be read by the processor provided in the mobile terminal such as a mobile station modem (MSM) or the like. The processor-readable recording medium includes any kind of recording device storing data that can be read by the processor. The processor-readable recording medium includes a ROM, a RAM, a CD-ROM, a magnetic tape, a floppy disk, an optical data storage device, and the like. Also, the processor-readable recording medium includes implementations in the form of carrier waves or signals (e.g., transmission via the Internet). The processor-readable recording mediums are distributed to computer systems connected by a network, in which processor-readable codes can be stored and executed in a distributed manner.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal comprising:
   a display;
   a short-range communication module configured to perform short-range communication; and
   a controller configured to:
   search for electronic devices available for short-range communication via the short-range communication module;
   acquire location information of electronic devices that are identified via the search;
   acquire an image reflecting a real space;
   cause the display to display the image that includes an electronic device, wherein the displayed electronic device is a first device of the identified electronic devices;
   identify a device type of the first device based on the image;
   cause the display to display data relating to the identified device type corresponding to the first device on the location of the first device within the image based on the acquired location information;
   cause the display to display a menu in response to selecting of the displayed electronic device, wherein the menu comprises a plurality of options for communicating with the first device,
   wherein the displayed data relating to the identified device type comprises at least one of a communication state, a communication speed or a remaining memory capacity of the first device.

2. The mobile terminal of claim 1, wherein the controller is further configured to acquire identification information of the first device via the short-range communication module.

3. The mobile terminal of claim 2, wherein the identification information comprises at least the communication state, the communication speed, the remaining memory capacity, or the name of the first device.

4. The mobile terminal of claim 1, wherein the image reflecting the real space is an image received in real time via a camera or an image stored in a memory.

5. The mobile terminal of claim 1, wherein the image reflecting the real space is a real image or a virtual image simulating the real space.

6. The mobile terminal of claim 1, wherein the controller is further configured to cause the display to display at least:
   an emphasis line outlining the first device located within a display range of the display; or
   an icon indicating a type or state of the first device located within the display range of the display.

7. The mobile terminal of claim 6, wherein the controller is further configured to cause the display to display an indicator indicating at least a location or direction of another at least one other electronic device of the identified electronic devices located outside the display range of the display.

8. The mobile terminal of claim 1, wherein the controller is further configured to exchange data with the first device via the short-range communication in response to an input for selecting the first device.

9. The mobile terminal of claim 8, further comprising:
   a touch pad configured to receive the input for selecting the first device,
   wherein the first device is selected and the data is exchanged in response to a drag-and-drop operation on the first device via the touch pad.

10. The mobile terminal of claim 8, further comprising:
    a motion sensor configured to receive the input for selecting the first device, the input comprising a motion of the mobile terminal detected by the motion sensor,
    wherein the first device is selected and the data is exchanged in response to the motion toward the first device.

11. The mobile terminal of claim 8, wherein the first device is selected and the data is exchanged when a distance between the mobile terminal and the first device is less than or equal to a predetermined distance.

12. The mobile terminal of claim 1, wherein the location information comprises at least a distance, a height, or a direction to the first device.

13. The mobile terminal of claim 1, wherein the location information is acquired by using at least wireless local area network (WLAN), ultra-wide band (UWB), ZigBee™, near field electromagnetic ranging (NFER), or radio-frequency identification (RFID).

14. The mobile terminal of claim 13, further comprising:
a location information module configured to assist the acquirement of the location information.

15. The mobile terminal of claim 8, wherein the controller is further configured to cause the display to display a pop-up window at a lower end of the display, the pop-up window comprising content to be selected as the data to be exchanged with the first device.

16. The mobile terminal of claim 15, wherein the data is exchanged when the selected content in the pop-up window is dragged and dropped to the first device.

17. The mobile terminal of claim 1, wherein the plurality of options comprise transmitting photo data, transmitting music data, or transmitting contact data.

18. The mobile terminal of claim 1, wherein the controller is further configured to:
transmit photo data to the first device in response to an input relating to photo transmission;
transmit music data to the first device in response to an input relating to music transmission; and
transmit contact data to the first device in response to an input relating to contact data transmission.

19. A method for controlling a mobile terminal, the method comprising:
searching for electronic devices available for short-range communication via a short-range communication module of the mobile terminal;
acquiring location information of electronic device that are identified via the searching;
acquiring an image reflecting a real space;
displaying the image that includes an electronic device, wherein the displayed electronic device is a first device of the identified electronic devices;
identifying a device type of the first device based on the image;
displaying data relating to the identified device type corresponding to the first device on the location of the first device within the image based on the acquired location information;
displaying a menu in response to selecting of the displayed electronic device, wherein the menu comprises a plurality of options for communicating with the first device,
wherein the displayed data relating to the identified device type comprises at least one of a communication state, a communication speed or a remaining memory capacity of the first device.

20. The method of claim 19, further comprising:
acquiring identification information of the first device.

21. The method of claim 20, wherein the identification information comprises at least the communication state, the communication speed, the remaining memory capacity, or the name of the first device.

22. The method of claim 19, wherein the image reflecting the real space is an image received in real time through a camera or an image stored in a memory.

23. The method of claim 19, wherein the image reflecting the real space is a real image or a virtual image simulating the real space.

24. The method of claim 19, further comprising displaying at least:
an emphasis line outlining the first device located within a display range of the display; or
an icon indicating a type or state of the first device located within the display range of the display.

25. The method of claim 24, further comprising displaying an indicator indicating at least a location or direction of at least one other device of the identified electronic devices located outside the display range of the display.

26. The method of claim 19, further comprising:
selecting the first device and exchanging data with the selected first device.

27. The method of claim 26, wherein the data is exchanged between the mobile terminal and the first device in response to an input comprising drag-and-dropping the data to be exchanged to the first device.

28. The method of claim 26, wherein the first device is selected and the data is exchanged between the mobile terminal and the first device in response to an input comprising a motion of the mobile terminal toward the first device.

29. The method of claim 26, wherein the first device is selected and the data is exchanged between the mobile terminal and the first device when a distance between the first device and the mobile terminal is less than or equal to a predetermined distance.

30. The method of claim 19, wherein the location information comprises at least one of a distance, a height, or a direction of the first device.

31. The method of claim 19, wherein the plurality of options comprise transmitting photo data, transmitting music data, or transmitting contact data.

32. The method of claim 19, further comprising:
transmitting photo data to the first device in response to an input relating to photo transmission;
transmitting music data to the first device in response to an input relating to music transmission; and
transmitting contact data to the first device in response to an input relating to contact data transmission.

* * * * *